(12) United States Patent
Cordray et al.

(10) Patent No.: US 10,686,675 B2
(45) Date of Patent: Jun. 16, 2020

(54) SELF CONFIGURING NETWORK MANAGEMENT SYSTEM

(71) Applicant: ScienceLogic, Inc., Reston, VA (US)

(72) Inventors: Christopher G. Cordray, Chantilly, VA (US); David F. Link, Falls Church, VA (US); Richard M. Chart, Truro (GB); Karl Ginter, Beltsville, MD (US)

(73) Assignee: ScienceLogic, Inc., Reston, VA (US)

( * ) Notice: Subject to any disclaimer, the term of this patent is extended or adjusted under 35 U.S.C. 154(b) by 0 days.

(21) Appl. No.: 14/723,050

(22) Filed: May 27, 2015

(65) Prior Publication Data
US 2016/0134491 A1 May 12, 2016

Related U.S. Application Data

(63) Continuation of application No. 11/175,417, filed on Jul. 7, 2005, now Pat. No. 9,077,611.

(60) Provisional application No. 60/585,638, filed on Jul. 7, 2004, provisional application No. 60/676,588, filed on Apr. 29, 2005.

(51) Int. Cl.
*H04L 12/24* (2006.01)
*H04L 29/08* (2006.01)

(52) U.S. Cl.
CPC ...... *H04L 41/5009* (2013.01); *H04L 41/0213* (2013.01); *H04L 41/0246* (2013.01);
(Continued)

(58) Field of Classification Search
CPC . H04L 41/0213; H04L 67/34; H04L 41/0253; H04L 41/06; H04L 41/0809; H04L 41/0816; H04L 41/0843; H04L 41/0856; H04L 41/0893; H04L 41/5009; H04L 41/5032; H04L 41/0246; H04L 41/0273; H04L 41/046; H04L 41/5003;
(Continued)

(56) References Cited

U.S. PATENT DOCUMENTS 6,070,190 A 5/2000 Reps et al.
6,081,518 A 6/2000 Bowman-Amuah
(Continued)

FOREIGN PATENT DOCUMENTS

WO 03/084130 A1 10/2003

OTHER PUBLICATIONS

Geekgirl. Setting up a Home Network, 2002 [online; archived on Feb. 15, 2002; retrieved on Sep. 24, 2008]. Retrieved from the Internet<URL:http://web.archive.org/web/20020215180857/http://www.geekgirls.com/windowsxp_home_network.htm>.
(Continued)

*Primary Examiner* — Philip J Chea
*Assistant Examiner* — Wing Ma
(74) *Attorney, Agent, or Firm* — Nixon & Vanderhye, P.C.

(57) ABSTRACT

Systems, software, and methods for managing networks of connected electronic devices are described. In one example, network management policy and network management applications are downloaded automatically upon detection and identification of a new device on the network. In another example, information related to at least one aspect of the network is obtained by a network management device, and at least one applicable management policy is identified by the device; and the identified policy is used to manage at least one aspect of the network's operation.

17 Claims, 19 Drawing Sheets

(52) U.S. Cl.
CPC .......... *H04L 41/0253* (2013.01); *H04L 41/06* (2013.01); *H04L 41/0809* (2013.01); *H04L 41/0816* (2013.01); *H04L 41/0843* (2013.01); *H04L 41/0856* (2013.01); *H04L 41/0893* (2013.01); *H04L 41/5032* (2013.01); *H04L 67/34* (2013.01); *H04L 41/0273* (2013.01); *H04L 41/046* (2013.01); *H04L 41/5003* (2013.01); *H04L 41/5048* (2013.01); *H04L 41/5058* (2013.01); *H04L 41/5093* (2013.01)

(58) Field of Classification Search
CPC ............. H04L 41/5048; H04L 41/5058; H04L 41/5093
USPC .................................................. 709/223, 224
See application file for complete search history.

(56) References Cited

U.S. PATENT DOCUMENTS

| | | |
|---|---|---|
| 6,088,659 A | 7/2000 | Kelley et al. |
| 6,101,500 A * | 8/2000 | Lau .................... G06F 17/30961 707/696 |
| 6,104,868 A | 8/2000 | Peters et al. |
| 6,182,136 B1 | 1/2001 | Ramanathan et al. |
| 6,212,560 B1 | 4/2001 | Fairchild |
| 6,226,788 B1 | 5/2001 | Schoening et al. |
| 6,336,138 B1 | 1/2002 | Caswell et al. |
| 6,343,320 B1 | 1/2002 | Fairchild et al. |
| 6,393,474 B1 | 5/2002 | Eichert et al. |
| 6,418,468 B1 | 7/2002 | Ahlstrom et al. |
| 6,560,656 B1 | 5/2003 | O'Sullivan et al. |
| 6,615,218 B2 | 9/2003 | Mandal et al. |
| 6,691,161 B1 | 2/2004 | Cook et al. |
| 6,708,187 B1 | 3/2004 | Shanumgam et al. |
| 6,728,378 B2 | 4/2004 | Garib |
| 6,788,315 B1 | 9/2004 | Kekic et al. |
| 6,795,846 B1 | 9/2004 | Merriam |
| 6,834,298 B1 | 12/2004 | Singer et al. |
| 6,834,303 B1 * | 12/2004 | Garg ....................... H04L 41/12 370/254 |
| 6,851,118 B1 | 2/2005 | Ismael et al. |
| 6,865,737 B1 | 3/2005 | Lucas et al. |
| 6,871,285 B1 | 3/2005 | Carney et al. |
| 6,965,932 B1 | 11/2005 | Rajaram et al. |
| 6,981,266 B1 | 12/2005 | An et al. |
| 6,983,317 B1 | 1/2006 | Bishop et al. |
| 6,990,660 B2 | 1/2006 | Moshir et al. |
| 7,013,462 B2 | 3/2006 | Zara et al. |
| 7,028,307 B2 | 4/2006 | Thiele |
| 7,047,287 B2 * | 5/2006 | Sim .................... G06F 17/30194 707/E17.01 |
| 7,075,895 B1 * | 7/2006 | Hanam .................... H04L 29/06 370/254 |
| 7,080,092 B2 | 7/2006 | Upton |
| 7,099,931 B2 | 8/2006 | Da Palma et al. |
| 7,130,870 B1 | 10/2006 | Pecina et al. |
| 7,143,156 B2 | 11/2006 | Menzies et al. |
| 7,150,044 B2 | 12/2006 | Hoefelmeyer et al. |
| 7,197,561 B1 | 3/2007 | Lovy et al. |
| 7,213,068 B1 | 5/2007 | Kohli et al. |
| 7,293,080 B1 * | 11/2007 | Clemm .................... H04L 12/00 370/254 |
| 7,337,184 B1 * | 2/2008 | Or ........................ G06F 17/3056 |
| 7,395,324 B1 | 7/2008 | Murphy et al. |
| 7,440,408 B1 * | 10/2008 | Anderson ............... H04L 41/12 370/252 |
| 7,464,132 B1 | 12/2008 | Florissi et al. |
| 7,478,097 B2 | 1/2009 | Emeis et al. |
| 7,490,175 B2 | 2/2009 | Rosenbloom et al. |
| 7,512,674 B1 | 3/2009 | Jain et al. |
| 7,523,184 B2 | 4/2009 | Kortright |
| 7,529,821 B1 | 5/2009 | Cannon et al. |
| 7,565,416 B1 | 7/2009 | Shafer et al. |
| 7,587,483 B1 | 9/2009 | Florissi et al. |
| 7,603,710 B2 | 10/2009 | Harvey et al. |
| 7,716,313 B2 | 5/2010 | Rana et al. |
| 7,984,074 B1 | 7/2011 | Becher et al. |
| 8,214,473 B1 * | 7/2012 | Wexler .................. G06F 9/4411 709/223 |
| 8,332,502 B1 * | 12/2012 | Neuhaus ............. H04L 41/0613 709/223 |
| 8,838,793 B1 * | 9/2014 | Thrasher ............. H04L 67/1097 709/223 |
| 2002/0021465 A1 | 2/2002 | Moore et al. |
| 2002/0022952 A1 | 2/2002 | Zager et al. |
| 2002/0046260 A1 | 4/2002 | Day, II |
| 2002/0109879 A1 | 8/2002 | Wing So |
| 2002/0116485 A1 | 8/2002 | Black et al. |
| 2002/0174198 A1 | 11/2002 | Halter |
| 2002/0188643 A1 | 12/2002 | Kennedy |
| 2003/0023711 A1 | 1/2003 | Parmar et al. |
| 2003/0046443 A1 | 3/2003 | Glitho et al. |
| 2003/0093509 A1 * | 5/2003 | Li ........................ G06F 11/0727 709/223 |
| 2003/0097425 A1 | 5/2003 | Chen |
| 2003/0149752 A1 * | 8/2003 | Baldwin ................ H04L 29/06 709/223 |
| 2003/0149754 A1 * | 8/2003 | Miller, II ................ H04L 41/22 709/223 |
| 2003/0149761 A1 * | 8/2003 | Baldwin ............. G06F 11/3495 709/224 |
| 2003/0156552 A1 | 8/2003 | Banker et al. |
| 2003/0179227 A1 * | 9/2003 | Ahmad .................... H04L 41/06 715/736 |
| 2003/0195957 A1 | 10/2003 | Banginwar |
| 2003/0200304 A1 | 10/2003 | Thorpe et al. |
| 2003/0212767 A1 | 11/2003 | Yang-Huffman |
| 2003/0217039 A1 * | 11/2003 | Kurtz .................... G02B 5/3083 |
| 2003/0229501 A1 | 12/2003 | Copeland et al. |
| 2004/0088386 A1 | 5/2004 | Aggarwal |
| 2004/0088404 A1 | 5/2004 | Aggarwal |
| 2004/0088405 A1 | 5/2004 | Aggarwal |
| 2004/0103193 A1 | 5/2004 | Pandya et al. |
| 2004/0148372 A1 | 7/2004 | Campbell |
| 2004/0163008 A1 | 8/2004 | Kim |
| 2004/0181664 A1 | 9/2004 | Hoefelmeyer et al. |
| 2004/0193329 A1 | 9/2004 | Ransom et al. |
| 2004/0210654 A1 | 10/2004 | Hrastar |
| 2004/0221022 A1 | 11/2004 | Gracyk |
| 2004/0236991 A1 * | 11/2004 | Brundridge ............... H04L 1/24 714/25 |
| 2004/0237094 A1 | 11/2004 | Vambenepe et al. |
| 2005/0076200 A1 | 4/2005 | Thornton et al. |
| 2005/0076343 A1 | 4/2005 | Kammhuber |
| 2005/0102383 A1 * | 5/2005 | Sutler .................... G06Q 30/02 709/223 |
| 2005/0229154 A1 | 10/2005 | Hiew et al. |
| 2006/0149854 A1 * | 7/2006 | Rudkin .................. H04L 12/14 709/241 |
| 2007/0226365 A1 | 9/2007 | Hildreth et al. |
| 2007/0283007 A1 * | 12/2007 | Keir ...................... G02B 5/3083 709/224 |
| 2008/0082978 A1 * | 4/2008 | Or ...................... G06F 17/3056 718/100 |
| 2008/0189405 A1 * | 8/2008 | Zarenin ................. H04L 29/06 709/224 |
| 2010/0064226 A1 * | 3/2010 | Stefaniak ............. G06F 9/5055 715/736 |
| 2010/0091676 A1 * | 4/2010 | Moran ................... H04L 47/10 370/252 |

OTHER PUBLICATIONS

AventNet, "AdventNet OpUtils Manual".
ManageEngine. ManageEngine OpUtils 3. 2005. [Online]. Available:http://manageengine.adventnet.com/products/oputils/index.html.
T. Charrot and D. Brassington, "Collecting Data from Disparate Intrustion Detection System Sensors," QinetiQ, Aug. 2002.
Cisco, "Overview of the CNS Notification Engine".

(56) References Cited

OTHER PUBLICATIONS

Cisco, "Cisco Networking Services Notification Engine Comprehensive Guide".
Cisco, "Using and Administering the CNS Notification Engine".
Farm9. Harvester Project. 2005. [Online]. Available: http://farm9.org/Harvester/.
farm9.org, "Harvester API Guide and Reference: farm9.org," 2002.
Monitor, "IpMonitor 7.5 Specifications," 2005.
PerformanceIT. ProIT is built on a powerful, fully distributed high scalable arch featuring six unique components. 2005. [Online]. Available: http://www.perfornanceit.com/.
PerformanceIT. Performance IT Feature List. 2005. [Online]. Available: http://www.performanceit.com/feature_list.html.
PeformanceIT—IT monitoring solutions and services. ProIT Enterprise comes in three models (SE), (LE) and (VLE). 2005. [Online]. Available: http://www.performanceit.com/ed.
Set Machine. Welcome to the Set Machine Tutorial! Apr. 2002. [Online]. Available: http://www.setmachine.com/howto/html.
Set Machine. E-mail parsing+database generation. Apr. 2002. [Online]. Available: http://www.setmachine.com/email.html.
Sun.com. Jini Network Technology "Overview". 2005. [Online]. Available: http://www.sun.com/jini/overview/.
International Search Report and Written Opinion of the International Searching Authority recently issued in corresponding PCT application (dated Oct. 26, 2006).
EMC Corporation, EMC Smarts IP Availability Manager—White Paper, Nov. 2005.
EMC Corporation, EMC Smarts Architecture—Data Sheet, Apr. 28, 2005.
Feridun, M., et al., "Distributed Management with Mobile Components," IBM Research Report, Feb. 1999, XP-002158233, pp. 857-870.
Kawamura, R., et al., "A Middleware Architecture for Active Distributed Management of IP Networks," IEEE, Apr. 2000, XP-010376690, pp. 291-304.
Extended European Search Report dated Jul. 21, 2014 issued in corresponding European Patent Application No. 05 77 1583.

\* cited by examiner

SELF CONFIGURING NETWORK MANAGEMENT SYSTEM

1 CROSS REFERENCE TO RELATED U.S. PATENT APPLICATIONS

This application is a continuation of U.S. patent application Ser. No. 11/175,407 filed Jul. 7, 2005; which claims the benefit of U.S. Provisional Application Nos. 60/585,638 filed Jul. 7, 2004, and 60/676,588 filed Apr. 29, 2005, each of which is incorporated herein by reference in its entirety and for all purposes.

2 BACKGROUND OF THE TECHNOLOGY HEREIN 2.1 Field

The exemplary, illustrative, technology herein relates to systems, software, and methods for managing the operation of networks composed of various and disparate electronic devices. More particularly, the exemplary, illustrative, technology herein provides systems, software, and methods for automatically configuring and enabling network management software and systems for managing the operation of networks composed of various and disparate electronic devices. The technology herein has applications in the areas of computer science, electronics, and electronic commerce.

2.2 Background

Computer network technology has experienced phenomenal growth over the past two decades, from the esoteric experimental defense-related projects known to only a handful of electronics and military specialists in the 1960s and 1970s, to the epicenter of the so-called dot-com stock market boom of the late 1990s. Today, tens, perhaps hundreds, of millions of people over the globe rely on computer network for their jobs, education, and entertainment. In the industrialized world, access to computer networks appears to be almost ubiquitous. Examples include building control networks for managing a building's internal environment, networks of sensors monitoring air quality, factory floor automation, and combined communications systems combining previously disparate systems.

Not only has the presence of computer networks exploded, but the complexity of these electronic webs has skyrocketed as well. Today, a computer network administrator must simultaneously deal with a myriad of different devices, manufacturers, and protocols in her job function, as well as support the ad-hoc attachment and removal of devices from the network as portable wireless devices automatically attach and detach from the network infrastructure. The devices must be able to communicate properly across the network without interfering with each other. In particular, the administrator must be able to identify warnings and troubleshoot abnormal behaviors on the network and network-attached systems long before any risk that the network as a whole will stop functioning.

Current network management systems are often complex and do not operate well for most users. First, these systems have onerous requirements. Many require specialized expertise just to install and configure the network management software and additional applications. Others require additional expertise-based configurations of the software and applications to monitor a network, including: complex collections of vendor-specific applications to monitor disparate hardware and software and extensive custom programming to monitor applications.

Second, many management systems only can monitor a limited number of attributes per network connected device, use a single network management protocol, and further do not monitor system, application status, network performance, or quality of service ("QoS") attributes. Furthermore, many management systems do not cross-correlate between multiple network services and check for discrepancies between network services that provide coordinated service. Moreover, many systems are designed under the presumption that the network infrastructure is always functioning; and therefore may not be reliable when network service interruptions occur.

Third, the day-to-day operation of current network management products requires skilled support staff to configure and maintain the management software and network, including adding and removing devices and device configurations as the network topology changes. Configuration typically requires that the staff manually collect information about network management system applications (and management information base ("MIB") configurations) used to manage the devices that are part of the network from individual device manufacturers, manually install and configure the software, and then set manually the thresholds for sending alerts. Many network management systems and applications are limited to using a single management protocol, for example, the simple network management protocol ("SNMP"), to collect information from the devices, forcing the users to reconcile SNMP requirements with their management policies. Furthermore, the tools available to accomplish these tasks are primitive, often overloading the operators with excessive reporting responsibilities and preventing the automatic correlation of information about devices present on the network.

For example, limitations in SNMP architecture force network operators to manage networks of devices from a single management station, or clear the same error reports from multiple terminals. Often, network devices only report their own internal status; but do not provide the operator critical information on the status of the device's communication with the network, nor do they provide information regarding the status of applications and services operating on the device.

Additionally, current technologies require external applications to manage the resulting workload (e.g., "trouble tickets"), require additional external systems to manage enterprise critical infrastructure such as domain name services ("DNS"), dynamic host configuration protocol ("DHCP") leases, and digital certificates, and do not provide mechanisms to ensure that these critical infrastructure components are available, up-to-date, and in synchronization. This additional configuration workload limits the usefulness of current network management systems on ad hoc or intermittently connected networks.

Finally, current management systems are not integrated with network and system security products such as IDSs (Intrusion Detection Systems), audit trails, and log management mechanisms. Many systems also do not integrate easily with enterprise network management policies, including security, configuration management, and other IT-based policies. In addition, current management systems suffer from high false failure reporting rates, wasting network manager time and resources.

Thus, there is an immediate need for network management systems that are more robust, and simpler to install, configure, and maintain. The exemplary, illustrative, technology herein meets these and other similar needs.

3 SUMMARY OF THE TECHNOLOGY HEREIN

The exemplary, illustrative, technology herein provides network management systems, methods, and software that significantly reduce the complexities and limitations of current network management systems; thereby providing greater service and value to network managers and users.

In a first aspect, the exemplary, illustrative, technology herein provides systems, software, and methods for the automatic instantiation of a network management program. In one exemplary, illustrative, non-limiting implementation of the technology herein encompassing this aspect, a method provided by the technology herein comprises obtaining information related to at least one aspect of the network, instantiating a management program, and using the management program to manage at least one aspect of the network. In another exemplary, illustrative, non-limiting implementation, the instantiation of the management program includes a download from a server. In still another exemplary, illustrative, non-limiting implementation, instantiation of the management program includes an installation step. In yet another exemplary, illustrative, non-limiting implementation, the management program replaces a previously configured management program upon the basis of the newly obtained information related to an aspect of the network. In an exemplary, illustrative, non-limiting implementation, the instantiated management program is selected, at least in part, based upon the information related to the network.

In a second aspect, the exemplary, illustrative, technology herein provides systems, software, and methods to download network management policy and network management applications. In one exemplary, illustrative, non-limiting implementation of this aspect of the technology herein, a method provided by the technology herein includes obtaining information related to at least one aspect of the network, identifying at least one applicable management policy, and using the identified policy to manage at least one aspect of the network. In another exemplary, illustrative, non-limiting implementation, the policy includes limits associated with enterprise-defined policies for any of network configuration, network security, network hosting, network utilization, network availability, and network service quality. In another exemplary, illustrative, non-limiting implementation, the management policy is downloaded. In an exemplary, illustrative, non-limiting implementation, the management policy is stored in a directory service.

In a third aspect, the exemplary, illustrative, technology herein provides systems, software, and methods related to being able to download templates as well as download applications. In one exemplary, illustrative, non-limiting implementation of this aspect of the technology herein, the technology herein provides a method for managing the operation of a network including identifying at least one applicable template, and using the template to manage at least one aspect of the network. In another exemplary, illustrative, non-limiting implementation, the management policy is stored in a directory service. In still another exemplary, illustrative, non-limiting implementation, the template may be used to specify a management system configuration, a managed device configuration, network availability, device security, device availability, or network service quality. In yet another exemplary, illustrative, non-limiting implementation, the template is downloaded; and, in a more specific exemplary, illustrative, non-limiting implementation, the template is used, at least in part, to form an association with a management program.

In a fourth aspect, the exemplary, illustrative, technology herein provides systems, software, and methods related to iterative management of a network. In one exemplary, illustrative, non-limiting implementation, the technology herein provides a method for managing the operation of a network, including identifying a management program associated with an aspect of a network device, dynamically forming an association between the identified management program and the network device, and using the association to instantiate the management program to manage the network device. In one exemplary, illustrative, non-limiting implementation, the act of dynamically forming further includes identifying characteristics of the network device, generating a profile of the network device from the characteristics, and locating the management program using the profile.

In a fifth aspect, the exemplary, illustrative, technology herein provides systems, software, and methods for configuring a data store. In one exemplary, illustrative, non-limiting implementation, a method of the technology herein includes using a downloadable template to determine, at least in part, the configuration of the data store. In another exemplary, illustrative, non-limiting implementation, a downloadable template is used to determine, at least in part, the information to be stored in a data store. In yet another exemplary, illustrative, non-limiting implementation, the data store that is configured to relate elements among a plurality of data stores, and a method of the technology herein includes using a downloadable template to determine, at least in part, the relationship between a first element in a first data store, and a second element in a second data store.

In a sixth aspect, the technology herein provides systems, software, and methods for network management using a data store. In one exemplary, illustrative, non-limiting implementation, a method of the technology herein provided for managing the operation of a network includes: providing at least one data store; providing network operation parameter limits; obtaining status information from network applications, network servers, network devices, and network services operatively connected to said network; storing the information in at least one data store; comparing the status information with network policy operation parameter limits; and taking an action based upon the results of the comparison. In another exemplary, illustrative, non-limiting implementation, the network operation parameter limits are altered in response to the detection. In still another exemplary, illustrative, non-limiting implementation, the network operation parameter limits are associated with policies at an organizational level selected from the group consisting of: enterprise, division, network, device, and their combinations.

These and other aspects and advantages will become apparent when the Description below is read in conjunction with the accompanying Drawings.

4 BRIEF DESCRIPTION OF THE DRAWINGS

Figure 4A:
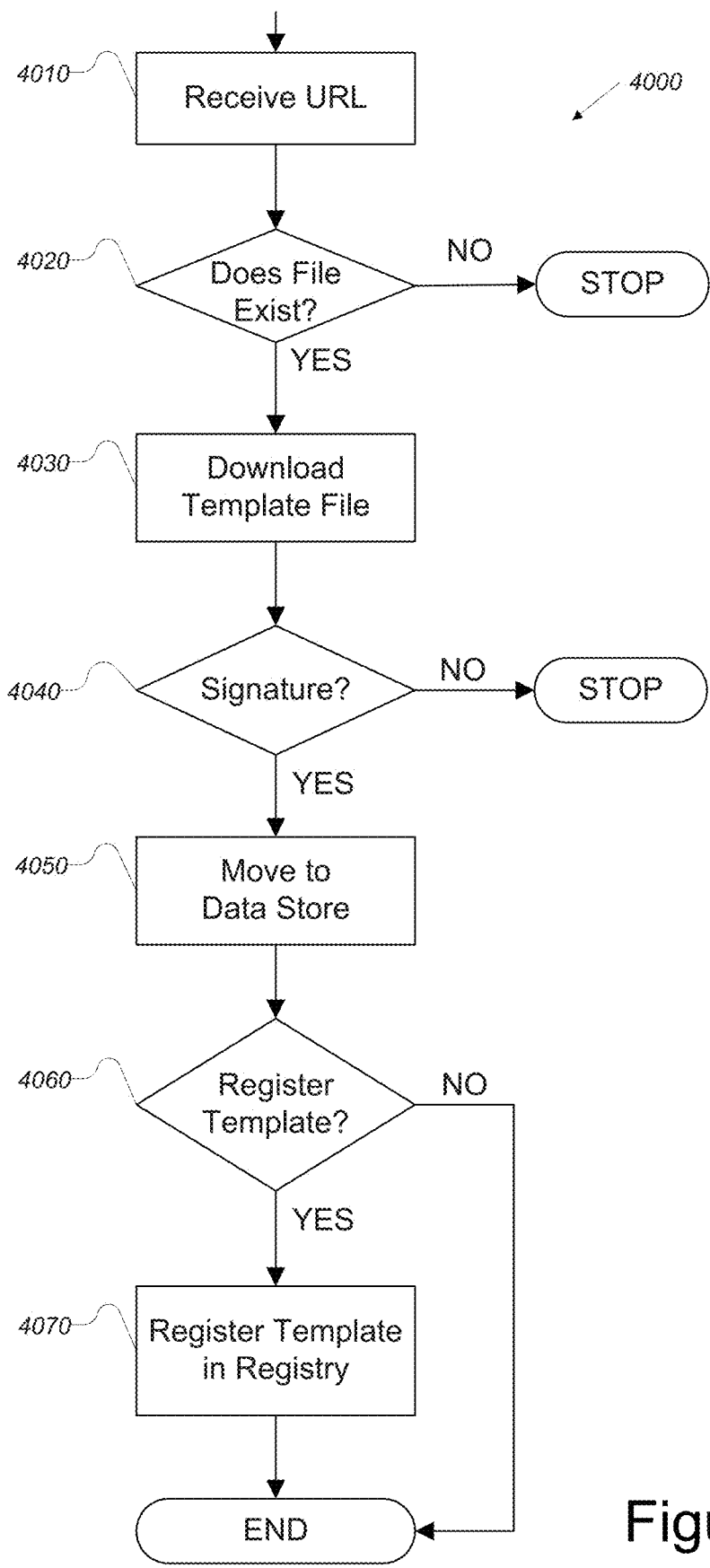
Figure 4B:
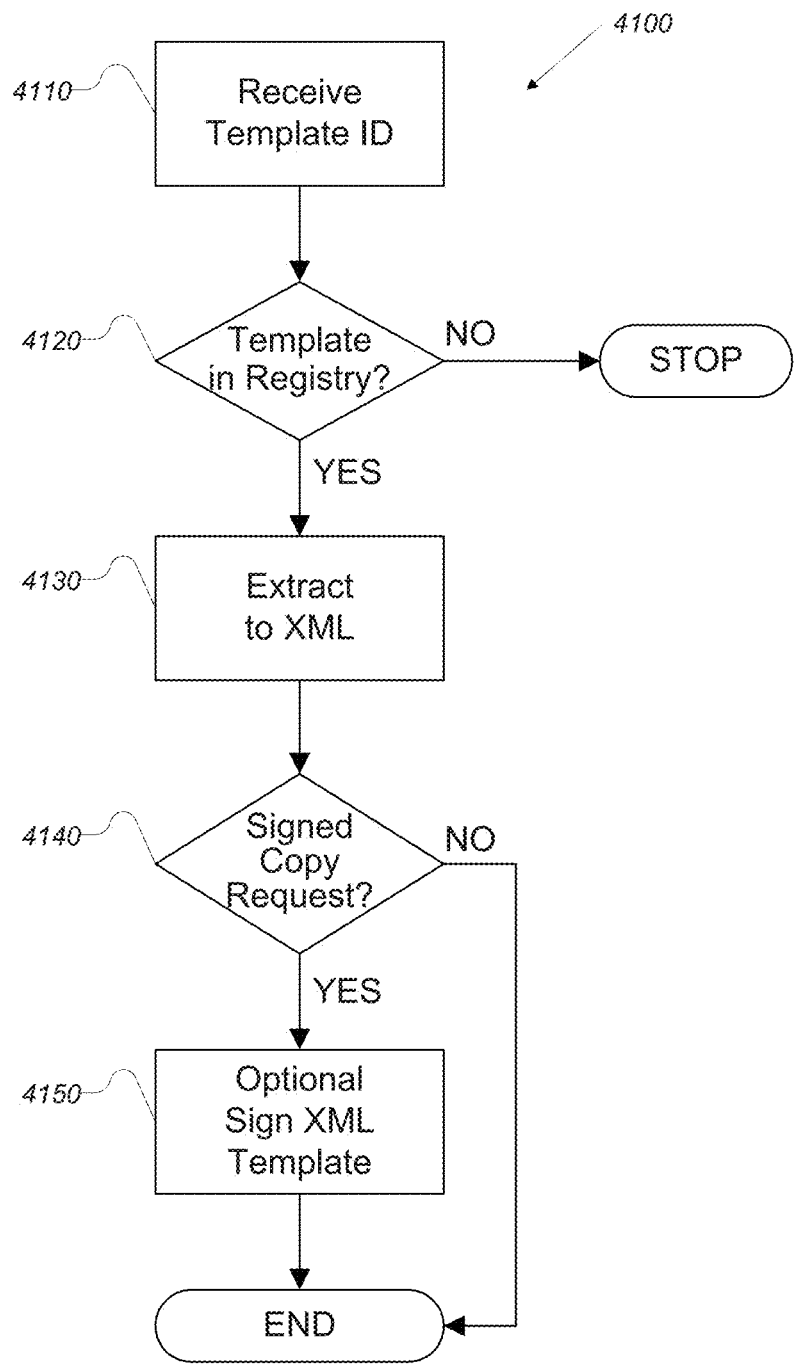

FIGS. 4A and 4B illustrate processes for importing and exporting templates to and from the template manager respectively. FIG. 4A is a flowchart illustrating a template import process in accordance with the illustrative technology herein. FIG. 4B is a flowchart illustrating a template export process in accordance with the illustrative technology herein.

Figure 5:
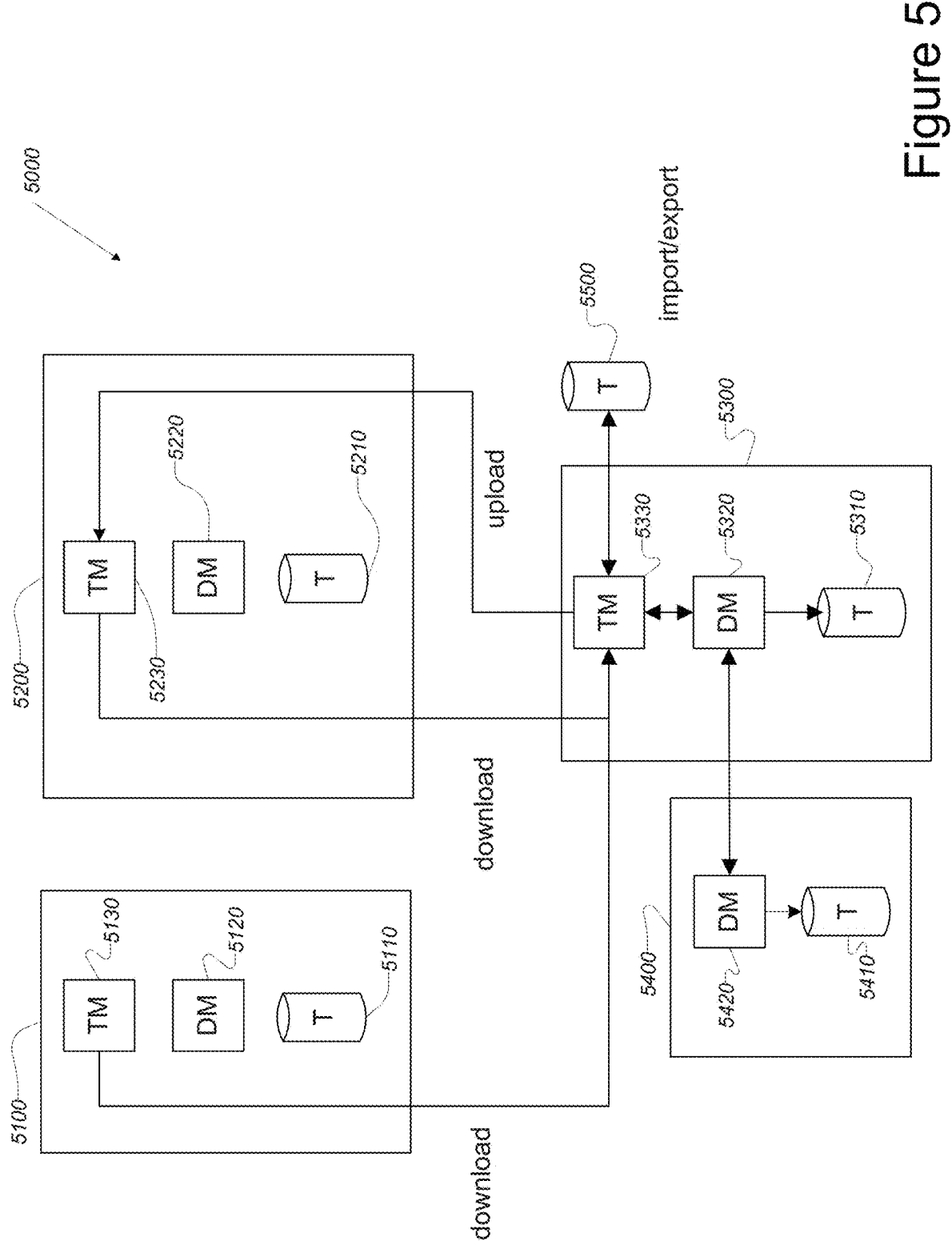

FIG. 5 illustrates exemplary methods for transferring templates between different instances of the network management device in accordance with the illustrative technology herein.

Figure 6A:
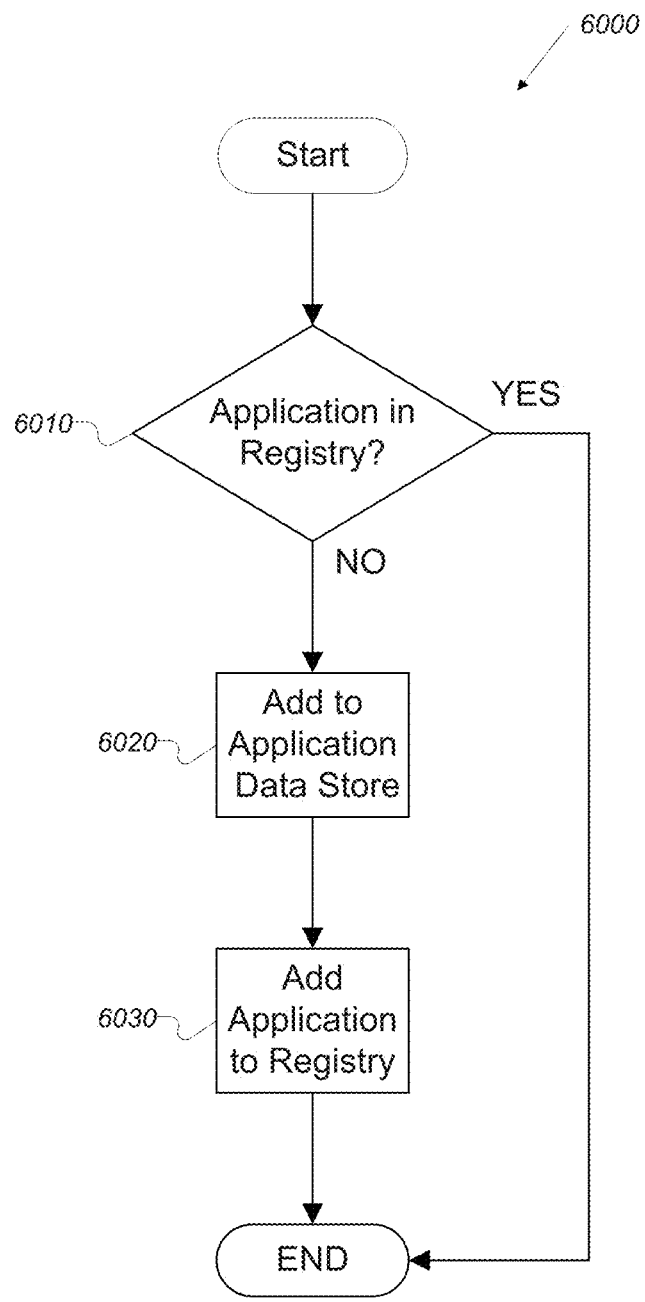
Figure 6B:
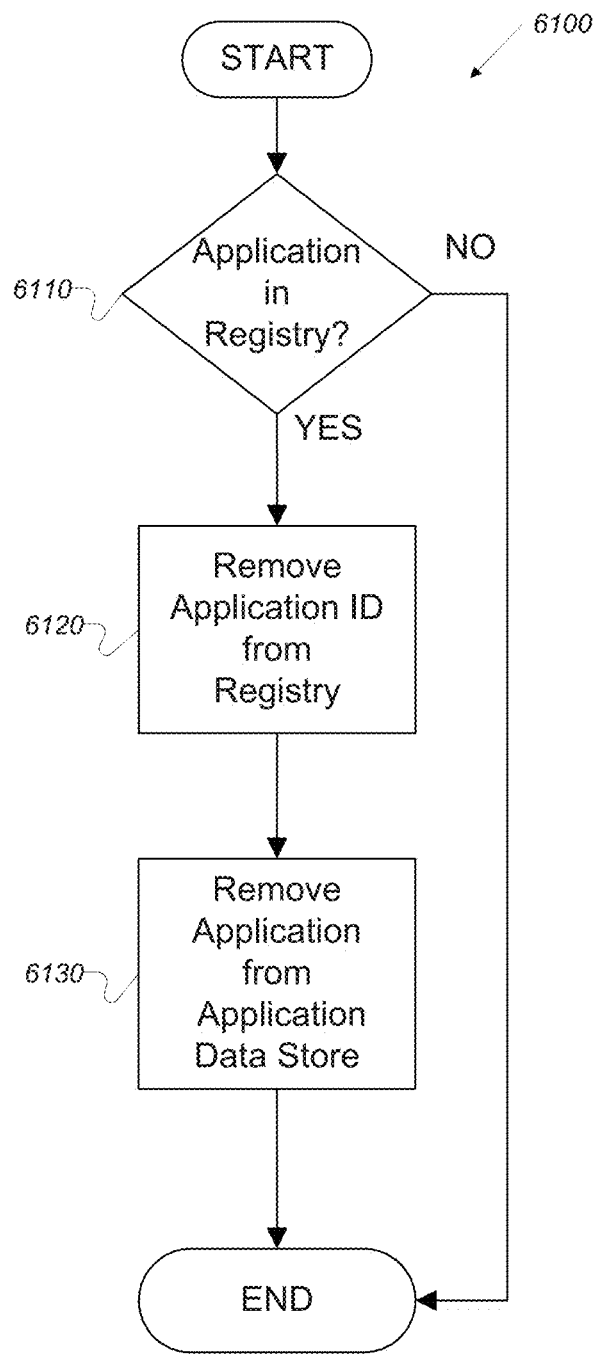
Figure 6C:
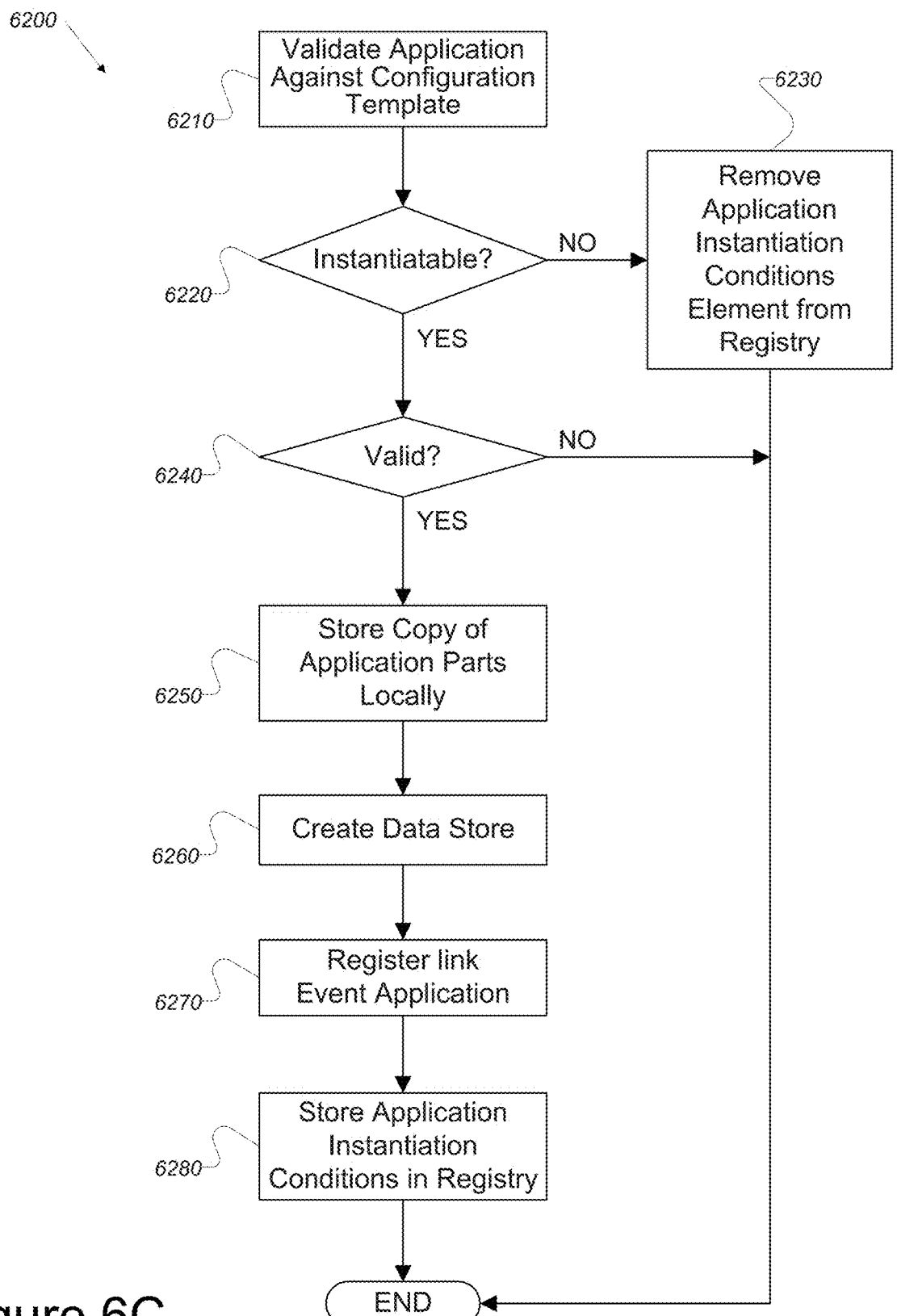
Figure 6D:
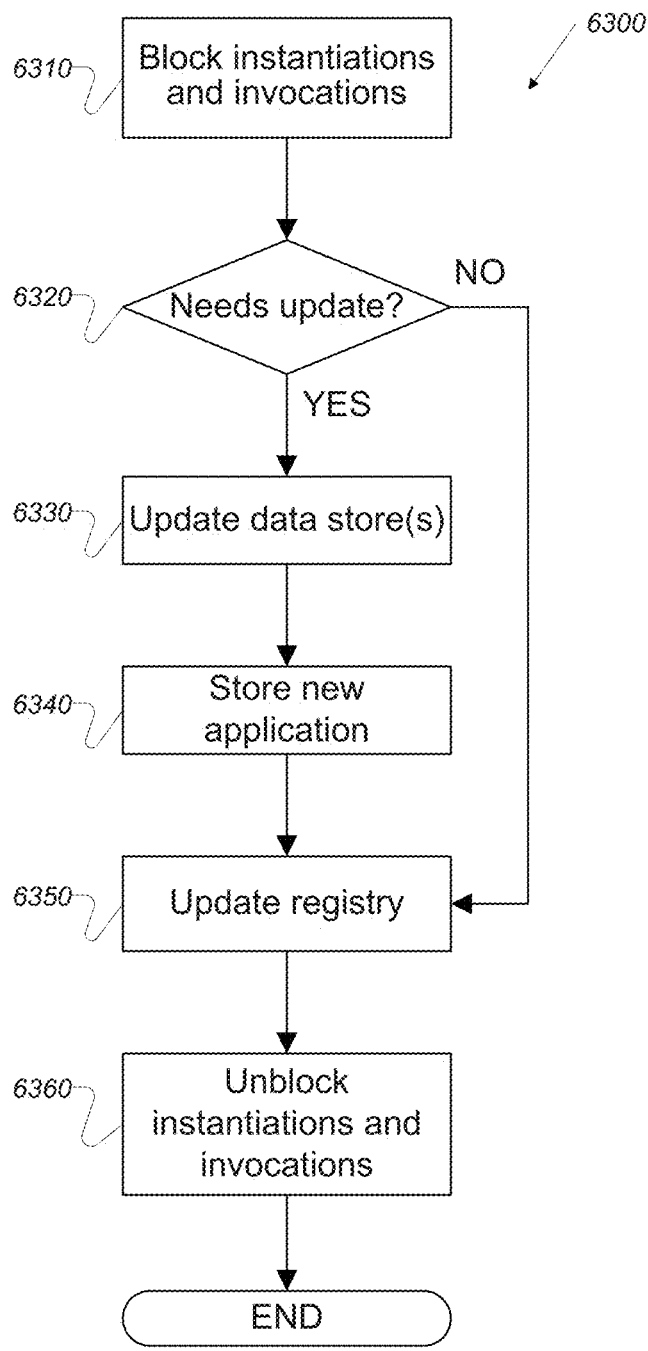

FIGS. 6A-6D illustrate exemplary processes by which the network management device application becomes known to the network management device instance in accordance with the illustrative technology herein. FIG. 6A is a flowchart illustrating an exemplary method for registration of a network management device in accordance with the illustrative technology herein. FIG. 6B is a flowchart illustrating an exemplary method for removing an application from the registry in accordance with the illustrative technology herein. FIG. 6C is a flowchart showing a process for instantiating an application in accordance with the illustrative technology herein. FIG. 6D is a flowchart illustrating a process for an update-in-place operation in accordance with the illustrative technology.

Figure 7:
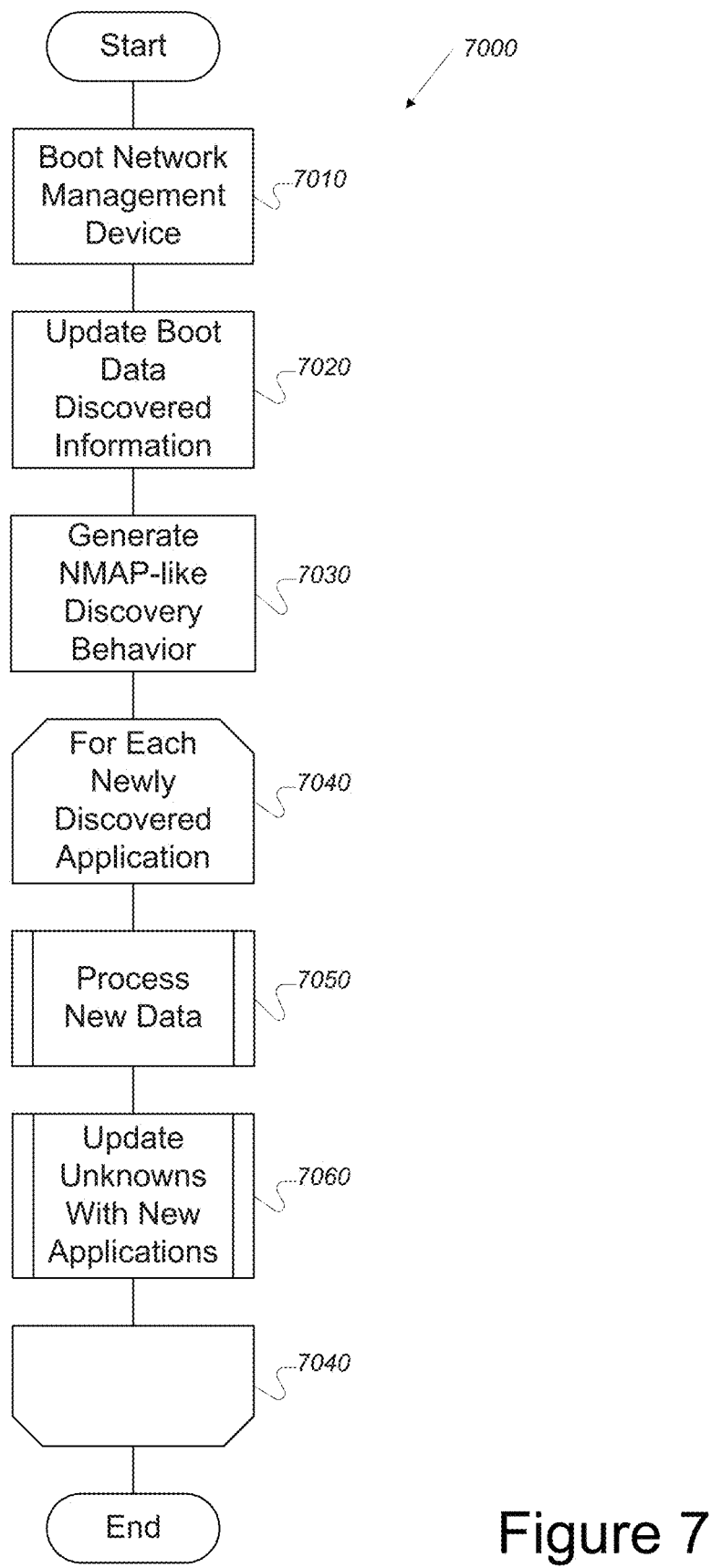

FIG. 7 is a flowchart illustrating one aspect of an exemplary process related to self-configuration in accordance with the illustrative technology herein.

Figure 8:
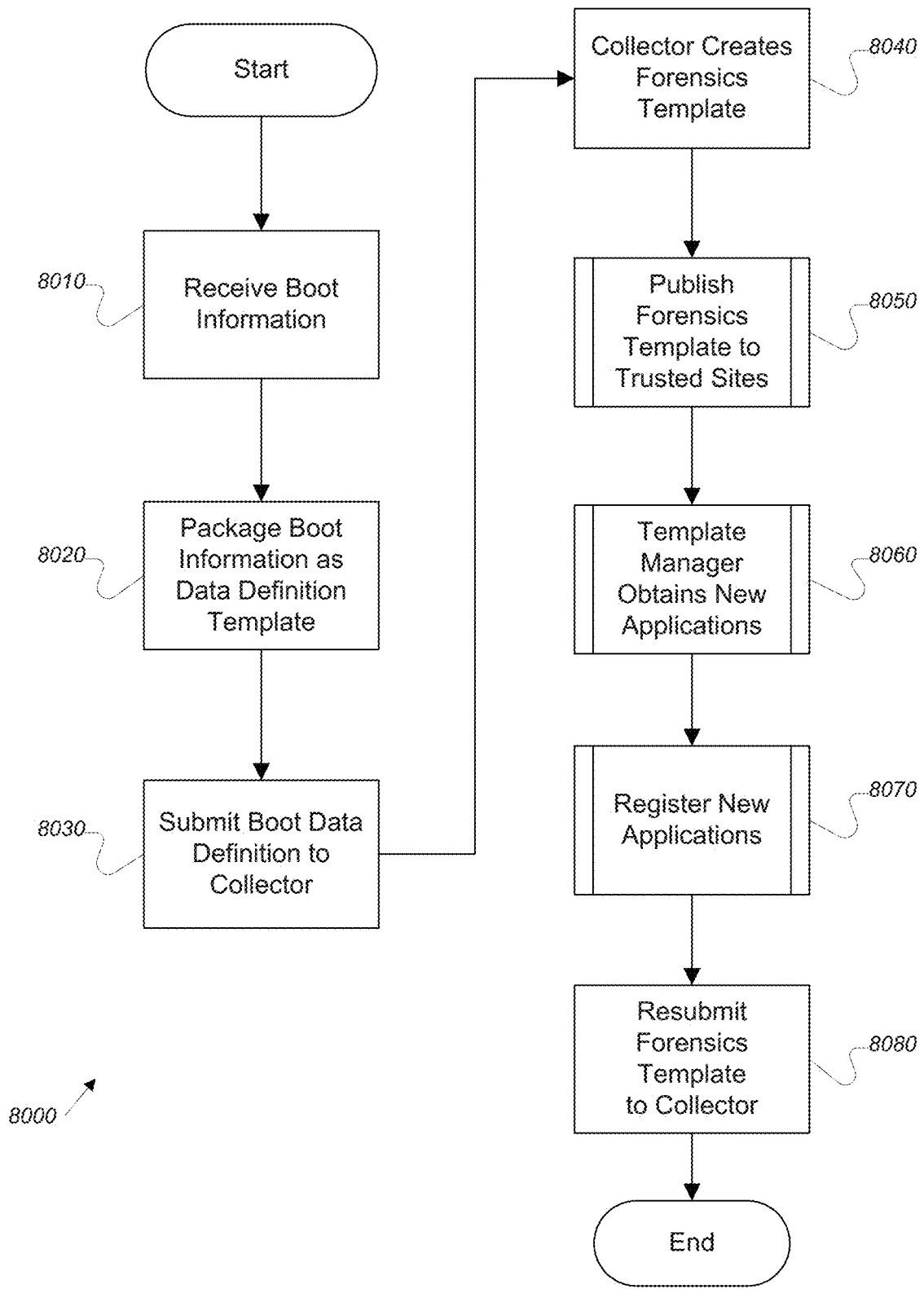

FIG. 8 is a flowchart illustrating another aspect of an exemplary process related to self-configuration in accordance with the illustrative technology herein.

Figure 9:
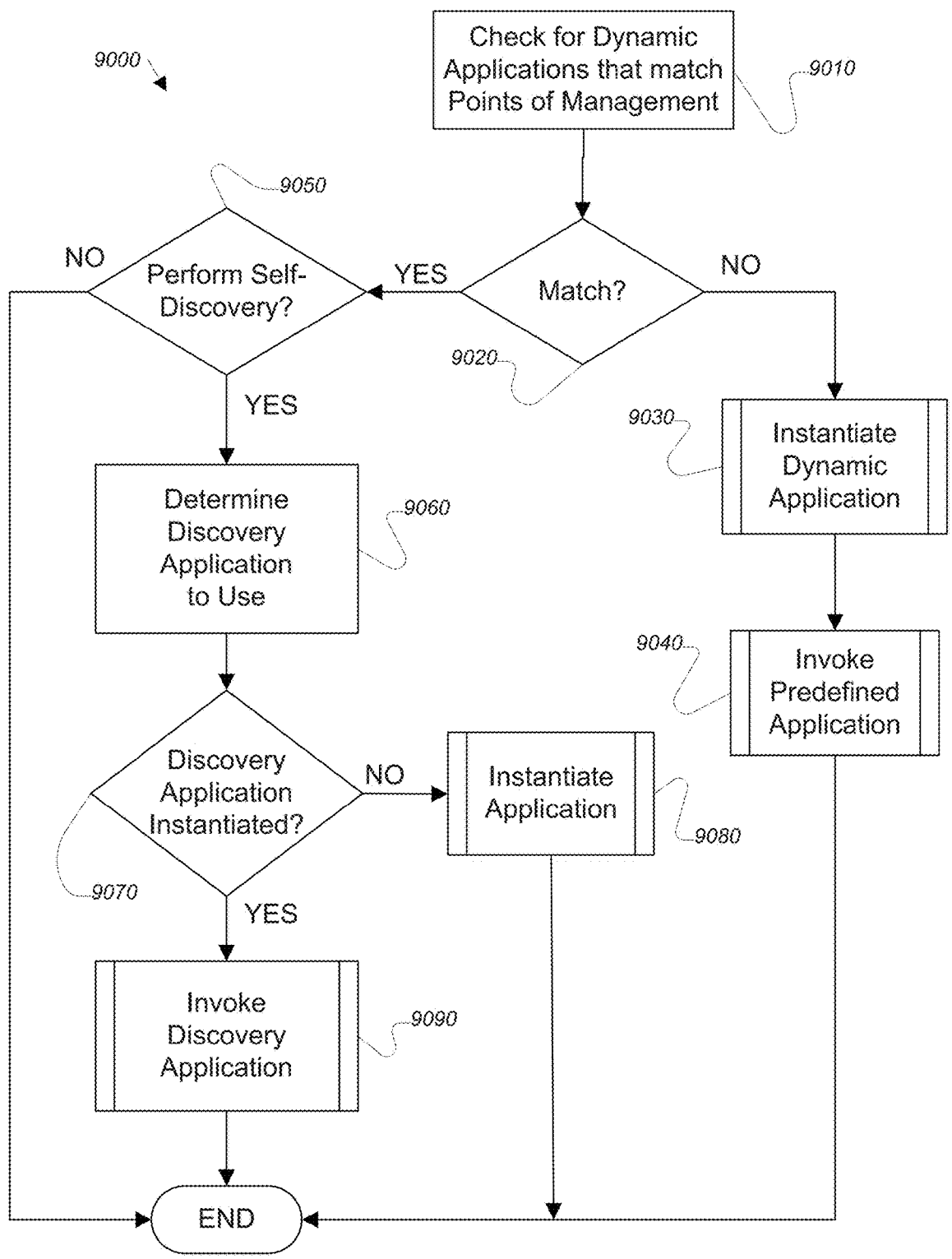
Figure 10:
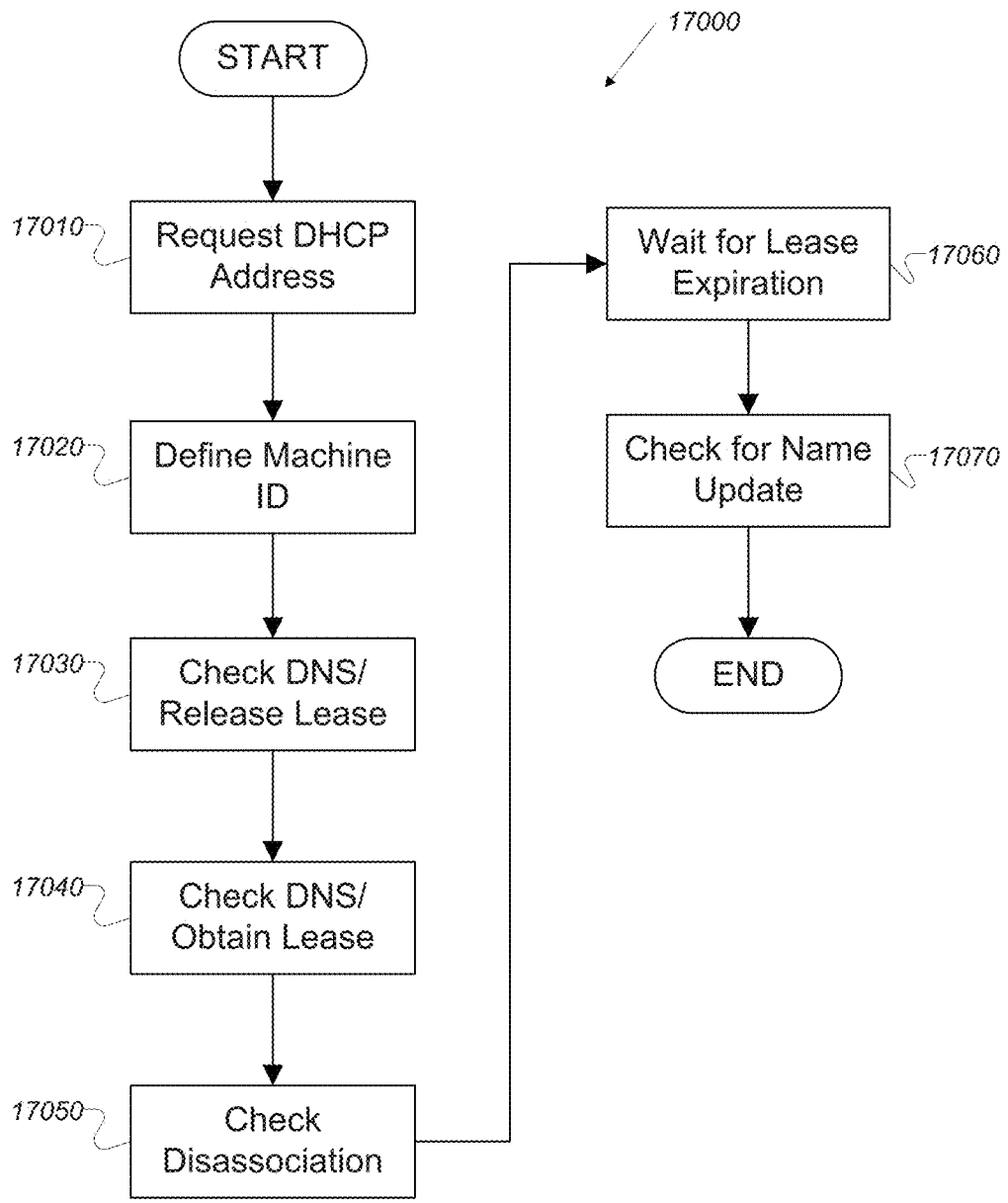

FIG. 9 is a flowchart illustrating an aspect of an exemplary process related to auto-discovery FIG. 10 is a flowchart illustrating an exemplary process for dynamic DNS QoS discovery in accordance with the exemplary, illustrative, technology herein.

Figure 11:
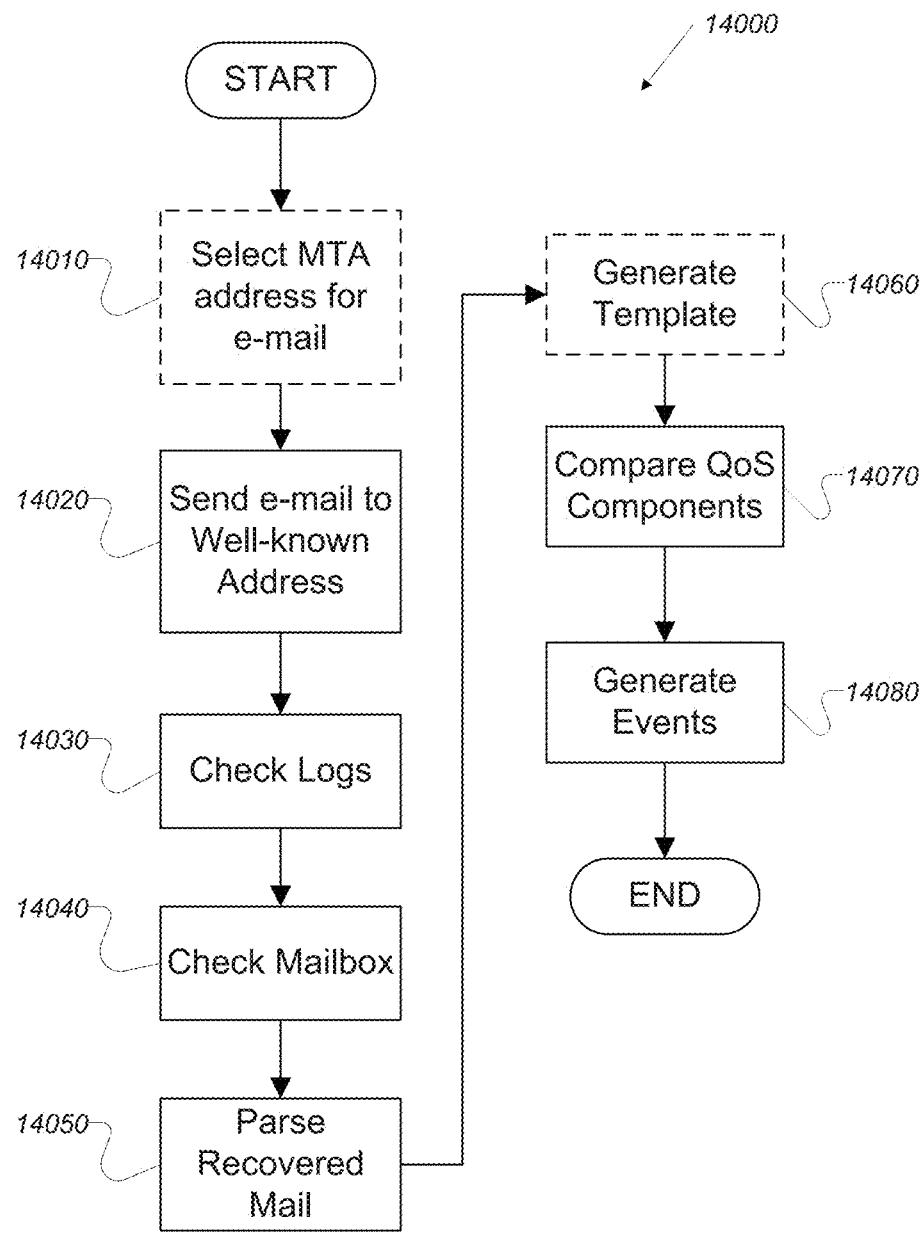

FIG. 11 is a flowchart illustrating an exemplary process for basic email QoS management in accordance with the exemplary, illustrative, technology herein.

Figure 12:
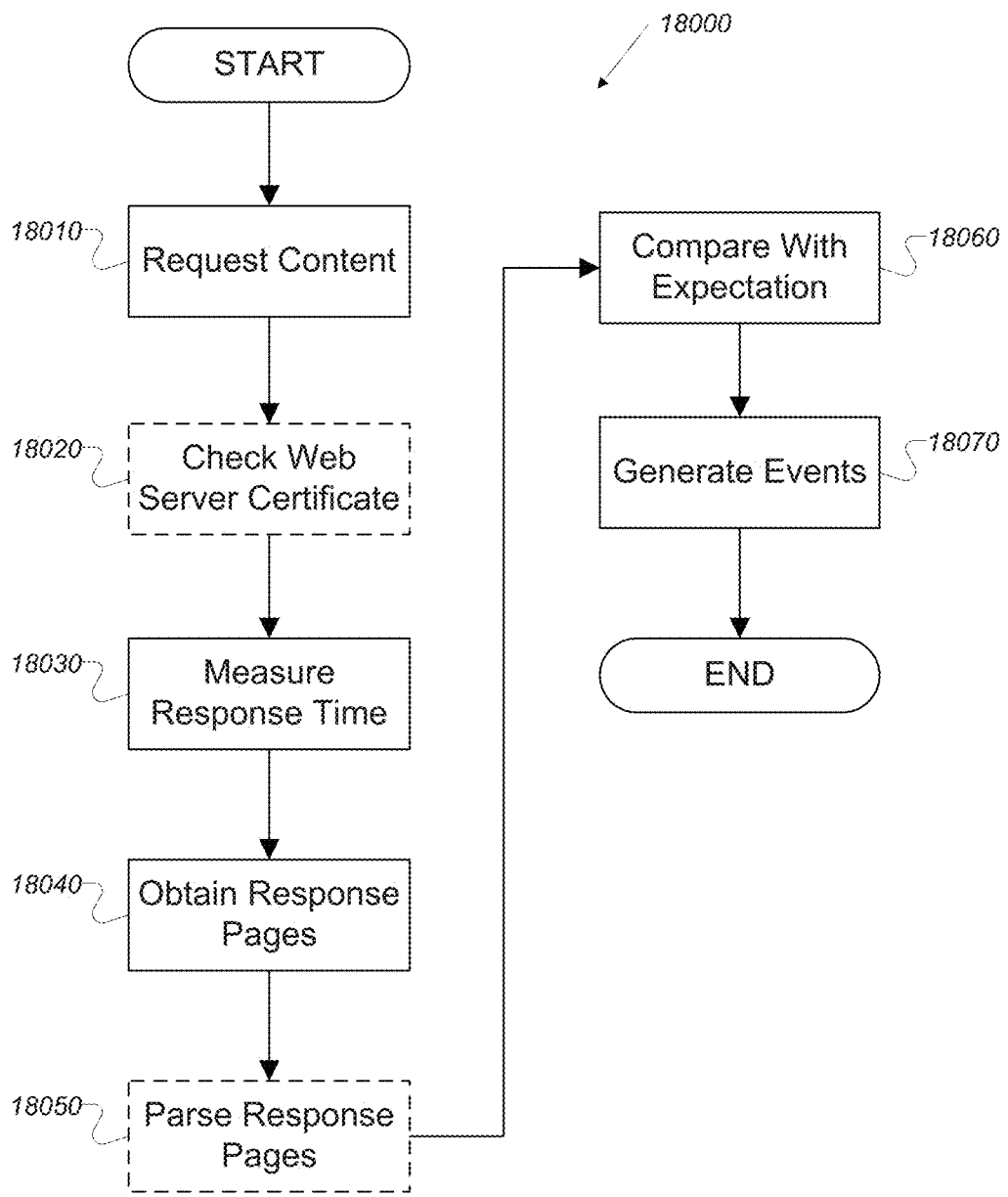

FIG. 12 is a flowchart illustrating an exemplary process for the operation of an HTTP/HTTPS QoS discovery application in accordance with the exemplary, illustrative, technology herein.

Figure 13A:
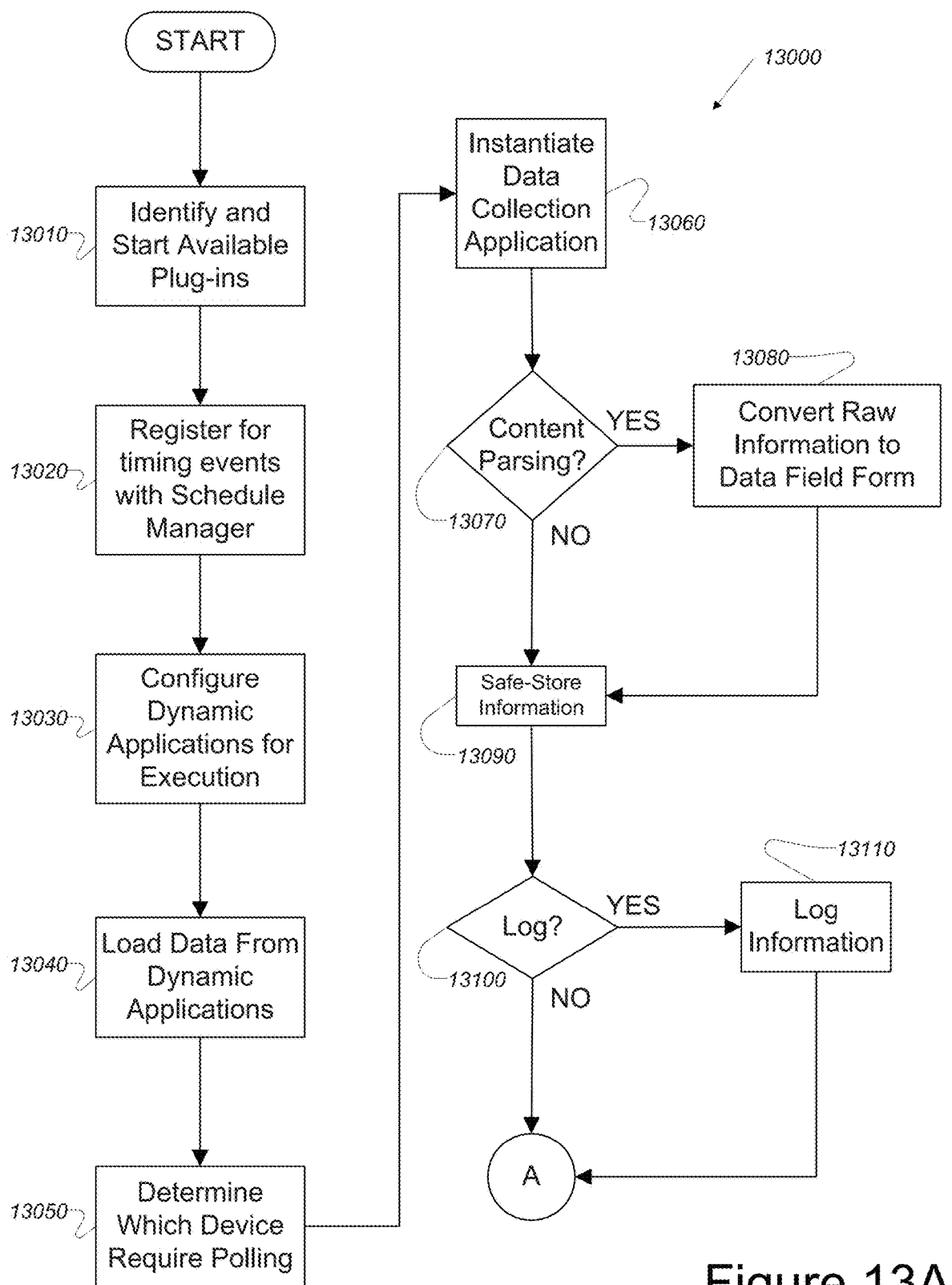
Figure 13B:
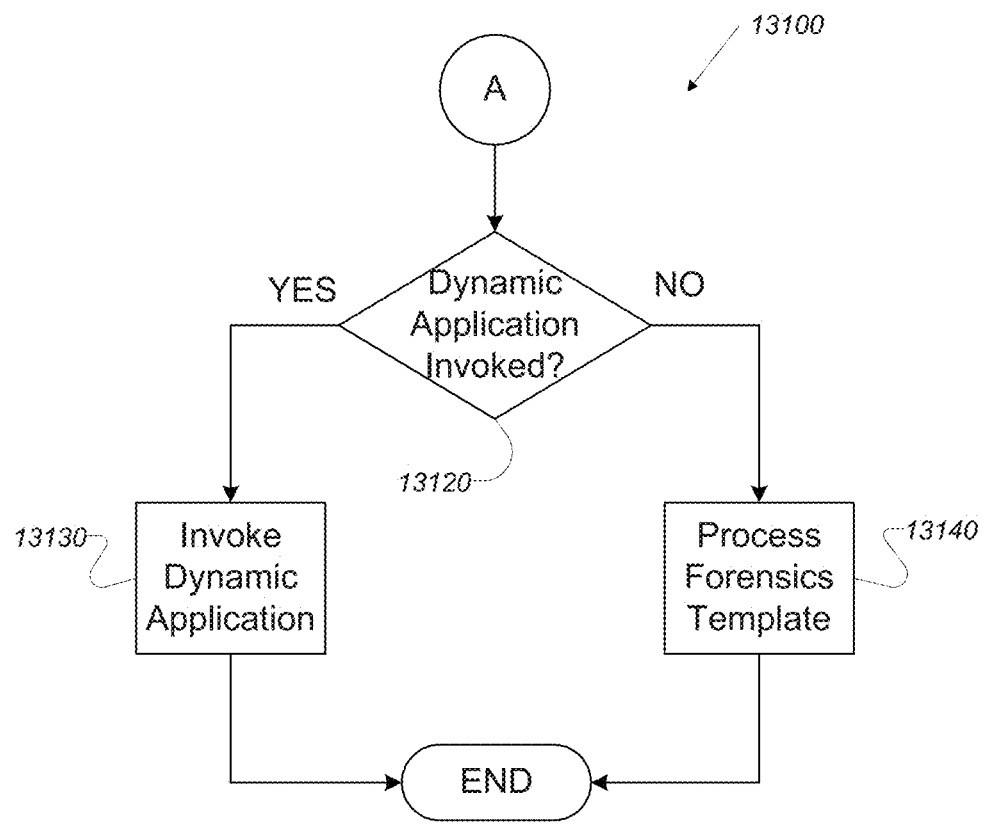

FIGS. 13A and 13B are flowcharts illustrating the operation of an exemplary, illustrative, non-limiting implementation of the Collector in accordance with the exemplary, illustrative, technology herein.

Figure 14:
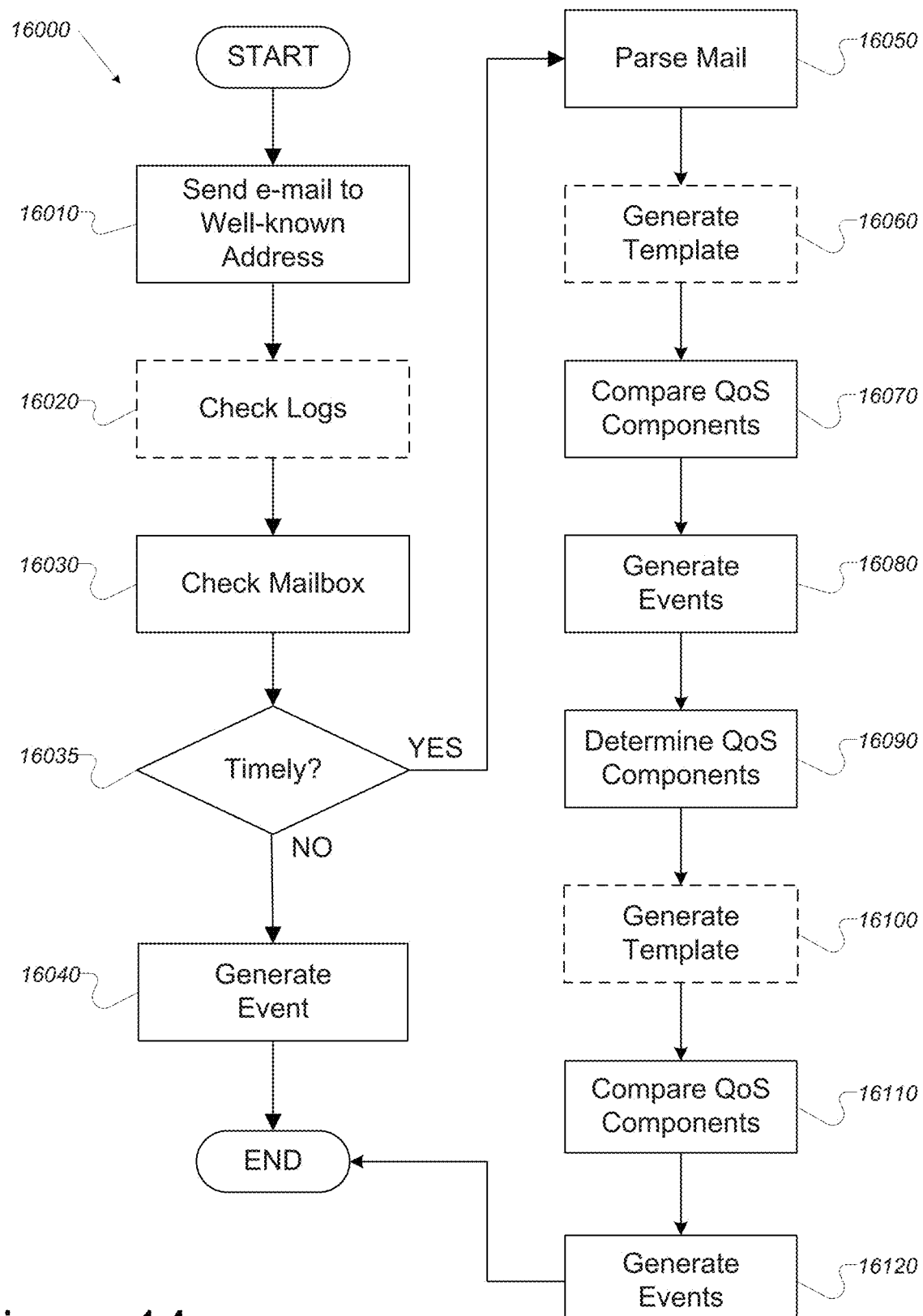

FIG. 14 is a flowchart illustrating an exemplary process for an SMTP-based content filtering QoS test in accordance with the exemplary, illustrative, technology herein.

5 DESCRIPTION OF SOME EXEMPLARY, NON-LIMITING IMPLEMENTATIONS 5.1 Overview

The technology illustrated herein addresses the deficiencies in the prior art by providing, in one aspect, methods, software, apparatus, and systems that automate the introduction and management of devices on networks that link various electronic devices, services, and applications. In another aspect, the technology described herein addresses the integration of business processes with the introduction and ongoing management of devices on networks linking various electronic devices, services, and applications. In still another aspect, the technology illustrated herein includes an architecture of interrelated network and device management applications that share information about the status of the network and the devices running thereon, and which interrelated network and device management applications dynamically collect information from devices present on the network and then utilize the collected information to make network and device management decisions. In some exemplary, illustrative, non-limiting implementations, the collection and sharing of information is automatic.

As used herein, a "network" is a configuration of devices and software that are in mutual communication and can exchange information, including data and instructions. Such communication can be accomplished either by the presence of a direct physical connection between devices (i.e., wired communication) or indirectly by electromagnetic communication (i.e., wireless communication), using whatever protocols are extant between the two devices. A network can include arbitrary numbers and types of devices, systems, and applications, which, in some exemplary, illustrative, non-limiting implementations, function in accordance with established policies so that the term "network" includes managed networks. Examples of devices, systems, and applications that can compose a network consistent with the technology described herein include, without limitation:

- Traditional network-based devices such as routers, switches, and hubs;
- Traditional network-based computing assets, such as servers and workstations;
- Traditional network links, including dedicated and dial-up connections and related devices (e.g., modems, concentrators, and the like);
- Industrial devices, such as those controlled by programmable logic controllers (PLCs), embedded computers, or other industrial controllers;
- Network services, such as Simple Object Access Protocol (SOAP)-based application servers, web services, network infrastructure services such as DNS and DHCP, and file sharing services;
- Applications, such as databases (e.g., such as sold commercially by Oracle (Redwood City, Calif.), IBM (Armonk, N.Y.), and Microsoft (Redmond, Wash.)), e-mail systems (e.g., sendmail, POP/IMAP); customer relationship management (CRM) systems, and enterprise management applications (e.g., such as sold commercially by PeopleSoft and SAP).
- Consumer appliances (e.g., cell phones, audio/visual equipment, home lighting controllers).

5.2 Exemplary System Architecture

Figure 1:
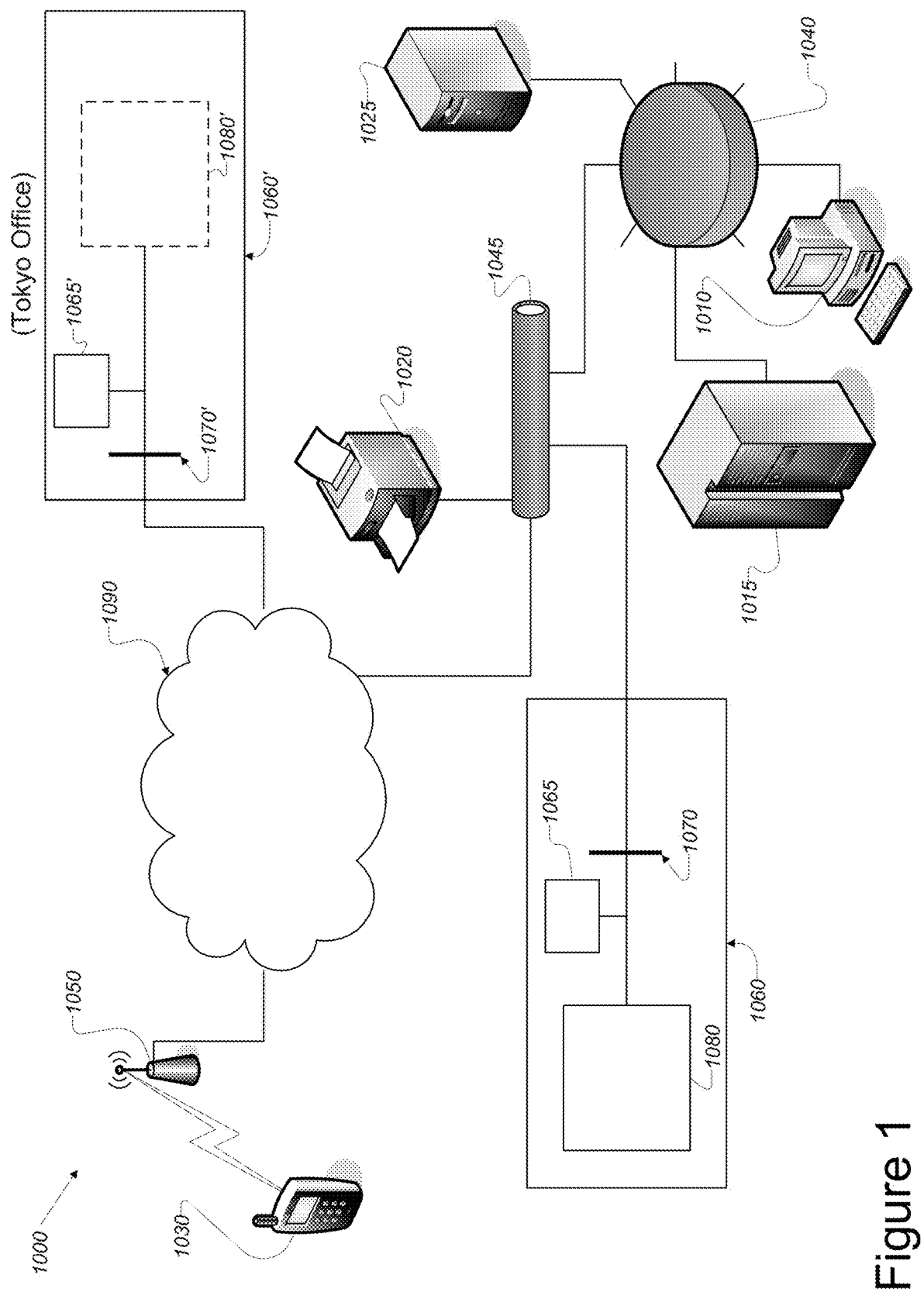
FIG. 1 shows a schematic diagram of a network to be managed in accordance with the exemplary illustrative technology herein.

FIG. 1 illustrates a network (1000) in accordance with the technology described herein by way of non-limiting example as will be appreciated by one having skill in the art. Network 1000 includes one or more devices in communication, including a personal computer (1010), a mainframe computer (1015) a printer (1020), a database server (1025), and a wireless device (1030). The devices can be connected (i.e., in communication) with each other using any known technology, such as a ring network (1040), an ethernet (1045), and a wireless access point (1050). The exemplary illustrative network architecture described in FIG. 1 also includes other, independent networks (1060, 1060' [in this example, the Tokyo office]), each of which may include a plurality of devices, including at least one instance of a network management device (1080, 1080') that is described in greater detail herein; various network apparatus including cables, switches, routers, and network servers and workstations (1065, 1065') that are indicated only generally; and a firewall or other security mechanism (1070, 1070'). Either network (or both) may comprise a remote version of a network management device as described herein, or it may not include an instance of the network management device at all (so long as at least one network management device is instantiated on the network). The networks and other devices illustrated in FIG. 1 can communicate over a wide area network ("WAN", 1090) that may connect still other additional networks and devices (not shown) with the illustrated devices and networks as will be appreciated by those having skill in the art. Any network or any subnetwork may be separated (i.e., made logically distinct) by additional network apparatus, including firewalls, routers, and the like, that do not explicitly pass network management traffic. All physical components and devices described with respect to FIG. 1 are of standard construction and operate as understood by those of skill in the art.

The network configuration can be either static (i.e., the devices that comprise the network do not change) or the configuration may be dynamic (i.e., devices may be connected to, or disconnected from, the network during operation). The technology described herein is useful for managing each type of network. Nevertheless, the technology described herein is especially useful in managing networks having dynamic configurations by virtue of the technology described herein to enable self-discovery as described in greater detail below.

A network management device may be deployed standalone, or as part of a set of network management device instances. Each network management device instance may comprise one or more network management device components as described below. Each component of the network management device that performs a well defined function. A network management device instance is preferably deployed as stand-alone network management device appliance, in which at least one network management device component is deployed operating within a network appliance. Alternate deployments such as server software installed on extant servers have been contemplated.

Multiple network management device instances may be logically combined in order to improve performance and availability of the network management features provided by the network management device(s).

Network management devices host one or more network management applications.

Application specifications are the mechanism by which network management device defines, instantiates, and invokes its management applications for devices, servers, services, and applications. Applications are defined and parameterized using Templates, Template fragments, and Policies as their specification elements. Application specifications are defined using application specification templates and template fragments and comprise the elements listed below.

| Element | Description |
| --- | --- |
| Instantiation conditions | Defines the data elements that must be visible at a Collector in order to require a dynamic application to manage the application |
| Data Storage Definition | Defines the configuration and requirements for the data store to be used by the application |
| Code specification | Specifies the application code required to instantiate the application |
| Data linkage definition | Defines the linkage between the application and the Collector |
| Invocation specification | Defines the execution environment and invocation specification for the application |
| Error handling specification | Defines the error handling steps to take. |

Applications may be optionally instantiated. An application is instantiated when it is enabled by policy and meets its specified instantiation conditions as defined within its application specification template. As template-based items, applications may be updated, in whole or in part, by the Template Manager under the control of the Configuration Policy. In one exemplary, illustrative, non-limiting implementation, if an application specification template is updated and at least one copy of the dynamic application has been instantiated, the Template Manager and Application Manager perform an "Update in Place" operation as described below.

In another exemplary, illustrative, non-limiting implementation, applications hosted on a network management device are classified as one of: embedded, pre-integrated, or dynamic as will be described below.

5.2.1 Embedded Applications

In one exemplary, illustrative, non-limiting implementation, the network management device includes embedded applications (2700), which are a class of applications that operate on the network management device. An embedded application is an application that is delivered as part of every instance of the network management device, and generally most or all of the network management device instances run at least a subset of the embedded applications. These applications provide a core framework within which the network management device operates and may distribute its information to other instances of the network management device.

The Configuration Policy, as described below, describes the configuration of the network management device embedded applications and their parameters.

5.2.2 Pre-Integrated Applications

A pre-integrated application is an application that is delivered as part of a network management device, but may be defined and configured to operate on some network management devices and not on others, depending upon the needs of the network management device operator. One such application is the DNS manager application. Not every network management device on a network requires a DNS manager, and there may be no DNS manager configured for a network if DNS is not managed using network management device.

The Configuration Policy, as described below, defines the configuration of the optional network management device pre-integrated applications and their parameters. Some example pre-integrated applications are listed below:

| Element | Description |
| --- | --- |
| DNS Manager | Manages DNS for managed OUs |
| DHCP manager | Manages DHCP for managed OUs |
| Failure manager | An application that manages failures (and simulated failures) |
| License Manager | Manages licenses for network management device and other products |
| Trouble Ticket Manager | Manages trouble tickets associated with managed objects |
| Log Manager | Manages logs |
| Asset Manager | Manages managed assets |

An advantage of network management device pre-integrated applications is cross-application information sharing and integrated search capabilities. The network management device can store management information about devices, services, and applications that it manages in one data store, and all pre-integrated applications may link to that specific copy of the information.

5.2.3 Dynamic Applications

Dynamic applications differ from embedded or pre-defined applications in that they are neither instantiated or invoked until a need for them is discovered. A dynamic application need not even be present on an instance of the network management device when the device is installed, rather the dynamic application may be automatically downloaded, installed, and integrated into the network management device on an as-needed basis. In some implementations, an entire dynamic application may be downloaded, installed, and integrated on the network management device; alternatively, in other implementations, portions of an application, template, or policy may be downloaded, installed, and integrated into a network management device.

5.2.4 Policies and Templates

Templates are uniquely identified, independent structures that define one or more aspects of a network management device's operation or configuration. Policies are specific instances of templates. Templates may be:

- Defined within a network management device instance
- Stored within a network management device instance
- Imported/Exported to/from a network management device instance in "normal" form
- Stored independently of a network management device instance
- Shared between network management device instances, either manually or automatically
- Manually or automatically constructed
- Sealed for integrity Templates are comprised of template elements. Each template element is a discrete data item or a collection of data items. A template fragment is a collection of template elements that have a common purpose and may be independently identified. A template fragment often meets the requirements of a template described above, although there is no requirement for a template fragment to meet all of the template requirements.

Policies define how the network management device is configured or will operate. For example, a Configuration Policy defines which applications may be hosted on a specific the network management device appliance. The Configuration Policy is defined in more detail below. Policy templates are pieces of a defined policy that have been abstracted so they may be shared between applications. A default policy template is one that is used if a specific template is not specified.

In one exemplary, illustrative, non-limiting implementation, templates are described using an XML-based "normal" form. One of skill in the art will understand that templates may be described using alternative data representations. (Templates and template elements may be defined using a DTD or schema-based description. An XML-based "normal" form is also a well-defined format that facilitates the exchange of templates between network management device instances. However, XML has significant overhead issues and is not always compatible with configurations and storage methods required for specific applications. In these cases, a template may be translated to a native format more conducive to its intended use. While in normal form, the XML-based standards such as those listed below may be used to describe the template's representation. Other standards may be utilized when a template is stored in other than normal form.

| Template Structure | Standard |
| --- | --- |
| Basic template structure | XML, as defined within this document and its appendices |
| Digital Signatures, Digests, etc | WS-Signature standard. |
| Conditional expressions | XQuery standard |
| External references, including service, template, schema, and other definitions | URI |

Templates and template fragments may be stored, transmitted, and represented in many forms, including: flat file, delimited files, tag-value pairs, binary format, LDAP, and data-store internal representations. For example, a template representation of a DNS server configuration may be defined by the operator using the XML "normal" form, or exported and shared between network manager device instances in this form, and converted to a flat file suitable for configuring the Unix Bind application when stored on a network manager device instance that is providing a DNS-style interface. Similarly, this template may be stored within an LDAP-style directory compatible with Microsoft Active Directory when the DNS server being managed is hosted on a Microsoft Windows Server.

Templates may define and store actual information in addition to specifying options and other configuration attributes. In their simplest form, templates may contain discrete information, such as configuration options and parameters. This use takes many forms, some examples of which include:

- Parameters to applications and/or application specifications,
- Result of a process that collects information, and
- Intermediate data interchange format In the exemplary normal form, this mechanism is straightforward. Template information is stored in-line to the normal form XML in accordance with the governing schema elements. For example, a template ID is specified as a TemplateID element within the schema.

An example data representation of a template ID might be represented as (in XML normal form):

<template> id=123456</template>

In another example, a Data Element Definition template is used to specify that the Collector (2720) will collect the OID tree (and values) from an SNMP-aware device. This type of specification is an exemplary, illustrative, non-limiting implementation of a Data Element Definition template that is described more generally below. Using the example, the data elements specified for collection might look like those shown below:

```
<OID id=1.3.5.7.9> </OID>
<OID id=1.3.5.78.10> </OID>
```

The resulting data collected by the Collector might be represented in an exemplary, illustrative, non-limiting implementation of a Data Storage Definition Template fragment as shown below, which is exemplary in nature and has additional materials removed for clarity.

```
<COLLECTOR id=....>
    <DEVICE ip=1.2.3.4 protocol=SNMP>
        <DATA>
            <OID id=1.3.5.7.9>Cisco 1200</OID>
            <OID id=1.3.5.78.10>IOS 12.2</OID>
        </DATA>
    </DEVICE>
</COLLECTOR>
```

Some uses of templates require the specification of partial results and patterns which are used by applications to match against information collected. This is particularly the case for elements such as a Data Element Definition Template or a Template Reference specification.

In normal form, queries can be represented using the XQuery standard. A query for a template with TemplateID="1234" could be represented as:

/Template/[TemplateID="1234"]

A more complex query for a device with an IP of 1.2.3.4 AND the port="UDP/161" is:

/Template/Device/[@ip=1.2.3.4 && !port="UDP/161"]

The specification for Template ID and Template Version ID are given below. Template ID's are uniquely assigned when they are created, for example, using a globally unique identifier such as those created using the DCE UUID or Microsoft's GUID algorithm. Unique ID generation algorithms are understood by those skilled in the art.

Templates, once they are uniquely identified, may be referenced by other templates. In addition, templates may reference executable code, images, web services, and other external systems and applications. In one exemplary, illustrative, non-limiting implementation, this is accomplished using the so-called URI, as defined by the W3C standards organization. URI format and semantics are defined in RFC 2396. Briefly, a URI defines a protocol part and a reference part. The protocol part defines the method or manner by which the reference is to be made. The network management device provides for the extension of the protocol part and the association of protocol parts with specific handlers using the Configuration Policy.

Used with the template data query scheme specified herein, the network management device templates provide a unified mechanism for specifying a reference to a desired component, either code, data, or other template. Under the URI protocol extension model, any of the conventions used in the various application deployment models may be used. The network management device reference specification section of a template identifies the calling convention and any required information.

For example, a network management device template may specify a specific application program (e.g., a code reference) implemented using Java as:

JAVA::/Myclass:myMethod

Furthermore, a network management device template may specify another piece of code as a web service defined by:

http://www.myserver.com/myservice?parameter1

A network management device is not limited in how it may specify a specific component and the parameters as long as this specification may be encoded in a standard normal form such as a URI. This method of specification can be extended using the Configuration Policy.

Network management device template and code references may include one of the following elements:
  an optional required ID,
  an optional wildcarded ID specifications A template' reference specification (whether for code, or for other templates) may specify the version of a component, including optional specifications of additional required or desired version Ids such as:
  an optional required version ID,
  an optional minimum required version ID,
  an optional maximum required version ID,
  an optional desired version ID,
  an optional minimum desired version ID,
  an optional maximum desired version ID,
  an optional wild-carded version ID specifications.

If the network management device is unable to meet the specified version specification, the specifying template also may specify an action to take. For example, a specification may require version 1.2 of a specific template, and the required action is to fail the operation if the required component is not available.

In one exemplary, illustrative, non-limiting implementation, the network management device supports hierarchical ordering of templates, such that a template may be assigned to a specific device, network, or within a nested organizational unit ("OU") structure. Templates assigned to the top level of the OU structure are considered "default" templates. When evaluating templates, the network management device evaluates templates based upon their location in the hierarchy, starting with the top level of the OU hierarchy.

For example, a template that defines the types of application that may be instantiated and the required authentication for these applications may be defined using a general purpose security assertion language such as the Security Assertion Markup Language (SAML). This template may be assigned as a "default" template by assigning it to the top level OU, or it may be assigned solely to systems that fall under the "Tokyo office" network. Similarly, it may be assigned to a physical resource such as a specific network management device instance, or to a network defined by a particular IP address range (in normal network form).

Templates may be mapped to OUs, devices, and networks by establishing the requisite association(s) in the Registry. If the OU structure is defined by a directory structure, templates may also be assigned as the value of specific distinguished name within the directory structure.

Templates in all forms may be shared between network management device instances. Some examples of information sharing methods include:
  Exporting the template into a "normal" form, manually moving the template to a second network management device, and importing the template,
  Loading the template to a data store on a first network management device instance, and replicating that data store to a second network management device instance using the Data Store Manager,
  Enabling template sharing between two network management device instances using the Template Manager.

Network management device templates may be manually exported from one network management device instance, stored independently in external storage systems, and later imported into other network management device instances. For network management device instances for which there is a relationship defined that supports this activity, the export, import, and sharing of templates may be automated. An embedded application, the Template Manager, permits a network management device operator to perform the export/imports of templates on an ad-hoc, scheduled, or subscription basis. More information on the Template Manager is provided below. The Data Store Manager, another embedded application, supports replication of data stores and is described more fully below.

In one example, a template specifies an aspect of the operation of a network management device instance. Examples of some common template elements are described below and used in additional exemplary template descriptions herein.

| Element | Description |
| --- | --- |
| Template Indicator | Indicator of start/end of template specification |
| Template Reference | Reference to another template |
| Template Name | Descriptive name of template |
| Template ID | Unique machine readable ID (a TID) |
| Template Version ID | Descriptive version of template (e.g. 1.3) |
| Authentication specification | Authenticity specification, in XML. Generally an XML Signature. |

A Template Indicator defines the start or end of a template specification. It is a unique tag and may not have any data associated with it. It may have an optional attribute called "descr" that contains a text description of the template contents. For example, the attribute may be defined as shown in the example below:
    <TEMPLATE descr="working template created on 1/1/02">

A Template Reference references an instance of another template, either by Template ID or a combination of Template Name and Template Version ID. In one exemplary, illustrative, non-limiting implementation, optional parameters, (e.g., an internal flag within the reference) determine how the reference is interpreted, how version ID's are managed, and the action(s) to take if the template reference cannot be satisfied. In another exemplary, illustrative, non-limiting implementation, a template reference permits templates to be specified in a non-hierarchical format, and supports independent delivery of templates from external sources. For example, a template reference may specify that a template with a Template ID of "123456" is required.
    <TEMPLATE-REFERENCE>123456</TEMPLATE-REFERENCE>

In normal form exemplary, illustrative, non-limiting implementation, a Template Reference may be represented by a fully or partially specified URI.

A Template Name is a descriptive name for a template. An example of a suitable template name is a name that is descriptive of the template, e.g., the Template Name can be "Microsoft Windows Server 2003" or "Chris's new template."

A Template ID is a unique ID used to uniquely identify a template and to permit automated references to a particular template. An example of a useful template ID is one that uniquely identifies a specific template.

A Template Version ID is a descriptive name for describing the version of the template. It is used to distinguish between multiple copies of templates with the same Template Name. The format of a Template Version ID may be implementation defined. In a first example, a Template Version ID may be an integer, and may be compared in the normal manner that integers are compared. In a second example, a Template Version ID may be a string comprising dot-concatenated numbers, which are compared field by field. An example of this type of Template Version ID is shown below:

1.1.2 is less than 1.1.3, 1.2.0, and greater than 1.0.9 and 1.1.1

Templates and template fragments can be described by a template fragment name. The fragment name is not an element of the template, rather is a shorthand description used to describe the contents and use of the template fragment. As such, the template fragment concept is dynamically extensible to include additional types not described in this document as additional applications are defined and deployed on the network management device. Below are some exemplary template fragments.

| Template Fragment Name | Description |
| --- | --- |
| Classification Signature | Defines a device classification specification to be used by a Classifier |
| Data Element Definition | Defines information to be collected by the Collector |
| Data Storage | Defines information to be stored into a data store |
| Application Code | Defines the application code to be executed |
| Policy | Defines information that specifies how a network management device should operate. Also used to specify the expected or required configuration of devices, services, and applications managed by a network management device. |
| Access Credentials | Defines access credentials required |

A Classification Signature Template defines information used by several areas within the network management device. Classification Signature Templates are used as input by a Classifier to make determinations about the presence or absence of a specific device. For example, a Classification Signature Template may define that a SNMP enabled device will require the following elements to be present in order to be considered a match:
    an SNMP agent present on the system (e.g., port 161 is open)
    an SNMP get command produces an OID of 1.3.6.1.4.1.49 (e.g., Chipcom)
    an SNMP get command produces an OID of 1.3.6.1.4.1.49.345 is present and has the text value of "widget" (e.g., Chipcom device type name that self describes it as a Chipcom widget)

Thus, SNMP information collected from a device that matches this specification is considered to be a Chipcom device.

Classification Signature Templates are also referred to herein as "Instantiation Conditions Templates." An example Classification Signature Template comprises the elements listed below:

| Element | Description |
| --- | --- |
| Template Indicator | Indicator of start/end of template specification |
| Template Name | Descriptive name of template |
| Template ID | Unique machine readable ID (a TID) |
| Template Version ID | Descriptive version of template (e.g. 1.3) |
| Authentication specification | Optional authentication specification |
| Classification type | Type hint for matching with Classifiers |
| Classification specification | An XQuery specification for classification |

The Classification Specification describes the "Point of Management" used to classify a device. In the "normal form" example, it can be structured as an XQuery specification using a schema provided in the "Point of Management Template". The Classifier portion of the Collector uses the Classification specification. The Classification type value is used as a "hint" to associate classification specifications with specific Classifier instances. Note that the classification type may be dynamically determined by inspecting the classification specification, or it may be statically determined by adding a tag and value pair.

An example of a Classification Type is "SNMP" and an example of a Classification Specification that describes a device at IP=1.2.3.4, that further supports an SNMP agent present on the system (e.g., port 161 is open)

an SNMP get command produces an OID of 1.3.6.1.4.1.49 (e.g., Chipcom)

an SNMP get command produces an OID of 1.3.6.1.4.1.49.345 is present and has the text value of "widget" (e.g., Chipcom device type name that self describes it as a Chipcom widget)

is shown below:

/Template/Device[ip=1.2.3.4 AND port="UDP/161"]
/Template/SNMP[@oid=1.3.6.1.4.1.49]
/Template/SNMP[@oid=1.3.6.1.4.1.49.345 AND self( )="widget"]

A Data Element Definition Template defines information used by the network management device to name the data elements that should be collected from devices, applications, and services under management. In one exemplary, illustrative, non-limiting implementation, it is structured as a "tag only" XML document that conforms to the XML schema provided by a "Point of Management Template". For example, the Data Element Definition Template may define that a SNMP enabled device should collect the following values:

| Address = *, port = 161 | an SNMP aware client |
| OID = 1.3.6.1.4.1.333 | Uptime |
| OID = 1.3.6.1.4.1.334 | Security breach count. |

An example Data Element Definition Template comprises the elements listed below:

| Element | Description |
| --- | --- |
| Template Indicator | Indicator of start/end of template specification |
| Template Name | Descriptive name of template |
| Template ID | Unique machine readable ID (a TID) |
| Template Version ID | Descriptive version of template (e.g. 1.3) |
| Authentication specification | Specification for authentication |
| Data Element Specification | A tag-only XML document that names the data elements to be collected. |

The Data Element Specification defines a list of data elements when such a list is required. An example of a data element specification is given above.

A Data Definition Template provides a mechanism for representing data collected by the network management device. In one example use, the form selected is XML that conforms to a schema provided by a "Point of Management Template". An example Data Definition Template comprises the elements shown below.

| Element | Description |
| --- | --- |
| Template Indicator | Indicator of start/end of template specification |

-continued

| Element | Description |
| --- | --- |
| Template Name | Descriptive name of template |
| Template ID | Unique machine readable ID (a TID) |
| Template Version ID | Descriptive version of template (e.g. 1.3) |
| Authentication specification | Specification for authentication |
| Data | Data |

The Data element defines the stored information. In one exemplary, illustrative, non-limiting implementation, it is an XML structure, with collected data expressed as the values associated with specific element tags.

In some cases, a Data Definition Template is called a Forensics Template. A Forensics Template is the name for the unprocessable data collected by a Collector when packaged into a portable data structure for sharing between network management device instances. Unprocessable data may be shared in support of automated collection, forwarding, and classification of previously unrecognized information, and the subsequent reduction of this unprocessable information to a classification signature template.

The Data Storage Definition Template describes a data store instance, its data structures, optional conversion specifications to convert from previous version of the data store, and authentication information. A Data Storage Definition Template is used by the Data Store Manager as part of data store management activities.

| Element | Description |
| --- | --- |
| Template Indicator | Indicator of start/end of template specification |
| Template Name | Descriptive name of template |
| Template ID | Unique machine readable ID (a TID) |
| Template Version ID | Descriptive version of template (e.g. 1.3) |
| Authentication specification | Specification for authentication |
| Data Storage Definition | URI that describes the data store |
| Authorization Credential | Optional authorization credential for access to data store |
| Creation Application | Link to the network management device application that will create the data store. Generally, a link to the appropriate data store manager. |
| Update Application | Link to the network management device application that will update the data store to the newest version. Generally, a link to the appropriate data store manager. |
| Update Specification | Specification to use in order to update the data store to a new version. |
| Delete Application | Link to the network management device application that will delete the data store and the data contained therein. Generally, a link to the appropriate data store manager. |

The Data Storage Definition describes a data store service to be used. In one example, a Data Storage Definition Element is encoded as a URI. Note that a URI provides mechanisms for defining protocol, network machine path, directory path, and optional parameters. The Data Storage Definition may thus describe specifications to any arbitrary storage system, which includes storage mechanisms such as:

Directory structures (e.g., LDAP)
MIBs
Databases
Logging systems
Storage service (SOAP-based)

The Authorization Credential describes the credential to be used to access the data store. In one example, the Authorization Credential is represented in SAML.

The Creation, Update, and Delete Application definitions are references to applications that manage a specific data store. Generally, these are defined as references to a data store manager that manipulates the specific type of data store desired. The Update Specification element is a translation specification that is used by the application referenced in the Update Application element to migrate the data from a first data store to a second data store. The Update Application and Update Specification are used when a data store must be updated and previously stored data retained.

An Application Code Definition Template specifies the applications code (component or application) to be used. The template contains a component reference or the actual application component

| Element | Description |
| --- | --- |
| Template Indicator | Indicator of start/end of template specification |
| Template Name | Descriptive name of template |
| Template ID | Unique machine readable ID (a TID) |
| Template Version ID | Descriptive version of template (e.g. 1.3) |
| Authentication specification | Specification for authentication |
| Component reference | Component reference |
| Component | Actual component |

The Component Reference element specifies the component to be used, but does not actually provide the component. A component reference may include execution subsystem specification (e.g., Java 1.4RE).

The Component element contains the component to be used.

A Point of Management Template describes known Point of Management elements and provides a mapping between Discovery Applications and defined Point of Management Elements. In one example, a Point of Management template is an XML schema. The Point of Management Template serves the following purposes:

Defines Point of Management elements, which then serve as the vocabulary for auto-discovery, data collection, and related network management device functions Provides suggested associations between Point of Management elements and Discovery Applications that may be used to determine additional information about the device, application, service, or business process associated with a specific Point of Management.

In a first example, a "Point of Management" is an attribute or data element that may be discovered, and thus used as reference point to make management decisions upon. Each Point of Management may have a name, a description of their attribute, and an optional reference to a discovery application. For example, a point of management might be a well-known network port. This exemplary Point of Management might define:

A network port as TCP:53,
A description as "DNS server,"
A reference to a DNS discovery application.

In a second example, a point of management might be:
A network port as UDP:161,
An OID of x.y.z.55,
A description of "CISCO router,"
A reference to the SNMP discovery application with a data specification of the additional OID's that should be collected from the router using SNMP.

This exemplary Point of Management defines a SNMP enabled device in which an OID of x.y.z.55 was discovered. The Point of Management references an SNMP discovery application that can interrogate the device using SNMP, and the parameters to be interrogated for.

The network management device's auto-discovery mechanism uses Point of Management template(s) as the vocabulary specification and a database of classification signature templates that indicate the presence of a specific type or class of device. For example, a device signature may comprise the following Point of Management:

Port ID with a server running on it (e.g., an open port),
An SNMP OID value in the vendor specific value of the MIB that indicates manufacturer,
An Ethernet adapter ID indicating manufacturer of the Ethernet card,
An SNMP OID value that indicates the operating system running on the device.

Updating the template that identifies and describes these points of management may extend the universe of known Point of Management. Some illustrative, non-limiting examples of Point of Management elements are listed below:

| SNMP Information | Description/Example(s) |
| --- | --- |
| Specific SNMP OIDs | Example 1<br>SNMP sysObjectID (.1.3.6.1.2.1.1.2.0)<br>system.sysObjectID.0 = OID: enterprises.ucdavis.350.10<br>system.sysDescr.0 = Linux em7demo 2.4.22-1.2115.nptl #1 Wed Oct 29 15:42:51 EST 2003 i686 |
| SNMP application signatures | Application specific SNMP data returned in response to SNMP get requests, for example, .1.3.6.1.4.1.94.1.21.1.1.1 indicates the device being managed is a Nokia firewall appliance. |
| WBEM (Web Based Enterprise Management/WMI information | Microsoft systems provides signature information via WMI |
| Hardware characteristics | Certain device types may be classified by hardware characteristics. Broad examples of this include:<br>  A device with more than 8 interfaces likely has switch capabilities<br>  A device with a hard disk and a file system is likely a computer system of some type |
| Network port(s) open | A TCP or UDP port that is associated with a specific application or service<br>Examples include:<br>TCP port 1352 is the Notes RPC service. Existence of this open port on a server generally indicates Lotus Notes/Domino application server is installed and running |

| SNMP Information | Description/Example(s) |
| --- | --- |
| | TCP port 135 is the Windows RPC service. Existence of this open port on a server generally indicates the server is running a Microsoft Windows based Operating System. Some applications can be recognized by a group of open ports. Examples include: The ports 110 (POP3), 143(IMAP) and 25(SMTP) open on a server signify standard unencrypted mail services. This can be refined further by examination of transaction signature responses on each of those ports. |
| Transaction signatures | Interaction with a service operating on a device may identify information about a service, including the software being used, patch levels, and configuration information. |
| Installed software | Most SNMP/WBEM enabled devices provide a basic list of installed software. |
| Running software | Most SNMP/WBEM enabled devices provide a basic list of running software, |

Network management device templates may associate specific servers, services, and applications with a plurality of other servers, services, and applications, and as a result of this association, a network management device instance is able to identify sets of services that provide:

Redundancy of a specific service, where the template defines sets of alternate servers, services, and applications.

Relatedness and root cause of failure, where the template defines sets of servers, services, and applications that depend upon each other. For example, the failure of a database may render unusable a web service that depends upon that database. The template may describe that dependency.

Relatedness and requirements template fragments describe the relationship(s) between servers, services, and applications (and subcomponents of each of these) by identifying server(s), service(s), and application(s) using a Point of Management (a unique feature of a manageable device, e.g., an OID) template, and specifying the relationship (e.g., required, copy, depends upon) with another point-of-management template.

User templates describe user-specific rights and privileges, and carry or reference an authorization specification and a set of ACLS in the form of a SAML expression. A user template may be used in describing parts of the registry data set. Specifically, a user template may be used to describe a row or rows in the user table within the Registry.

An organizational template serves the same function as user template, but is assigned at OU level instead a user level. Specifically, an organizational template may be used to specify a row or rows in the OU table within the registry.

A Content Parsing Template contains information used in the parsing of received information during the rendering of events. The Content Parsing Template may contain a regular expression, such as those used by common utilities such as grep, or it may contain more complex parsing instructions such as those found in an XSLT template.

5.3 Exemplary Network Management Device

Figure 2:
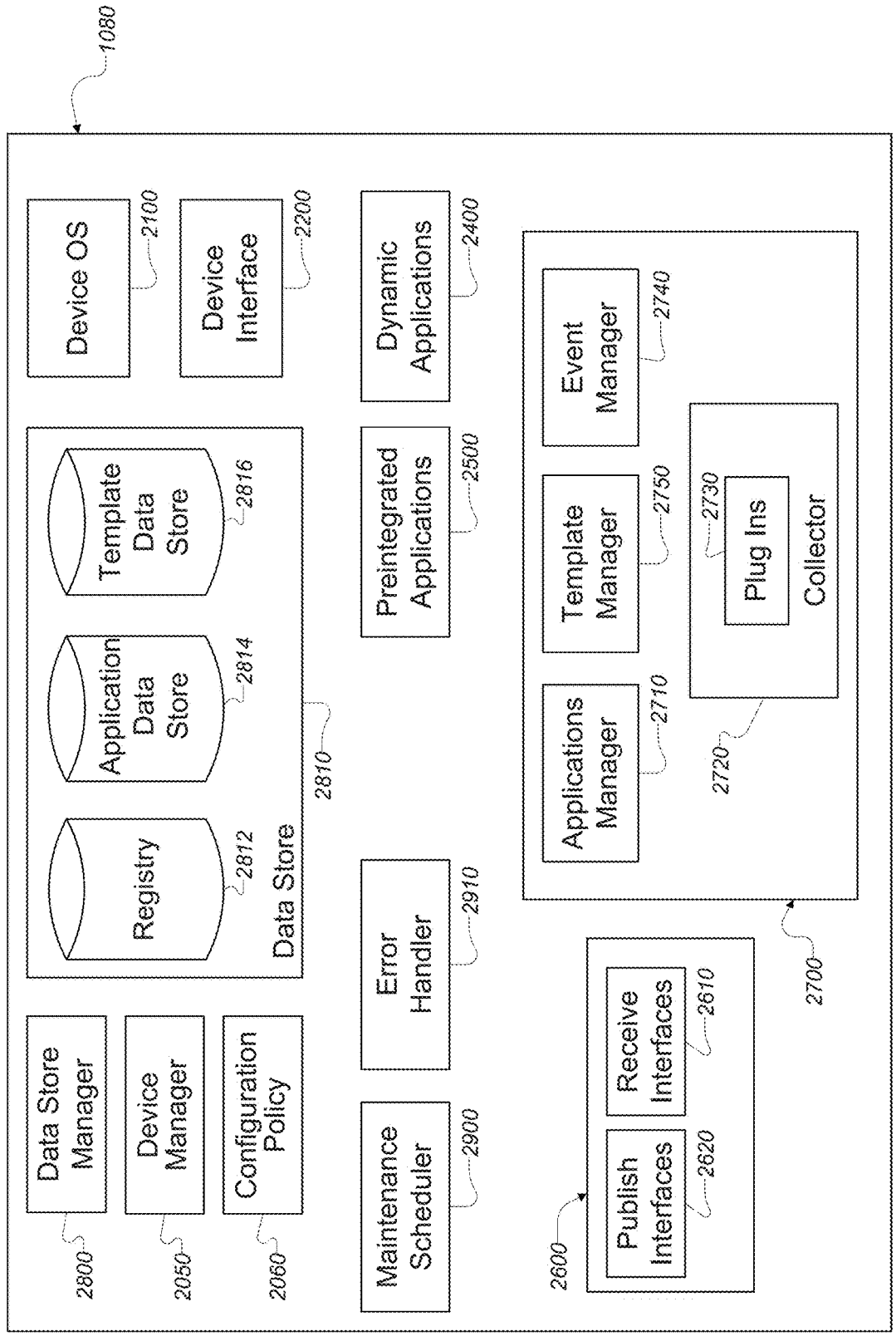
FIG. 2 shows a schematic diagram of a network management device in accordance with the illustrative technology herein.

One exemplary, illustrative, non-limiting implementation of a network management device (e.g., 1080) is described in greater detail at 1080 in FIG. 2. In one exemplary, illustrative, non-limiting implementation of the technology described herein, the network management device is a network appliance. However, those having skill in the art will recognize other, equally functional, implementations may include the network management device running as an application on a server or workstation device.

5.3.1 Operating System

As illustrated in FIG. 2, the network management device includes a device operating system (2100), of standard construction known to those having skill in the art, such as, for example without limitation, the WINDOWS operating system available from Microsoft Corporation (Redmond, Wash.), UNIX, LINUX, or MACOS (Apple Computer, Cupertino, Calif.). Still other devices may not have an operating system per se, but instead provide an environment for executing coded instructions or interpreted programs (e.g., Java programs). In such cases, the execution environment is considered to be acting as the operating system. The network management device also includes at least one device interface (2200) that provides a mechanism for converting data to signals compatible with one or more devices on the network. The device interface may implement wired- or wireless communications protocols. A non-limiting example of a wired communications protocol is TCP/IP, operating over Ethernet. A non-limiting example of a wireless protocol is TCP/IP over 802.11g. In one exemplary, illustrative, non-limiting implementation, the selection and management of the device interface is made under the control of the device operating system. Each network management device available on the network may be constructed with one or more communications interfaces that enable the network management device to simultaneously communicate on multiple networks.

5.3.2 Pre-Integrated Applications 2500

In addition to the embedded applications, the network management device supports numerous pre-integrated applications, examples of which include:
DNS
DHCP
Trouble ticket management
Asset manager
License manager
Log manager
Failure manager 5.3.2.1 DNS Manager In one exemplary, illustrative, non-limiting implementation, a network management device supports an internal DNS (bind) server for use in environments that do not already support their own pre-existing DNS system.

There are several advantages to a network management device providing DNS service for a network, including:
Pre-integration with trouble tickets and asset management applications (IP is defined in one place)
Integrated QoS management without the need for an additional dynamic application The DNS manager permits the network management device operator to define DNS zones, associate them with OUs, and then define and manage these zones and DNS names/IPs from the user interface.

The DNS manager integrates with the Asset Manager, DHCP Manager, License Manager, and other network management device pre-integrated applications.

5.3.2.2 DHCP Manager

In one exemplary, illustrative, non-limiting implementation, a network management device supports an internal DHCP server for use in deployments that do not already support their own pre-existing DHCP system.

There are several advantages to a network management device providing DHCP service for a network, including:
- Pre-integration with trouble tickets and asset management applications (IP is defined in one place)
- Additional data collection capabilities (e.g., MAC for network devices)
- Integrated QoS management with the need for an additional dynamic application

5.3.2.3 Trouble Ticket Manager

The Trouble Ticket Manager is a pre-integrated application that provides trouble ticket tracking in association with other network management device applications. It is pre-integrated with the network management device application so that events, log messages, and various dynamic applications can create trouble tickets as part of the set of permitted applications. This functionality reduces the management overhead of network management device compared to other non-integrated applications.

5.3.2.4 Asset Manager

The network management device Asset Manager is a pre-integrated application that provides a user interface and management for one or more data stores containing Asset information. Asset information includes device, service, and application information collected from the network. The network management device Asset Manager can manage multiple data stores, and link between a specific asset records in specific data stores.

The Asset Manager associates devices, applications, and services discovered during auto-discovery processes and maintains lists of known software installed and/or running on a specific device. The inventory information is updated each time the device is processed, and differences in configuration may spawn events that require operator intervention. A network management device may manage the configurations of devices under management by taking the applications and system configurations identified on the device by a discovery application, and comparing the identified information with one or more templates that specify required or desired configurations. Such configurations may be specified as a series of points-of-management. The Asset Manager permits authorized operators to create configuration policies that may be applied to devices, classes of devices, applications, or services to enforce configuration management.

The Asset Manager also associates and manages the association between OIDs and asset fields maintained within the Asset Manager. Using a Data Element Definition template fragment and the Data Storage Definition defined for the application, the Asset Manager supports the association between a device's OID and a field associated with an asset record. This technique permits arbitrary OIDs or other device attributes to be associated with all devices of a specific class, and to promote the visibility of these attributes to the asset manager user interface.

A network management device may thus use its template capability to define desired or required system configurations, and to optionally define undesirable system configurations or vulnerabilities, and to take actions to mitigate network and system configuration defects or vulnerabilities based upon the information discovered. For example, a PC may be installed within a network management device managed network. When this PC is discovered by a network management device instance and the system is mapped by an appropriate dynamic application, the network management device instance may take actions to enable or isolate the PC from the network. In the enable case, the network management device instance may adjust the configuration of a network component such as a firewall, switch, or router to permit network traffic to flow between the PC and the rest of the network. Similarly, if a PC is discovered that has vulnerabilities, it may be dynamically isolated from the network by the network management device instance reconfiguring a network component to partially or fully block network traffic. For instance, if a network management device instance finds a PC is sharing its C drive using an NTFS share, and these shares are not permitted, the network management device may cause a filtering rule to be applied at the local router to block access to the C drive without blocking access to other, permitted services. Alternatively, the network management device may apply a second filtering rule that blocks all network traffic to the specific device. The actions of the network management device in response to such a discovery are governed by the results of the applicable template, and the dynamic application that is subsequently invoked.

An Asset Manager provides the following services:

| Name | Description |
|---|---|
| Create | Create an asset to be managed |
| Delete | Delete an asset under management |
| Manage Monitoring | Enable/disable management, configure management options |
| Search | Search for assets |

The Create operation is the process by which the Asset Manager creates an asset record in the Asset Manager data store, associates the asset with a device, application, or service, and optionally configures monitoring of that asset. In one exemplary, illustrative, non-limiting implementation, the Create process registers the asset record in the data store appropriate for the assets class of device and then populates the asset record with default values as specified for the device classification. The Create process then initiates a device discovery operation, which initiates an auto-discovery upon the device being added. Finally, the Create process instantiates a monitoring dynamic application based upon the known device attributes and then terminates.

The Delete operation is the process by which the Asset Manager removes an asset record from the Asset Manager data store, disassociates the asset with a specific device, optionally removes the device management components, and optionally removes active monitoring of that asset. In one exemplary, illustrative, non-limiting implementation, the Delete process de-instantiates the monitoring application for the device, removes the asset record from the data store and then terminates.

The Manage Monitoring operation permits a network management device operator to manage and configure the Asset Manager and devices under its management. The Manage Monitoring user interface permits the operator to request that any device under management be polled for new information, and further permits the operator to initiate data management applications such as retention management.

The Search operation of the Asset Manager provides the operator the ability to search within the Asset Manager database. The search operation permits an operator to search any field of the data store for specific information. Construction of database searches, including wild-card searches and query-by-example are well understood to those skilled in the art.

5.3.2.5 License Manager

A network management device supports an application that manages and defines the software licenses usable and/or manageable by the network management device.

The license manager provides for licenses to be managed on a deployment (specific machine), instance, or by using a calculated license credit mechanism. These mechanisms work as follows:

In conjunction with the auto-discovery capabilities and the Asset Manager application (if installed), the License Manager may detect and report upon software installed upon specific devices. In conjunction with this comparison, the License Manager may make a determination whether:

The software is supposed to be installed on a specific device
  The software is licensed for a specific device
  Provide exception reports, and integration with the trouble ticket manager to remediate the use of unlicensed software The determination as to whether a piece of software is licensed for a particular device can be made based upon any or all of the following factors:

A express license linking the software and the device
  A count of licenses compared to the number of devices to which the software is deployed,
  A calculation, based upon attributes of the device, as to the number of license credits that the software installation requires to operate.

For example, the License Manager calculations for a particular piece of database software are calculated upon the number and speed of the CPUs present on a specific device. A network management device can implement this calculation, and calculate the number of credits used by a particular instance of the database software. The License Manager may then report all instances of this software and their credit usage requirements, and compare this against a license for a fixed number of credits for usage of the particular software product. Network management device's license manager may also compare credit calculations across specific products in order to calculate usage credits against licenses for usage of pieces of a suite of products. In this case, the license manager calculates usage (reflected in points) for each piece of the suite that is used, but not necessarily for the whole suite. This is advantageous for customers who use only part of a licensed suite of products. For example, if a customer purchases Microsoft Office (a suite consisting of several Microsoft products) and were to use this method of calculating usage, and the customer only used the Microsoft Word application, the credit calculation would reflect only the usage of Microsoft Word and not the other products in suites (e.g., Excel, PowerPoint).

Another example of this type of licensing model for customers might be for operators of a network management device who also have a Remedy system installed. These operators could disable the network management device's Trouble Ticket Manager application and receive credit against their network management device usage points.

Note that the network management device License Manager is license-type agnostic, so that the License Manager may gather information about and report upon licenses used by network management devices and by other devices and applications.

The license manager also receives, manages, and stores licenses from vendors to use network management device instances and to form network management device-based monitoring architectures. In one example use, the licenses are bound at the device level, and may specify features and capabilities of a specific network management device. For example, the license may specify the types of applications that may be run on the particular device, or it may specify the maximum number of usage credits that may be allowed.

The license may be presented as a template that defines the capabilities of the device. Bound to this initial authorization may be a public-private key pair that provides an authenticable identity to the network management device.

5.3.2.6 Log Manager

The log manager provides services to the network management device for creating and managing system activity logs. Log management is understood by those skilled in the art.

5.3.2.7 Failure Manager

The Failure Manager provides services to a network management device for defining and implementing failure management systems. It provides the user interface for defining failure management templates, including templates that define the relationship between managed assets and the resulting actions (e.g., applications or dynamic applications to execute) to take in the event of the failure of one or more of these assets. Note that remote application starting may be provided using network management device specific dynamic applications, by sending a message to an agent running on the specific host, or alternatively by using existing network services such as SNMP. An example of an SNMP agent that has the capability of executing specific predefined applications in response to a SNMP query is the net-SNMP agent.

A network management device provides a unique capability to simulate failures of network devices, services, and applications, and to test failover capabilities without actually forcing a failure of the specific network devices. A simulated failure may be initiated, on a scheduled or ad-hoc basis, against any network device, system, service, or application managed or monitored by a network management device instance, or may be applied against any network management device instance, server, or service provided by one or more network management device instances. The Failure Manager further provides a user interface that supports the definition of failure modes, and permits the operator to submit a simulated failure to the network management device for processing. A failure may be simulated by temporarily disabling a dynamic application running on a network management device instance, by filtering data returned by a specific (set of) dynamic application(s) within the Collector, or by deleting or modifying information stored about the device in one or more data stores.

5.3.3 Dynamic Applications

The network management device supports a set of dynamic applications (2400). These applications provide the network management device with the capability to interact with specific types of devices. They may function as a discovery application, a QoS application, and a specialty dynamic application that can configure a specific type of network appliance. Network devices envisioned include routers, switches, and firewalls, although the concept may be used with any type of network-connected device that offers a management interface. Wireless Access points that provide management interfaces on an HTTP (Web) interface may be straightforwardly managed in this manner—the dynamic application need only collect and parse the web page returned to obtain the desired information.

Dynamic applications may define functionality that includes:

Device management (such as SNMP management)
Log monitoring
Expert systems for interpreting detected information
Quality of Service (QoS) testing
Protocol specific testing (e.g., HTTPS certificate testing)

Device management applications are analogous to traditional SNMP-based management except that the elements to manage (and their definitions) may be defined within the application specification template. For example, a device may be defined as an SNMP-aware device that reports the OID tree starting at 1.3.5.7.12. The dynamic application is defined to watch all collected information for an SNMP device that supports the 1.3.5.7.12 OID tree. The dynamic application in question would be able to further discover and manage information within the 1.3.5.7.12 OID tree. When such a device is located (generally based upon its network signature), the device is bound to the specific dynamic application that can manage it. The network management device may also monitor system and event logs and other points of information.

Dynamic applications are not restricted to SNMP management, but may be constructed to use any desired network management approach or protocol. Examples of alternate network management protocols that may be supported include RMON, WMI/WBEM, and NDMP.

In addition to managing specific events, the device management applications may be used to provide Quality of Service testing. When providing Quality of Service testing, the device management applications may monitor simple transaction response times, such the length of time required to return a specific web page from a web server, or may monitor more complex interactions. An example is a device management application that monitors the submission of a claim using claims processing software. In this illustrative example, the device management application submits a SOAP request to create a test claim with known attributes, and then monitors a web page of submitted claims for a new instance of the test claim indicating that the test claim has been successfully processed. In this manner, the network management device may further manage business applications and application-level workflow systems utilizing on the network.

Similarly, the network management device may use a dynamic application to monitor specific protocols for performance and compliance with established quality of service standards. For example, a dynamic application may be constructed using commercial Voice-over-IP (VoIP) tools that establishes VoIP connections and monitors call quality over the established connection. This dynamic application may be instantiated in response to recognizing a H.323 or SIP endpoint, such as those provided by a H.323 call concentrator or a VoIP telephone present on the network.

When a dynamic application template is loaded into a network management device instance and is enabled by the Configuration Policy for that instance, its Instantiation Conditions Template is extracted and stored within the Registry data store. Dynamic applications that are not authorized by the Configuration Policy may be stored in a network management device instance, but may not be used to instantiate dynamic applications. The Recognizer, upon receiving a set of data from the Collector, looks up the newly located data elements to determine if there is a dynamic application that should be invoked. If multiple dynamic applications are specified, each is invoked. If the dynamic application is not present on the network management device instance, the application manager may optionally download a dynamic application to manage the device as permitted by the Configuration Policy.

Once it is determined that a new dynamic application should be instantiated, control is passed to the Application Manager to instantiate the application.

Once a dynamic application has been instantiated, it is automatically invoked (if not already running) by the Recognizer when information that matches the specific invocation conditions (e.g., instantiation conditions+device information, or a managed event occurs). The invocation decision is made based information stored in the Registry Data Store (2812).

Dynamic applications also may be periodically invoked using a timer-based invocation. This invocation method is implemented by the Maintenance Scheduler (2900).

The mapping between a dynamic application and an underlying data store is provided as described above.

Discovery applications provide an interface that support interrogating a network device or service to collect additional information about that device or service. They take as input information that describes the device or service they are to interrogate and a description of the information that they should obtain from that device or service, and output a set of descriptive data about what was found.

Discovery application may be redeployed as Collector plug-ins.

A network management device may be distributed with discovery and QoS applications (or it may download them on an as-needed basis). Preferably, the network management device will include pre-defined associations between well-known network ports and discovery applications.

QoS discovery applications provide an interface that support interrogating a set of network devices and services to collect information about device and service quality of service. They take as input information that describes the devices and services they are to interrogate, and output a set of descriptive data about what was found. A QoS Discovery application differs from a Discovery application described above in that it is capable of operating within the realm of one or more services, whereas the Discovery Applications (as described above) operate within a single service. It should be noted that QoS Discovery applications, while described separately herein, may be integrated with Discovery applications, may share information collected by discovery applications, or may independently collect information as required.

The QoS discovery engine is defined using a collection of "stimulus, expected response (optional expected response)" definitions, in which each stimulus and expected response may be defined as a discovery application. In the content filtering QoS example described below, a stimulus might be to generate an SMTP message containing restricted content, the expected response is a log message indicating a restricted message was generated, and an alternate expected response would be a copy of the message in a testing email box (ostensibly for review by a human).

The following are examples of some dynamic applications:

A SMTP discovery application interrogates a SMTP server on well-known ports. It checks for service presence, configuration errors, and security weaknesses in accordance with applicable policy. The SMTP configuration checker looks for hacker-vulnerable features of SMTP servers such as open-relay, expn and verify option settings, and for some versions of SMTP-compatible servers, that the correct version of the software is running. The SMTP configuration checker uses an SMTP-configuration policy obtained from a local policy service (e.g., an LDAP server), DNS entries that name permitted SMTP servers (for example, both MX and SPF authentication may be checked for a SMTP server), in addition to an optional PKI-based check. The SMTP discovery application may be integrated with the SMTP QoS Discovery application. The SMTP QoS Discovery application may further check an SMTP service for quality of service and compare the quality of service obtained against defined policy. For example, the SMTP service may have a required quality of service for response time to be under 25 ms. The SMTP QoS Discovery application may check for this level of service and report its findings. An enterprises e-mail service is sometimes deployed as a set of related services, e.g., SMTP for MTA-to-MTA transfers, DNS (MX records) for MTA definitions, and POP, IMAP, or webmail for MUA/mail delivery. Determining the functionality of the e-mail system as a whole requires capabilities to operate across services and protocols, both to initiate queries and to process responses. In conjunction with an IMAP or POP discovery application, an SMTP QoS Discovery application may check for round-trip mail processing, including delays within anti-virus and anti-spam services, and may further check these services by submitting known-detectable email and observing whether the email was properly detected by these services. An example of the SMTP discovery application in operation is detailed below:

On establishing a connection to port 25 on a managed device (the well-known SMTP port), the managed device will usually describe itself (some administrators disable this functionality for security purposes, but most do not). In the following example response, we can determine from this server's response that it is running Microsoft's mail server (e.g., Microsoft ESMTP MAIL service) as well as the specific patches that have been applied (e.g., version 5.0.2195.6713).

220 SILOCPQ01.roselandyachts.com Microsoft ESMTP MAIL Service, Version: 5.0.2195.6713 ready at Tue, 1 Jun. 2004 17:17:08-0400

In a second example response, we can determine that this second server is running a Lotus Domino mail system.

220 virginia01.sciencelogic.com ESMTP Service (Lotus Domino Release 6.0.3) ready at Tue, 1 Jun. 2004 16:16:52-0400

In the enterprise email example, a QoS application might query the DNS server for a domain's email records, then send a test email to a previously defined "test mailbox" via each of the listed servers using the SMTP protocol, and then check the predefined "test mailbox" for the test mail(s). Upon receipt and processing of each test e-mail, the QoS Discovery application can then determine if a network of redundant e-mail servers is operational. Further processing of the received test e-mails can determine the server path that email has taken, the mail delay at each server (by processing the Received: headers), and can determine if an actual path varies from an expected delivery path, or whether a specific server is unduly slowing overall email processing.

A similar technique may be used by a QoS application to test automated response systems, list servers, and e-mail workflow systems.

One example of a process flow for basic email QoS management (14000) is described in FIG. 11. In a first optional step, an MTA is selected as an address for an e-mail (14010). This can be based upon template or DNS MX records. An e-mail is sent to well-known email address using the selected MTA (14020). Optionally, the MTA e-mail processing logs (outbound, delivery path, destination MTA) are checked (14030). The mailbox of a well-known e-mail address is checked (14040). Any recovered e-mail is parsed, and the QoS components are determined (14050). Optionally, a template is generated from network configuration (14060), and the QoS components are compared to the template (14070). Any appropriate event(s) is (are) generated (14080), and the process terminates. Those of ordinary skill will understand that multiple MTA delivery paths may be checked using this process by varying the MTA selection.

Continuing with the enterprise e-mail example, a QoS discovery application may be used to test an enterprise's content (e.g., virus, spam, and regulated content) filters in the e-mail. By sending e-mail content with known content signatures (e.g., spam, virus, or restricted content), the appropriate infrastructure content filtering rules may be tested. While described for e-mail content, the QoS discovery application technique is equally applicable to other protocols such as IM and HTTP. The content filtering rules tested by a QoS discovery application may be interpreted from source content filtering rules by downloading these rules as part of a template to parameterize a QoS discovery application.

The process flow described below may be used to test SMTP-based content filtering mechanisms.

FIG. 14 illustrates one exemplary, illustrative, non-limiting implementation of an SMTP-based content filtering QoS test (16000). Send e-mail containing content to be filtered to well-known email address (16010). This step starts the process, and provides test data that may be monitored and measured. Optionally check logs of MTAs processing e-mail (outbound, delivery path, destination MTA) (16020). Sometimes this information is not available. Check mailbox of well-known email address for expected response e-mail (16030); if the mail is not delivered within a specified time frame (16035), then generate an event (16040). The delivered e-mail is parsed using the template and the resulting QoS components are determined (16050). The template to be used will be specified for the SMTP QoS application, and the resulting data output will be provided for further use. Optionally, the process generates new template from network configuration information (16060). The parsed information is compared to the template (16070), and events are generated as appropriate (16080). The filtering system logs/alerts and delivery mailbox are parsed for expected response as is the delivered e-mail to determine QoS components (16090). Optionally generate data template from network configuration information (16100). The QoS components are compared to the data template (16110), and any events are generated as appropriate (16120).

It should be noted that the SMTP QoS Dynamic Application has access to all of the lines of the RFC compliant SMTP header, which includes Received: lines and Spam filter scoring. These lines can be used to calculate delivery of SMTP-based mail that has been rerouted to alternate e-mail servers, to calculate server-to-server hop times, and as input to predictive analysis calculations regarding future failure of mail services based upon load and response time.

5.3.3.1.1.1 DNS Discovery

The DNS discovery application interrogates a DNS service for information about one or more zones. Basic service information, such as configuration and response time may be attained using these techniques. Additional information, such as dynamic DNS configuration and configuration of the DNS server in accordance with applicable policies such as CM or security policies also may be tested. The Dynamic DNS QoS discovery component checks the dynamic update of DNS records in response to DHCP requests and ensures that the DNS/DHCP addressing infrastructure is operating properly. The DNS discovery application may be integrated with the DNS QoS Discovery application, or they may share information obtained during the basic discovery mechanism.

FIG. 10 illustrates a process for Dynamic DNS QoS discovery (17000). In one exemplary, illustrative, non-limiting implementation, the process initially requests a DHCP address for an IP address (17010), and defines a machine ID for that address (17020). The DNS is checked to ensure that the address and machine name were properly associated, and the DHCP lease is released (17030). The DNS is also checked to ensure that the address and machine name were properly updated to reflect the released lease, and a DHCP address lease is obtained (17040). The DNS is then checked to ensure that the address and machine name were properly disassociated 17050). The system waits for the DHCP lease to expire (17060), and then the DNS is checked to ensure that the address and machine name were properly updated to reflect the expired lease (17070). The process terminates.

By example, when a previously unknown server port of 53 is identified as being active, the Recognizer initiates a discovery using the DNS discovery application based upon an association between port 53 and the DNS discovery application. The DNS discovery application identifies the DNS server configuration for each supported domain, including the SOA date, refresh information, whether the server is authoritative for these domains, and its configuration. If zone transfers are permitted, the discovery application initiates a zone transfer and records the zone details for later use. An example of this later use is to discover MX records that name likely candidates for additional mail servers to be interrogated. Alternatively, the discovery application may further check the domain name in the zone to determine if it has expired or is due to expire soon. If the domain name has expired, or about to expire, the discovery application may record this information, optionally generate events to cause the domain name issues to be reported upon and corrected, and optionally schedules follow-up discovery operations on a periodic basis.

5.3.3.1.1.2 DHCP Discovery

The DHCP discovery application interrogates a DHCP service for information about the service. Using one or more template defined MAC addresses, the DHCP service may be tested for expected response. The DHCP discovery application may be integrated with the DHCP QoS Discovery application, or they may share information obtained during the basic discovery mechanism.

5.3.3.1.1.3 HTTP/HTTPS Discovery

The HTTP/HTTPS discovery application interrogates a web server on ports 80, 443, and other well-known ports. It checks for service presence and availability and certificate validity (for HTTPS). The HTTP/HTTPS discovery application may be integrated with the HTTP/HTTPS QoS Discovery application, or they may share information obtained during the basic discovery mechanism. The HTTP/HTTP QoS discovery application monitors web pages for provided quality of service. QoS metrics include traditional certificate checking, checking for both certificate revocation and certificate expiration, and extends into content and response time metrics. If the certificate is revoked, expired, or about to expire, the discovery application may record this information, optionally generate events to cause the certificate issues to be reported upon and corrected, and optionally schedules follow-up discovery operations on a periodic basis.

In one example, the HTTP/HTTPS QoS discovery application compares web pages against expected results. This capability permits the HTTP/HTTPS QoS discovery application to detect slow to serve/missing pages and incorrectly returned results. An immediate benefit of this technique is that it will detect and report upon web pages that have been defaced, or tampered with. This technique is especially useful for detecting improperly configured databases underlying web service front ends and defaced web pages.

FIG. 12 illustrates an exemplary process (18000). First, content is requested from HTTP/HTTPS servers as defined by template (18010). Optionally, the web service's certificate is checked if defined by template (18020). The web page response time to the request is measured (18030), and response page(s) are obtained from the web service (18040). Optionally, the response pages are parsed using a Content Parsing template (18050). The response page(s) are compared to expected results template, and the web server response time is compared to the expected results (18060). Any events are generated as defined (18070), and the program terminates.

5.3.3.1.1.4 IMAP Discovery

The IMAP discovery application interrogates an IMAP server on well-known ports. It checks for service presence and security weaknesses. The IMAP discovery application may be integrated with the IMAP QoS Discovery application, or they may share information obtained during the basic discovery mechanism.

5.3.3.1.1.5 LDAP Discovery

The LDAP discovery application interrogates LDAP server(s) on well-known ports. It may also interrogate Active Directory services using an LDAP front end. The LDAP discovery application parses the LDAP information returned, and uses this information for further discovery. The LDAP discovery application may be integrated with the LDAP QoS Discovery application, or they may share information obtained during the basic discovery mechanism.

5.3.3.1.1.6 mySQL Discovery

The mySQL discovery application interrogates mySQL server(s) on well-known ports. The mySQL discovery application checks for service operation and known security weaknesses. The mySQL discovery application may be integrated with the mySQL QoS Discovery application, or they may share information obtained during the basic discovery mechanism.

5.3.3.1.1.7 SQL *NET Discovery

The SQL*NET discovery application interrogates SQL*NET server(s) on well-known ports. The SQL*NET discovery application checks for service operation and known security weaknesses. The SQL*NET discovery application may be integrated with the SQL*NET QoS Discovery application, or they may share information obtained during the basic discovery mechanism.

5.3.3.1.1.8 POP Discovery

The POP discovery application interrogates a POP/SPOP server on well-known ports as described generally above. It checks for service presence and security weaknesses. An example interaction with a POP server, such as may be performed by the POP discovery application, is shown below:

+OK Lotus Notes POP3 server version X2.0 ready <006F7CBA.85256EA6.00000518.00000007@ Virginia01/ScienceLogic> on Virginia01/ScienceLogic.

The POP discovery application may be integrated with the POP QoS Discovery application, or they may share information obtained during the basic discovery mechanism.

5.3.3.1.1.9 SNMP Discovery

The SNMP discovery application interrogates a SNMP server or agent on well-known ports. It checks for service presence, configuration errors, and security weaknesses in agents. The SNMP discovery application may be integrated with the SNMP QoS Discovery application, or they may share information obtained during the basic discovery mechanism.

5.3.3.1.1.10 VOIP QoS Discovery

The VoIP QOS discovery application monitors call setup, teardown, and other VOIP functions, including voice quality of service. VOIP relies upon multiple coordinated network services in order to provide voice over IP service to end-users. The VOIP QoS discovery application provides the capability to test the suite of coordinated network services as well as the quality of the encoded voice signal being managed by the VOIP circuit.

5.3.4 Device Manager

The network management device also includes a device manager application (2050) that, in one exemplary, illustrative, non-limiting implementation, is an application operating on the network management device that lets an operator of the network management device configure the network management device for operation using a user interface. The device manager application can further include a component (not shown) that reads and writes at least part of the configuration policy (2060) using techniques that are well understood by those skilled in the art. The construction of the device manager can be accomplished using methods well-known to those having ordinary skill in the art.

5.3.5 Interface Services

Interface Services (2600) provides application service-level interfaces for publishing and receiving information in various standard formats. The interface services applications provide input and output in well-known protocols. Interface Services are port/protocol specific interfaces. Interfaces may be Receive or Publish. Receive interfaces (2610) provides a mechanism for external systems to send information to the network management device on an asynchronous basis. A Publish interfaces (2620) publishes information collected by the network management device in a specified protocol/format.

The network management device interfaces are applications, and thus are subject to standard the network management device controls over applications. The Configuration Policy defines the list of Interface applications that are started as part of the network management device instance. These applications are started at boot, and kept up until the network management device instance is reconfigured or shut down.

5.3.5.1 Log Interface 3040

Figure 3:
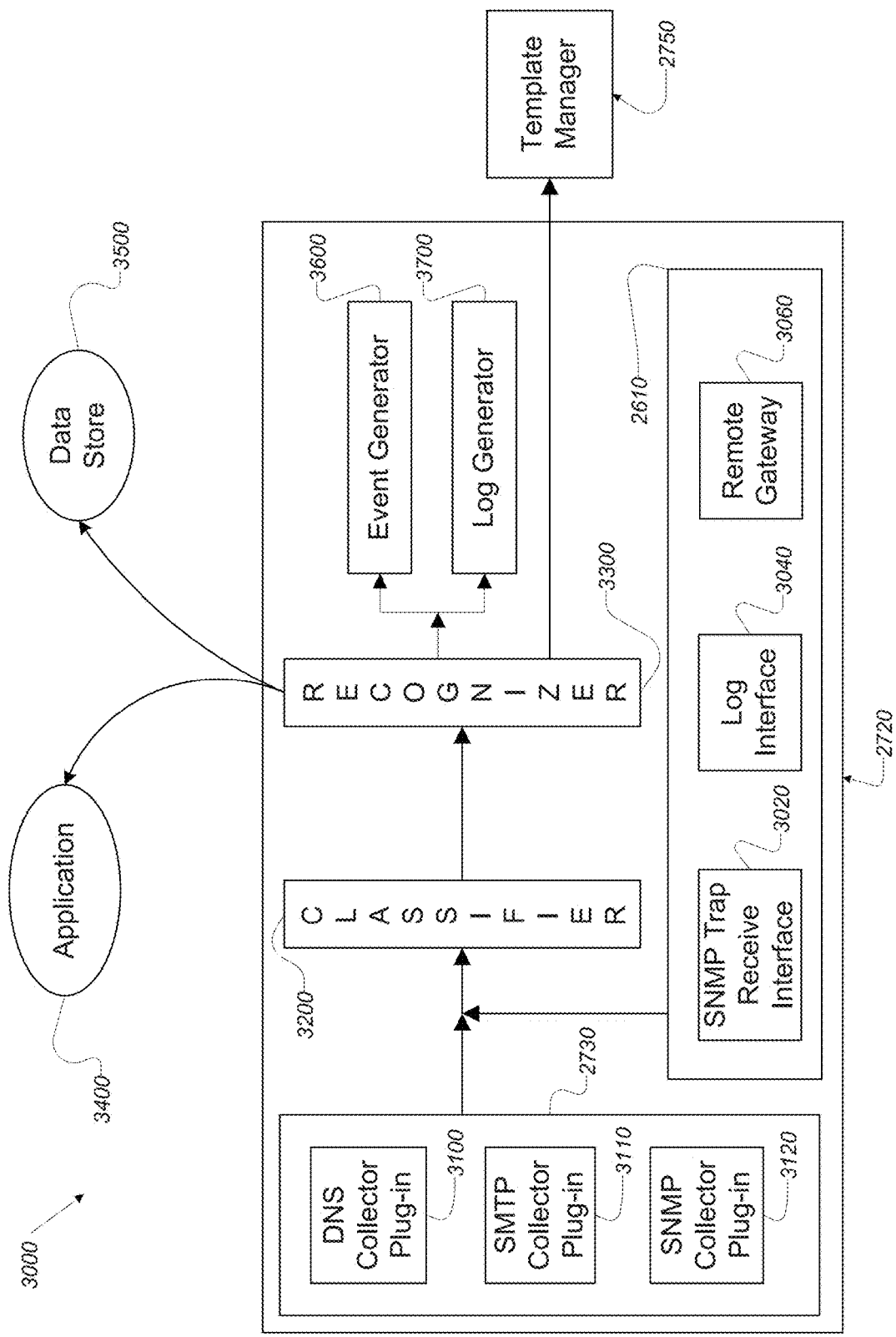
FIG. 3 is a schematic illustration of a Collector in accordance with the illustrative technology herein.

The Log Interface (3040) is a log reader/interpreter that is capable of reading a log message (in plain ASCII or from a network connection), parsing it in accordance with one or more regular expressions, reformatting the parsed information into "normal form," and submitting that information to the Collector for further processing. One example of a log interface is an interface that listens on network port UDP: 514 and converts syslog messages into a form usable by the Collector. An example of a log interface is shown in FIG. 3 as Syslog Interface 3040.

By submitting log information to the Collector (2720), the Log Interface can be used to generate events if there are items in the log that match the inspection criteria. There are several examples of Log Interfaces, including:

Flat file (reads an ASCII or XML flat file)
Syslog (provides a syslog or ksyslog interface)
Microsoft Windows Event Log An example of a Log Interface component operation is described below:

The Log Interface is started when the network management device instance boots based upon configuration options stored in the Configuration Policy. There may be multiple Log Interfaces, and/or multiple instances of the same type of Log Interface (each processing different inputs).

The Log Interface obtains a log record from its input.

The Log Interface parses the log record in accordance with its parsing specification. If the log record does not match the parsing specification, the Log Interface generates an error to the error handler, passing the unparsable log record as a parameter. The Log Interface then loops back to obtain another log record.

If the selected log record passes the parsing specification, the Log Interface converts the parsed log information to internal "normal form" and passes this information to the Collector for processing.

The Log Interface loops back to obtain another log record.

The example Log Interface can sleep while waiting upon the next log record.

5.3.5.2 SNMP Trap Receive Interface 3020

The SNMP Trap Receive Interface accepts SNMP traps from the network, converts the trap data to a form usable by the Collector (e.g., using a content template), and passes the converted information to the Collector for processing. In one example, the SNMP Trap Receive interface listens on network port UDP 162 for SNMP traps and converts them into a normal form usable by the Collector.

5.3.5.3 SMTP Interface

An SMTP Interface (not shown) accepts SMTP messages from the network, converts the SMTP data to "normal" form (using a content template), and passes the converted information to the Collector for processing. The SMTP interface supports the collection of messages from other e-mail enabled applications without requiring the delivery of these messages to an external mailbox.

The SMTP interface may alternatively support POP and IMAP mailboxes and provide the content translation services to email collected from these mail interfaces. For example, a business application generates status and error messages regarding its internal workings and is configured to email these messages to a well-known address. The SMTP interface provides an interface to which email messages to the well-known address may be routed, accepts messages to that address, and then processes the messages. In this example, the SMTP interface receives email from a known address, looks up a content template using the email source address, and parses the email using the content template as a guide. The results of parsing the email, which in this example, contains a failure warning, is submitted to the Collector for further processing. Alternatively, the SMTP interface could directly generate an event and submit the event to the event manager.

Those having ordinary skill in the art will appreciate that this feature can be used to manage e-mail alerts from other management systems, such as Microsoft's Operations Manager (MOM). Multiple MOM instances may be configured to send email to a single the network management device monitored mailbox, making the network management device, in effect, a manager of MOMS.

Alternatively, the network management device may use these technologies to recognize e-mail non-delivery messages and take appropriate corrective action to identify the reason that email has been returned as non-deliverable, and to alternatively resend the email if it is automatically determined that an email was returned as the result of a transient error that has since been corrected.

5.3.5.4 Publish Interface 2620

Publish interfaces (2620) can include FTP/SFTP, HTTP/SHTTP, LDAP, and many others. The list of Publish interfaces is extensible by adding new applications to the network management device instance and authorizing them to execute in the Configuration Policy.

Each Publish Interface has a unique ID. In one exemplary, illustrative, non-limiting implementation, the publish interface's ID is constructed as its Application ID+protocol (TCP/UDP)+the port number it is authorized to operate on. Thus an HTTP service may have the name "123456:TCP: 80". A publish interface generally may only operate on one port at a time.

Information that is published to an interface is added to the Template-Interface binding table. The interface application extracts rows from this table, selected by InterfaceID, and makes those templates available on the specified interface. The application program uses the "binding parameter" as a hint on how to bind the Template within the Interface. Thus, an FTP interface might have a directory name as its binding parameter, whilst an LDAP interface might define the FQDN for the template ID.

5.3.6 Configuration Policy

The Configuration Policy (2060) is a policy template (described more fully above) that describes the configuration of the network management device and the applications configured to operate therein. In one exemplary, illustrative, non-limiting implementation, the Configuration Policy is the primary instance of a template (described more fully below) that is stored on each instance of the network management device to define the locations of running instances of embedded, pre-integrated, and dynamic applications on each instance of the network management device, and specifies how each network management device instance will communicate with these and other applications deployed on other the network management device instances. In one exemplary, illustrative, non-limiting implementation, such applications are defined locally for each the network management device instance. In other exemplary, illustrative, non-limiting implementations, however, such applications may be defined as remotely instantiated instances, in which case the credentials required to access these instances are provided as part of the configuration policy as described herein. In either case, the configuration policy permits a network manager to define access credentials for the network management device to use when accessing these applications.

In one exemplary, illustrative, non-limiting implementation, the Configuration Policy defines how digital signatures are used by a template manager (see below) during template manager operations for the import and export of templates as described above. For example, a Configuration Policy can define whether templates that are imported by the template manager must be digitally signed, and if so, specify the authorized template signers. Similarly, the configuration policy defines whether templates that are exported must be signed, and if so, the ID of the digital certificate that should be used to sign the templates. In another exemplary, illustrative, non-limiting implementation, the configuration policy defines how the network management device participates in a network of self- and automatically updating systems. Examples of such definitions include, but are not limited to:

Execution environment specification—defines a list of permitted execution environments and provides an invocation specification for executing applications within that environment. For example, if an execution environment is specified as JAVA, and the invocation specification provides the command line string: java %1-CLASSPATH=/mypath.

Auto-configuration policy defines how policies, templates, and applications are updated. Specification may be at the class level (e.g., policy or template) or at the named item level (a specific policy). In one exemplary, illustrative, non-limiting implementation, if conflicting auto-configuration policies are specified, then the network management device will default to the most restrictive policy defined.

Auto-update (e.g., locate, download, install: policies, templates, or applications) when new versions are available (TRUE/FALSE).

Download (policies, templates, applications) with a manual update decision.

No auto-configuration for policies, templates, or applications.

Unrecognized information handling policy.

Defines the policy for unrecognized data in the Collector. For example, defining whether any unrecognized data is ignored, logged, or packaged as a forensics template.

Forensic template policy defines how forensic templates are constructed and managed within the network management device instance. Options can include publishing information for forensic templates (list of (method of publishing, URI, authentication information (if required), and digital ID))

Policy on constructing forensic templates defines when a forensic template will be generated. Options can include:

Construct unknown device forensic templates,

Construct unknown service forensic templates,

Construct new forensic device templates for devices outside of (named policy),

Construct new service forensic templates for services outside of (named policy), and Construct new forensic template for items matching (named policy).

Collector (repeated for each Collector that is running)

Reference to Collector Application

List of Collector add-in's that are authorized to run as part of this Collector (Application IDs)

Interfaces

List of Interface Applications (application, protocols, and ports) that are authorized to run on this the network management device instance (Application IDs)

Data Stores

Registry

Application Data Store

Template Data store (application specific data stores)

5.3.7 Data Store and Related Components

In one exemplary, illustrative, non-limiting implementation, a data store manager (2800) is included that operates on the network management device to manage one or more instances of a data store (2810), described below, that is located on at least one network management device. The data store manager provides an application interface for network managers to manage the data stores, and further provides an application interface for dynamic applications to register, instantiate, and otherwise interface to device stores. The data store manager can be implemented using an underlying database management system such as mySQL as will be apparent to those having skill in the art.

The data store (2810) stores templates, downloaded dynamic applications, operations information, including information collected from the network and events. Data stores may be replicated across instances of the network management device to improve access and redundancy to the information stored in them. Each instance of data store may be located upon one or more the network management device as described herein. Depending upon the specifics of each data store's underlying data storage mechanism, data store replication may be implemented using multiple master, master-slave, or caching-based technologies. Data store information may be cached and replicated in order to promote higher availability and throughput. If a data store is temporarily unavailable, the information to be stored may be cached locally to disk or memory until the data store becomes available again or a secondary database is located and made available. Similarly, data store information may be cached locally to enable the stand-alone operating capabilities of the network management device.

Each data store instance may be implemented in any form conducive to the efficient storage of the information being stored upon the particular instance of the network management device, utilizing whatever resources are available to that the network management device. Examples of data store instances include a flat file, an ISAM data file, a relational database (such as Oracle or SQL Server), an object database, or a directory-based storage mechanism (such as LDAP or Active Directory). In one exemplary, illustrative, non-limiting implementation, the data store is a storage abstraction.

To aid in their use, data stores are classified as public (e.g., well-known) or private. A public, or well-known, data store has a public interface definition and is shared between multiple applications. Examples of well-known data stores according to one exemplary, illustrative, non-limiting implementation of the technology herein include a registry (2812), an applications data store (2814), and a template data store (2816). Conversely, a private data store (not shown) is one that is used only by a single application or a group of applications. In one exemplary, illustrative, non-limiting implementation, both public and private data stores have their structures defined by Data Storage Definition templates as described below.

The registry (2812) is a well-known data store used to store one or more application and template definitions, as well as information that is used to associate components of the network management device with the devices' configured applications. The registry also stores and provides the information necessary for a Classifier to identify a remote device and to invoke the application that manages that device.

In some exemplary, illustrative, non-limiting implementations, LDAP or other directory systems may be used as part of the registry. The systems may be locally cached in order to provide continual operations capability to the network management device instance without regard to whether a connection back to a central server is available. Multiple hierarchical directory structures may be stored and locally cached, starting with the root node of each hierarchical directory. Thus, a copy of the registry may be stored in both a mySQL database and parts of a LDAP directory of users ordered by organization, and within a second LDAP directory of devices ordered by network local may be simultaneously cached on a single instance of the network management device in order to speed lookups and provide protection against network outages.

In a first exemplary non-limiting description, the registry data store is implemented as a set of database tables (not shown). Examples of suitable tables include: Instantiation Data, Application Registry, and Application/Interface Binding. In one exemplary, illustrative, non-limiting implementation, instantiation data is information related to the instantiation of applications in an Instantiation Data table within the registry to determine if an application has been instantiated. By way of example, the following elements are defined for the Instantiation Data Table.

| Column | Type | Comments |
| --- | --- | --- |
| TemplateID | String | Template ID (of Instantiation template)-Null if not named. |
| TemplateName | String | Template Name and Version # (of Instantiation template)-Null if not named. |
| InstantiationInfo | BLOB | Instantiation information-Blob containing XQuery statement. |
| ApplicationSpec | String | Application specification-Specification of application to invoke (ID, Name + Version). |
| InstantiationDate | Date | Instantiation date. |

In another exemplary, illustrative, non-limiting implementation, the application registry provides a defined location for applications to become known to the system. It can be used by various components of the network management device to locate applications located within the network management device.

| Column | Type | Comments |
| --- | --- | --- |
| ApplicationID | String | Application ID (of Application). |
| ApplicationName | String | Application Name and Version # (of Application)-Null if not named. |
| URI | String | URI of Application Specification (generally, a data store reference). |
| RegistrationDate | Date | Date of registration. |

In one exemplary, illustrative, non-limiting implementation, the application/interface binding table provides the mapping between the Registered Templates, Policies, and Applications and the interfaces that they are published upon. Rows are inserted into this table for each binding, and removed when the item is no longer published on the specific interface.

| Column | Type | Comments |
| --- | --- | --- |
| TemplateID | String | Application ID (of Application). |
| InterfaceID | String | Name of interface. |
| BindingParameter | String | Information defining where template is bound within the interface (an OU, a directory, etc.) |
| RegistrationDate | Date | Date of registration. |

The User table defines the users associated with a network management device instance and describes their rights. The User table references the OU table to map the user to an OU, and either embeds or references a template containing the SAML assertion that defines the user's rights.

| Column | Type | Comments |
| --- | --- | --- |
| UserID | String | User ID/device ID |
| RightsID | String | Reference to or embedded rights specification |
| BindingParameter | String | Information defining where user is bound within the interface (an OU DN) |
| RegistrationDate | Date | Date of registration |

The OU table defines the association between a user or device and a network management device instance. The OU table either embeds or references a template containing the SAML assertion that defines rights associated with the user or device. An illustrative example of an OU table description is provided below:

| Column | Type | Comments |
| --- | --- | --- |
| OUID | String | Organizational Unit ID |
| RightsID | String | Reference to or embedded rights specification |
| BindingParameter | String | Information defining item to be bound (e.g. a template, template reference) |
| RegistrationDate | Date | Date of registration |

In one exemplary, illustrative, non-limiting implementation, the event binding table provides the mapping between the events and invocation templates. Rows are inserted into this table for each binding, and removed when the event is no longer active.

| Column | Type | Comments |
| --- | --- | --- |
| TemplateID | String | Template ID (of instantiation or invocation template). |
| EventID | String | Event ID |
| Priority | Number | Priority of event |
| DispatchParameters | String | Parameters for governing event dispatch, e.g. weighting, thresholds |
| Parameter | String | Parameters to invocation or instantiation call |
| RegistrationDate | Date | Date of registration. |

The application data store (2814) is a network management device internal data store for the storage of applications specifications. The application data store may be implemented in several ways. In one example, it may be implemented as a relational database keyed by Application ID, such as the description shown below:

| Column | Type | Comments |
| --- | --- | --- |
| ApplicationID | String | Application ID (of Application) |
| ApplicationName | String | Application Name and Version # (of Application)-Null if not named |
| Application | Blob | Application Definition |
| RegistrationDate | Date | Date of registration |

The Template Data Store (2816) is an optional data store that provides an alternative storage location for templates and template fragments. Alternatively, it may be used to store application components. The template data store may be implemented in several ways. In one example, it may be implemented as a relational database keyed by templateID, such as the description shown below:

| Column | Type | Comments |
| --- | --- | --- |
| TemplateID | String | Template ID |
| TemplateName | String | Template Name and Version # (of Template)-Null if not named |
| Template | Blob | Template Definition |
| RegistrationDate | Date | Date of registration |

5.3.8 Embedded Applications

In one exemplary, illustrative, non-limiting implementation, the network management device includes embedded applications (2700), which are a class of applications that operate on the network management device. An embedded application is an application that is included with the instantiation of a network management device. These applications provide a core framework within which the network management device operates and may distribute information to other instances of the network management device. In one exemplary, illustrative, non-limiting implementation, the list of embedded applications eligible to operate on a specific device instance are defined and controlled by the configuration policy (2060) as described above. In a more specific exemplary, illustrative, non-limiting implementation, an embedded application need not be present on a specific instance of the network management device; the specific network management device using the embedded application need only be aware of which instance of the network management device the embedded application is operating on and how to call the embedded application on that network management device.

In one exemplary, illustrative, non-limiting implementation, the embedded applications are instantiated using a process in which embedded applications are instantiated on a specific instance of the network management device. When an embedded application is so enabled, an Instantiation Conditions Element is first evaluated and a determination is made as to whether the application may be instantiated. If so, then control is passed to the application manager (2710) to instantiate the application. Once an embedded application has been instantiated, it is automatically invoked at startup. It may also be invoked (if not already running) periodically using a time-based invocation. This invocation method is implemented by a Maintenance Scheduler (2900) that manages the polling frequency and invocation of the Template Manager to conduct polling activities as described in greater detail below.

5.3.8.1 Application Manager

In one exemplary, illustrative, non-limiting implementation, the application manager (2710) is provided as a network management device component that permits the network management device operator to manage the applications present in the network management device instance. It provides the network management device instances with the capability to register, instantiate, and invoke the network management device applications (2500, 2400) on behalf of other the network management device services.

In a more specific exemplary, illustrative, non-limiting implementation, the application manager provides the following services:

| Name | Description |
| --- | --- |
| Register | Registers an application with the network management device instance. |

-continued

| Name | Description |
|---|---|
| Deregister | Deregister an application in the network management device instance |
| Instantiate | Instantiates the network management device application |
| Validation/load | Validate and loads a copy of the network management device application onto the network management device instance |
| Invocation | Invokes the network management device application |
| De-instantiation | De-instantitates and de-registers an application with the network management device instance |
| Update in place | Update the application in place |

5.3.8.2 Event Manager 2740

The Event Manager (2740) provides a service for dispatching and managing events. In one example, each event invokes a specific well-defined action or method invocations. Generally, events are created when an application determines that something has occurred that other the network management device applications or operators need to be made aware of.

Events define an arbitrary action to be taken by the network management device. Arbitrary actions are application extensible, and may include one or more of the following examples of actions:

- Send notification using an external notification mechanism. Some illustrative, non-limiting examples of external notification mechanisms include a user interface popup, instant messaging, email, pager, and SMS
- Invoke a predefined application.
- Modify the state of a database item.

An event is described by the quad: Event ID, Priority, Application Specification, Invocation Parameters.

- The Event ID is a unique identifier that is used to identify the event to the system.
- The Priority is a natural number, evaluated so that events are ranked by this number. In one example, lower numbers mean a higher priority. In this example, the highest priority is 0.
- The Application Specification is an application specification, or a reference to an application specification. This is the application to be invoked by the Event Manager if the event is thrown.
- The Invocation Parameters are pre-defined parameters that are passed to the Application at invocation.

Multiple definitions of events are evaluated in priority order, with the event being dispatched to the highest priority event definition first, and then the next highest priority event, and so on. For example, if the following events were defined:

| PowerSpike | 0 | Shutdown | (parameter) |
| PowerSpike | 10 | Notify | (email, all users) |

If there are multiple event definitions that share a priority level and the priority level is selected for invocation, all of the event definitions will be invoked for that specific priority level. The order in which events of the same priority level are invoked is implementation dependant. In one example, an auxiliary weighting approach may be used in which all events at a specific priority level are assigned an additional ranking value. This value is used to order events with the same priority level.

The Event Manager provides the following services:

| Name | Description |
|---|---|
| Register | Registers an event definition |
| Deregister | Deregisters an event definition or set of event definitions |
| Dispatch | Dispatches an event |

The register operation of the event manager associates an event with an invocation specification. The association is preferably maintained as a row in a table within Registry 2812. If the application specified in the invocation specification is not instantiated, the event manager calls the application manager to instantiate the application.

The deregister operation of the event manager breaks the association between an event and a specific invocation specification. In the above example, the association may be broken by removing the row from the table within Registry (2812).

The dispatch operation of the event manager looks up an event and invokes the application(s) associated with the event. If multiple applications are specified for an event, they are processed in priority order as described above. In some exemplary uses, all of the events specified are invoked. In other exemplary uses, the first event to be invoked pre-empts all other specified events.

5.3.8.3 The Collector

The Collector (2720) provides the service framework for interrogating network devices, applications, and services, and forwarding the collected information to Collector Plug-in web (2730). The Collector itself does not perform any recognition tasks; rather it provides the framework for the execution of Collector plug-ins (2730). The Collector provides the mechanism by which collected information is aggregated, managed, and passed to Collector Plug-ins for further processing. After the information has been collected, it is passed to a Recognizer for further processing. In this way, the Collector manages the data flow between Collector Plug-ins, other applications, and the data stores.

The Collector may be implemented as an embedded application that enables the network management device to perform information collection and processing tasks. Collector instances may be distributed between the network management device instances, and may utilize both local and non-local data stores. Expert system techniques, such as forward chaining (a data-driven technique used in constructing goals or reaching inferences derived from a set of facts), are especially advantageous in implementing Collectors, in that they operate on partial sets of discreet elements, and upon receipt of all necessary elements they trigger an rule. This rule may invoke an application or generate an event. For example, a Collector that uses a forward chaining expert system might transform a set of Invocation Specification templates of pre-integrated or dynamic applications for use as rules within a forward chaining expert system. When the conditions of an Invocation Specification are met, the expert system executes its rule that invokes the specified application or generates a specific event. Alternatively, a Collector may be coded using more traditional methods, such that the set of defined Invocation specifications are inspected for each set of data elements received within the Collector.

FIG. 3 is an illustrative diagram of a Collector and its components (3000). In the illustrated exemplary, illustrative, non-limiting implementation, the Collector (2700) includes data receiving interfaces (3010) that collect data sent from various network servers and devices having known formats. In the illustration, the data receiving interfaces include an SNMP Trap Receive Interface (3020), a Log Interface (3040), and a Remote Gateway (3060). However, additional interfaces will be apparent to those having ordinary skill in the art. In addition, the Collector (2700) includes various plug-ins (2730) that collect user-specified data from various devices on the network, such as DNS servers using DNS plug-in (3100), SMTP servers using an SMTP plug-in (3110), and SNMP servers using an SNMP plug-in (3120). Other plug-ins will be apparent to those having skill in the art. Each of the plug-ins is a dynamic application that can be controlled using the application manager (2710), including discovery and QoS applications as described herein.

Both interfaces (3010) and plug-ins (2730) forward their collected information to the Classifier (3200) having first conformed the data to the relevant data definition templates, so that the data received by the Classifier is already parsed and tagged for efficient matching with the specifications available in the Classifier using processes that will be apparent those of ordinary skill in the art. The Classifier identifies (if possible) what data is needed for network management. The identified data is forwarded to the Recognizer (3300). The Recognizer determines those processes needed to obtain the data (if possible), and then enacts those processes (if possible). Such processes can include passing data to a previously instantiated application and instantiating new applications (3400), moving data to storage (3500), including, e.g., one or more instances of data store 2810, passing data to the event generator (3600) to cause the downstream generation of an event (e.g., a system alert), creating a log entry (3700), or formatting the data in accordance with a forensics template and passing that data to the template manager (2750) for processing as described herein.

An exemplary process flow for the Collector is provided in FIGS. 13A and 13B, which describe an illustrative process (13000) in which the Collector is started when the network management device instance is started. The Collector first examines the Configuration Policy to determine which Collector Plug-ins are authorized to run, and starts instances of these Collector Plug-ins (13010). If required, the Collector registers itself for timing events with the Schedule Manager (13020). This permits the Collector to be notified when a scheduled process should be run. The Collector examines the Registry and determines which dynamic applications are configured for execution (13030). The instantiated dynamic applications' information is loaded by the Collector. Local copies of the "Instantiation Conditions" template fragment from the application specification are loaded and ordered for easy processing (13040). In some uses, the Collector restructures the Instantiation Conditions information into hierarchical or other internal structures that permit efficient searching and selection based upon data element values. The Collector queries the Registry to determine which managed devices require polling (13050). The Collector starts a polling process in which the Collector instantiates a data collection application (e.g., a Collector plug-in such as plug-ins 3100, 3110, or 3120 as shown in FIG. 3 to poll or query a device (13060), using the Data Element Definition and optionally a Content Parsing Template associated with the device and collection application as the parameter that specifies the data to be collected. If a Content Parsing Template was specified (13070), the Collector converts the "raw" information into data field form (13080), after which, or otherwise, the Collector safe-stores the information returned from the data collection application (13090). The Collector logs the collected information, if configured to do so (13100, 13110), and then, or otherwise, the Collector uses the Classifier/Recognizer (either as part of the Collector, or a Collector Plug-in) to compare the collected information against the instantiation conditions for each dynamic application, and invokes those dynamic applications that match (13120). For performance reasons, the comparison of the collected information may occur in parallel across multiple instances of the Collectors. All dynamic applications whose instantiation conditions match the collected information are invoked (13130). If no dynamic applications were invoked, the Collector packages the collected information into a "forensics template" and processes the forensics template in accordance with the policy specified in the Configuration Policy (13140).

The above process is performed using the plug-in components of the Collector. These parts are described in the following sections.

For example, network management device instances that use Collectors configured for remote operation may have read-only cached copies of the Classification Signature and Data Element Definition templates and slave copies of the data stores into which the Collector and its plug-ins write information. This permits the remote Collector to operate without direct connection to a master the network management device(s) and to synchronize the information collected as needed without involvement of the application. This capability substantially reduces the complexity of the applications and permits greater flexibility in the deployment of the network management device technologies.

In an alternative example, network management device instances that use Collectors configured for remote operation may use a plug-in that transmits collected information to a Collector operating within a disparate network management device. The Remote Gateway (3060) on the disparate network management device receives this information and submits it to the Collector on the disparate network management device for further processing.

5.3.8.4 Collector Plug-Ins 2730

Collector Plug-ins are applications that work within the Collector to operate upon information collected from network devices. Collector Plug-ins may be redeployed Discovery or QoS Applications. There is generally one Discovery Application per protocol or mechanism of information collection.

A Collector Plug-in generally takes a Data Element Definition template and a device specification as input and returns one or more Data Definition Templates as a result. This produces data traffic that is then passed to the Classifier.

Receive interfaces are a second flavor of Collector Plug-in. They operate, either stand-alone, or as part of the Collector, and expose a public interface. Information collected at that interface is reformatted and packaged, and then submitted to the Collector for processing.

There are also several special purpose Collector plug-ins defined below:

Classifier
Recognizer
Event generator
Log generator

Note that these special purpose Collector Plug-ins may be implemented either as a Collector Plug-in, or as an embedded part of the Collector. The determination as to implementation method is dependent upon the deployment platform characteristics and planned use.

5.3.8.4.1 Classifier 3200

The Classifier is a special purpose application that matches the information collected from other Collector Plug-ins and determines which applications should be invoked in response to specific collected information. The Classifier may be implemented as part of the Collector, or as a Collector plug-in. Implementing the Classifier as a Collector plug-in provides advantages in scalability and configuration flexibility. Multiple instances of the Classifier may be run, either within a single Collector instance, or within multiple Collector instances. This configuration option is defined by the Configuration Policy.

A Classifier may be limited as to the type of information that it is capable of processing. This is referred to as the "type" of the Classifier. For example, specialized Classifiers may be constructed that process:

SNMP OIDs,
DNS records,
Log records,
E-mail messages.

Classification Signatures may be associated with a specific type of Classifier, as defined by their optional "type" tag.

Additionally, the Classifier may be configured to operate on "raw" data, such as text emails, SMS messages, or other "free form" text messages. The Classifier, upon receipt of one of these "raw" messages, uses a Content Parsing Template to parse the "raw" information and extract information usable to the Collector. The Classifier may use a Content Parsing Template to reduce e-mail messages sent by automated programs (back to) events that may be managed by the network management device. In short, the Classifier may be combined with other Collector plug-ins for reasons of efficiency in processing.

One important function of a Classifier is that it may be used to recognize the need for new dynamic applications. The Classifier is able to determine if a specific pattern of information matches the invocation requirements for a dynamic application, and if the data elements match and there is not already a dynamic application defined for this set of elements at the specific device, the Classifier calls the Application Manager to instantiate a new instance of a dynamic application to manage the newly discovered device.

Expert system techniques, such as forward chaining, may be especially advantageous in developing Classifiers, in that they operate on partial sets of discreet elements. For example, a Classifier that uses a forward chaining expert system might use the Invocation Specification of an application as its collection signature, and invoke the dynamic application when all of the conditions for execution are satisfied.

5.3.8.4.2 Recognizer 3300

The Recognizer 3300 is part of the Collector (or is a Collector Plug-in) that matches portions of application specifications to information discovered or reported upon, and makes application and invocation decisions. The Recognizer is distributable across multiple the network management device instances in order to distribute the workload in detection and processing.

The Recognizer's basic monitoring and policy definitions are defined in the Configuration Policy. These options can define, for example:

Where the Instantiation information data storage is defined,
The structure of information within the Registry data store,
The manner in which specific events should be handled,
How discovered data that does not match a Data Definition Template in the Registry is handled.

Each of the Recognizer configuration components may be considered part of an application definition, as defined above.

For example, the network management device instance may detect a DDoS attack using the Recognizer component. In this model, the Recognizer has exhausted its lookups for a set of collected data. If so configured in the Configuration Policy, the Recognizer can package the newly discovered information as a forensic template and distribute the template to an authoritative the network management device instance, which may integrate them with other forensic templates, and/or otherwise process them.

The collected information (data) is packaged into template form and shared with a controlling network management device instance based upon the policy definition associated with the detecting Collector Plug-in. Template sharing is generally managed by the Template Manager application. At the controlling network management device instance, the shared information is received, reviewed, and converted into a new dynamic application that recognizes the DDoS attack and takes immediate corrective action to stop the attack.

Any matched element may be logged by defining a copy of that elements invocation element and matching it to the log generator application. When the matching process invokes the matched applications, the data elements are passed to the Log Generator, which creates the log message. A similar mechanism is used for event generation (linked to the Event Generator), and for publishing forensic templates (linked to the Publish operation of the Template Manager).

5.3.8.4.3 Event Generator 3600

One Collector Plug-in is the Event Generator. The Event Generator may be invoked when an invocation template is matched in the Classifier or Recognizer. If invoked, the Event Generator formats and generates an event to the Event Handler.

The Event Generator optionally may track the number of event requests of a specific type that are received, and based in part upon the number of event requests of a specific type that are received (over a specific time period), generate one or more events of the specific or differing type. This capability has two functions—it reduces the number and frequency of repetitive events that are reported, and it reduces the corresponding network and system overhead by reducing the number of events that must be processed. These parameters are stored in the registry data store.

Alternatively, all events may be processed and stored, and the filtering applied solely against reporting the events. In this alternative example, the events stored in a data store are compared to templated thresholds and limits, and reports/alerts are generated in accordance with the alert specification.

This capability permits the Event Generator to generate additional or fewer events, such as an event that reports every $N^{th}$ instance of a detected event in the past ten minutes. It also permits the Event Generator to generate additional events other than the specific type of event detected, such as a management oversight event.

5.3.8.4.4 Remote Gateway 3060

The remote gateway 3060 provides an interface for information forwarded from another instance of a Collector. The remote gateway receives the information forwarded from a remote Collector and makes the information available to the Collector for further processing.

5.3.8.4.5 Log Generator 3700

One example of a Collector Plug-in is the Log Generator. The Log Generator may be invoked when an Invocation Template is matched in the Classifier or Recognizer. If invoked, the Log Generator formats and generates a log message to its local data store. In some cases, the local data store used by a Log Generator may be a flat file, a database, or a network server such provided by a syslog service.

5.3.8.5 Template Manager

In one exemplary, illustrative, non-limiting implementation, the embedded applications also include a template manager (2750). The template manager is a component of the network management device that permits a network manager to manage templates from within one or more instances of the network management device, and generally manages how policies, templates, and applications are shared between instances of the network management device. In one exemplary, illustrative, non-limiting implementation, the template manager's operating options are configured using its user interface, which provides access to all features of the template manager. The Template Manager can use a combination of the registry and the application data store to store templates, policies, applications, and their management information. Alternatively, the Template Manager can use a dedicated template store such as the template store (2816).

The Template Manager may be configured automatically using the configuration policy (2060) described above to poll for new or updated templates using any of the following protocols. In one exemplary, illustrative, non-limiting implementation, the configuration policy provides the following policies for the template manager:

Known trusted sites (and their protocol, public key and our authentication information, if required).

Reference to data store application and configuration information for Registry (to store registration information in).

Reference to data store application and configuration information for the Application Data Store.

Search methodology.

Attribute tagging method.

Auto-update Frequency.

Defines a list of well-known services that the Template Manager uses as auto-update sources and their polling frequency.

Remote file systems, using NFS, SMB, or other well-known protocols.

SFTP or FTP.

SHTTP or HTTP.

LDAP.

In another exemplary, illustrative, non-limiting implementation, these policies are defined by the configuration policy for each instantiated template manager independently.

The Template Manager can provide the following exemplary services:

| Name | Description |
| --- | --- |
| Import | Imports a template in "normal" form into the network management device |
| Export | Export a template in "normal" form |
| Publish | Publish a template to a publish interface |
| Unpublish | Remove a template from a publish interface |
| Get | Retrieve a template from a data source |
| Put | Put a template to a remote data source |
| Update | Update a registered template from its source(s) |
| Search | Search for a specified template |
| Combine/ extract | Combine/extract templates to/from a common representation |

Get retrieves a template from one or more external publishing interfaces. Get is often followed by an Import.

Put stores a template to one or more external publishing interfaces. Unlike Publish, Put is an active command that invokes a network protocol to move the template to the remote server.

The Get/Put operations are implementations of protocol-specific actions. For example, a Get over an FTP interface will translate to a FTP connect, followed by any necessary socket conditioning commands (e.g., PASV), followed by an FTP GET command. Similar functionality is available for a variety of interface types, including FTP, HTTP, and LDAP.

Import takes a template in XML-based "normal" form and imports it into the network management device, converting it into the appropriate native storage form as required. Validation of sealed and signed templates occurs during import. Export is the inverse of import. If required, exported templates are signed and sealed using the identity of the network management device performing the export. Import takes an input template file name or URI as input, and loads the template at the location into the network management device instance.

FIG. 4A illustrates an example import process (4000). The process begins with the caller providing a URL to the template location (4010). The template manager checks the URL to ensure that the template is accessible at that location (4020). If the template is not available, then, the import process terminates. Otherwise, the template is copied to temporary storage (4030). If the template is signed properly (4040), then the template is moved to its destination data store (4050), such as data store 1218, translating format as necessary. Otherwise the process terminates. Finally, if the template needs to be registered (4060), then the template is registered (4070) and the process terminates. Otherwise, the process is terminated directly.

FIG. 4B illustrates an exemplary export process (4100). The caller provides the Template ID of the template to be exported, or the caller specifies if the template, or the template and all its references, should be exported (4110). The process attempts to locate the template in the registry (4120). If the template is not found, then the process is terminated. Otherwise, the template is exported (e.g., in XML format), including translating as necessary from its internally stored form (4130). If the template must be digitally signed (4140), then the Template Manager signs the template using the specified signing key (4150) and the process ends. Otherwise, the process ends directly.

The user manually may request import and export operations from the template manager's user interface, or these operations may be embedded in other applications software. For example, the Collector uses an embedded Publish request to make a newly created forensics template available for sharing.

The Publish and Unpublish operations of the Template Manager define operations by which a particular template, policy, or application may be exposed on one or more the network management device interfaces. Publish is the operation that binds a template, policy, or application to one or more interfaces; Unpublish rescinds that binding. In the case where policy/templates are associated with a specific OU within a LDAP hierarchy, the policy/template itself, or a reference to the policy/template, may be associated with the LDAP OU under a specific attribute tag. Use of this attribute tag technique facilitates the searching approaches described herein. Furthermore, if policy/templates are assigned to a specific OU within an LDAP hierarchy, the relevant parts of the hierarchy may be cached by a specific the network management device instance to provide protection against loss of data connection to alternative the network management device instances, for example, when an the network management device remote Collector is deployed to a remote business location. If the LDAP hierarchy is cached, the network management device instance should ensure that any policy/template references associated with a specific attribute assigned to an OU are resolved as part of the caching. The Publish/Unpublish operations use the Registry Application-Interface Binding structure to map a template/application to a public interface.

The Template Manager further provides an Update operation. Update retrieves a new version of an already registered template from an external publish point and optionally registers/instantiates the new version of the template. When called, Template Manager inspects the optional parameter to determine the ID of the application that the Update is requested for, and checks all trusted sources to determine if updates are available for the application in question.

The Template Manager further provides a search capability, where the Template Manager may perform various searches to locate requested policies and templates.

Multiple policies or templates may be applied based upon the nature of the event, application, or structure, and the selection of which policy or template to choose from a plurality of available options is a choice that either can be predetermined or may be determined dynamically at policy/template selection time. If the policy/template to use is predetermined, a policy/template reference may be used to reference a specific policy or template. If the policy/template is to be dynamically selected, the policy/template may be searched for using a variety of mechanisms; including checking for the policy in each location in a predefined search path, searching for the policy/template in a directory hierarchy, or selecting from an available set of policy/templates associated with a specific directory OU, or group membership. Alternatively, if policy/template attributes are exposed by the specific policy/template storage method and that storage method is searchable, the available policy/templates may be searched using their attribute(s) as search criteria. This may occur when using storage methods such as databases or LDAP directories. Preferably, the policy/template storage will expose policy/template attribute(s) and provide the ability to search for policy/templates using these attributes. The advantage of this approach is that a single query may be issued and all the policy/templates that meet the search query requirements will be returned as the result of a single query.

Preferably, policy/templates will be associated with a specific OU or group membership, and the network management device will search upward (e.g., toward the root) in the OU tree. The default behavior is to stop searching when the first policy/template is matched.

Policies and templates may be associated with specific events, dynamic applications, or other structures within the network management device. Policies and templates may reference other policies and templates.

The Template Manager further provides a combine/extract capability for manipulating policies. Combination of templates may include taking the union of the policy/templates, the intersection of them, or selecting a specific template such as the first or last policy. If multiple policy/templates are combined, then the issue of policy/template conflicts should be addressed. Policy/template conflicts may be preferably addressed by choosing the most restrictive policy/template from the conflicting set, or may optionally take the least restrictive policy/template. Policy/template conflicts may optionally generate an event to start further processing.

On a periodic basis, the Template Manager may be called from the Maintenance Scheduler in order to check previously registered applications for pending updates. This capability is controlled by settings in the Configuration Policy.

5.3.8.5.1 Sharing of Templates

The Template Manager can act in both the publishing and consuming roles, publishing templates and template fragments and receiving templates and template fragments, from other publishing sources. In one exemplary, illustrative, non-limiting implementation, the Template Manager operates in conjunction with other template managers installed within other the network management device instances, with the network management device interface services, or with public data repositories, to publish templates, template fragments, policies, and applications defined by the local the network management device instance. These items may be published by the Template Manager using any of the available publishing interfaces defined for the network management device instance, be pushed to a remote repository or Template Manager, or may be exported and manually published on external servers.

FIG. 5 shows an exemplary deployment (5000) of four network management device instances (5100, 5200, 5300, 5400) to illustrate several exemplary methods for transferring templates between different instances of the network management device. In the Figure, each network management device instance contains a box labeled "TM" indicating the template manager application associated with that instance, which is linked with a data store that contains the stored templates (e.g., the data store labeled "T") for the same instance. Corresponding instances of the data store manager are shown in boxes labeled "DM".

Two network management device instances (5300, 5400) are replicated data stores that automatically share their stored templates. The replication is accomplished by the data store managers 5320 and 5420, which is described above. Two other network management device instances (5100, 5200) interact with the network management device 5300 through a publish-and-subscribe data sharing model. One network management device template manager (5230) has a bi-directional link with the network management device 5300's template manager (5330), which publishes newly created templates to the subscribing network management device template manager (5230), and subscribes to template updates from that network management device template manager (5230). Network management device 5100's template manager (5130) has a uni-directional data sharing relationship with network management device 5300's template manager (5330) in which template manager 5130 writes template data to template manager 5330.

Network management device 5300 also illustrates the use of the Template Manager's import/export mechanism to import a template in normal form into a data store (5500) and to export templates already in that data store to normal form.

The network management device$_1$ also illustrates using the Template Manager's user interface to manually create and manage templates.

All template types may be published using this mechanism. It should be noted that automated data exchange between the network management device instances is supported using a publish/subscribe mechanism. This is especially useful when a cluster of the network management device instances collect forensic templates and share them with a central the network management device instance.

The Maintenance Scheduler (2900) manages the polling frequency and invocation of the Template Manager to conduct polling activities, and will now b described in detail.

In some exemplary, illustrative, non-limiting implementations, the network management device includes a maintenance scheduler (2900) that provides a time-based method of invoking programs and generating events within instances of a network management device. In one exemplary, illustrative, non-limiting implementation, the maintenance scheduler is configured using the configuration policy (2060), and is preferably started when the network management device is started.

The Maintenance Scheduler manages schedules for people, managed devices, services, and applications (collectively, entities) in a manner defined within the network management device, by defining their availability to accept notifications and reports. It also may define standard availability hours for each entity. For example, a person's schedule definition may be used by the network management device to limit their capabilities and/or interaction with the system. For example, a person may not be notified of an escalation if the escalation occurs outside their available time. The Maintenance Scheduler further defines when a device is available and what, if any, maintenance windows are defined for the device.

Network management device applications can use maintenance scheduler information to define their operating parameters, including:
When specific devices may be expected to respond to management requests,
When it is appropriate to issue management requests,
Baseline expected uptime for reporting detected uptime against,
Who and when to notify people of detected outages and anomalies, and
Scheduling of recurring events, such as the Template Manager auto-update polling.

In one exemplary, illustrative, non-limiting implementation, the maintenance scheduler is started at the network management device startup, and the maintenance scheduler first operates in "catchup" mode in which it conditionally executes any items that were configured to occur while the network management device was not available. For efficiency, the optional catchup mode may be specified for any item configured for management for the maintenance schedule.

In some exemplary, illustrative, non-limiting implementations, the maintenance scheduler operates in conjunction with the event manager (2740) by creating well defined events that are processed by the event manager. The event definitions to use are defined in the Configuration policy item that defines the operation of the maintenance scheduler. Alternatively, maintenance scheduler may operate in a mode in which it invokes a specific application at a specific point in time. In this mode, the maintenance scheduler functions in the same manner as the cron utility common on Unix operating systems.

In some exemplary, illustrative, non-limiting implementations, the network management device includes an error handler (2910) that provides the logic to handle errors in other applications running on the network. The error handler provides a common set of logic that may be relied upon by every application instantiated within a device instance. Each application defines an error handling specification, which may be used as the parameters to the error handler when an error is detected. For example, the error handling specification may define that an application is to be disabled if an error occurs, or that a missing data store should be dynamically created if it is not available.

The Record Retention Manager is responsible for managing information stored in one or more the network management device data stores. Management of this information includes:
Identification and application of appropriate policies
Historical information retention (e.g., logs, trouble tickets)
Collected management statistics Retention of a specific application's information is governed on an application and data store specific basis, as defined by the appropriate sections of the application specification. (e.g., the Data Storage Definition, as described above. The types of information management techniques that the Record Retention Manager may use include:
Limitation of the total size of a data store (by data store instance, by class of device, or in general)
Limitation on the number of records in a data store (by data store instance, by class of device, or in general)
These limits are defined as part of the Configuration Policy and as part of individual application specifications.

As an example, the record retention manager may determine that the appropriate policy is to retain 60 days of historical traffic information for a network router. The dynamic application that collects this information defines the following as part of its application specification:
Point of Management
Data to be managed
Data store that the information should be stored in Based upon this information, the Record Retention Manager searches the defined data store for traffic information (as defined by the data specification) and truncates the data store to the defined 60 days of historical traffic information.

Note that the Record Retention Manager uses the information contained in the self-defining storage specifications associated with application specifications to manage the information collected.

The log data, if collected, is managed by the record retention manager. External logs come in on an interface, are processed and filtered through the Collector, and then have actions invoked against them as needed. If one of these actions is a logging action, the log is created in the data store associated with the dynamic application that performs the logging.

5.4 Operation 5.4.1 Registration

Registration is a process by which the network management device application becomes known to the network management device instance. Registration records the application's public name information and associates that name with a specific data store location where the application may be found.

FIG. 6A illustrates a flowchart depicting an example process by which registration operates (6000). The Application Manager checks the Registry to determine if the application has been previously registered (6010). If so, the Application Manager ends the process. If the application has not been previously registered, the Application Manager stores the application information in a data store (6020). The Application Manager then adds an entry to the Registry associating the newly registered application with its data store location (6030). The registration process then ends.

Deregistration is a process by which the network management device application is removed from the network management device instance. Deregistration is the converse of Registration, the network management device application is removed from the Registry and its copy is removed from its data store.

FIG. 6B illustrates a flowchart that describes the steps performed by the exemplary, illustrative, technology herein (6100). The Application Manager checks the Registry to determine if the application has been previously registered (6110). If not, then the Application Manager ends the process. Otherwise, the Application Manager removes the Registry entry for the application (6120). The Application Manager removes the application information from the data store (6130). The process then ends.

FIG. 6C illustrates the process the Application Manager follows to instantiate an application of the exemplary, illustrative, technology herein (6200). The Application Manager first validates that the dynamic application may be instantiated by checking the Configuration Policy and relevant ACLs (6210). If the application cannot be instantiated (6220), then the Application Manager removes the Instantiation Conditions Element from the Registry data store (6230). The Instantiation process then terminates. Otherwise, the Application Manager validates that all necessary components and template fragments are available by calling the Template Manager get operation (6240). At this time, any digital signatures associated with code and template fragments are checked to ensure that the specification has not been altered. Errors in this step are passed to the Error Handler. If validation cannot be achieved, then the process terminates.

Otherwise, copies of all necessary template fragments and code are then copied to the local the network management device instance to ensure their availability as necessary (6250). The Application Manager next calls the local Data Store Manager to instantiate the requested instance of a data store (6260). The Application Manager uses the Data Storage Definition elements within the Application Specification Template as the specification for the new data store. The Application Manager then registers any applicable events for management by the dynamic application using the Event Manager. Once the data store is created, the application's template information is stored within the Registry (6270), the instantiation conditions are stored in the Registry (6280), and the Application Manager may then launch the application.

The Validation/load operation provided by the Application Manager validates an application's digital signatures and determines if all the pieces of the application are registered and stored within the Application Data Store. It accomplishes these tasks by walking the application specification to ensure that all application components are identified, and by calling the Template Manager to determine if each component is present and registered.

Optionally, if parts of the application are not present, the Application Manager will call the Template Manager to locate, download, and register the missing application components.

De-instantiation is the inverse of instantiation, as described above. De-instantiation removes the copies of the application stored in the Registry and Application data store(s).

The "Update in place" operation of the Application Manager is called by the Template Manager or other pre-integrated applications when an updated dynamic application is registered and discovered to duplicate an already instantiated application. "Update in place" replaces old instances of the data store and application, copying information in the data store if possible. FIG. 6D illustrates the "Update in Place" operation (6300). In one exemplary, illustrative, non-limiting implementation, the Application Manager first blocks all new instantiations or invocations of the application to be updated from running until after the update in place operation is completed (6310). In alternate exemplary, illustrative, non-limiting implementations, the Application Manager may not need to block new instantiations or invocations of the application being updated, alternatively instantiating the new application and subsequently de-instantiating the older application. Using the Data Storage Definitions of the old and new application, the Application Manager makes a determination as to whether the application's data store requires updating (6320). If the data store does not require updating, then the process moves to update the registry (6350). Otherwise the data store requires updating, and the Application Manager calls the Data Store Manager to create a new data store with the updated configuration and the original data store is copied into the new data store and the original data store is then deleted (6330). The new application is stored to the Application data store (6340). Once the new data store and application is instantiated, the old Registry entries are replaced with updated Registry entries that name the new version of the dynamic application (6350). Note that the updated Registry entries may contain updated instantiation conditions. The Applications Manager releases its block on all new instantiations and invocations (6360), if one was set.

5.4.2 Self-Configuration

In one exemplary, illustrative, non-limiting implementation, the network management device is configured to bootstrap its operation from the basic knowledge of its network configuration parameters, first by interrogating information from its network configuration servers, extending this information to services located from known network services, and then using dynamic applications and its internal expert system to mine these services for additional information about its environment. Finally, the network manager scans its local network, determines machines that respond to its scan, and uses its dynamic application mechanism to bring these machines under management.

In a more particular exemplary, illustrative, non-limiting implementation, the network management device is designed to support self- and auto-configuration from minimum information provided by a network management device operator. Self and auto configuration are technologies in which network management device policies and templates drive the configuration of a network management device instance. Those having skill in the art will understand that using the technologies described herein will allow roll-out of a network management device with minimal operator intervention, greatly decreasing the initial startup time and ongoing maintenance of the configuration.

In self-configuring operation, a network management device instance operates in conjunction with a trusted source of templates, applications, and policies. This trusted source can be another network management device instance within the same organization, or it can be a public Web site managed by a trusted operator. Having one or more trusted sources is useful in that it provides a common configuration location for managing collections of applications. In some exemplary, illustrative, non-limiting implementations, upon boot, and periodically thereafter, the network management device instance inspects its Configuration Policy and determines the settings contained therein for known trusted sources of updates, the network management device instance's auto-configuration policies, and sources of applications and templates. These sources may be pre-installed on the network management device, may be a customer provided server on the network, or may be a vendor-provided service. A network management device instance may also use the definitions of other self- and auto-configuration options found within the Configuration Policy. With these options enabled, network management device self-configuration is enabled. The network management device self-configuration operation is bootstrapped as described below.

A more particular implementation of this exemplary, illustrative, non-limiting implementation is illustrated in FIG. 7 (7000). The network management device is booted (7010), and the boot process is updated with newly discovered information about new devices or applications on the network (7020). The network management device then generates NMAP-like discovery behavior (7030) to discover systems that response to port-mapping requests using a discovery application such as NMAP. NMAP is a preferred discovery application, although other discovery applications may be utilized. A loop process then ensues for each newly discovered application (7040) during which new data is processed (7050) and any unknown systems and applications are dynamically associated with a management application or set of management applications using the discovered information (7060). Upon completion of the loop, the process terminates. For example, the network management system may discover a server on port 443 of IP address 1.2.3.4, and dynamically associate a management application to manage SHTTP services to information for that port and address.

FIG. 8 illustrates an exemplary process for self-configuration (8000), information obtained from the boot process, such as IP address, DNS server address, etc. (8010), is packaged as a Data Definition Template (8020). The boot information Data Definition Template is submitted to a Collector for processing (8030). The Collector attempts to process the information, and finding no applications configured to handle the application, searches the Registry for applications that could be invoked. As the registry is empty, it finds none, and creates a Forensics Template of the boot information (8040). The Collector emits and publishes a Forensics Template, which contains the boot information, which is forwarded to the trusted source of dynamic applications by the template manager (8050), which determines if it knows of any dynamic applications that can manage elements of the Forensic Template. These applications are returned to the network management device instance. The publish/check for process optionally repeats for all defined trusted sources (8060). The Template Manager registers the newly obtained applications (8070). The Forensics Template is resubmitted to the Collector for processing (8080). The Collector now recognizes the template as matching one or more newly registered applications and instantiates/invokes these applications (not shown). The newly invoked applications perform additional discovery of the network, devices, services, and applications (starting with self-scanning), and produce additional data in the Collector (not shown).

The self-configuration process continues using the new information. Using the above described process, network management device instances are self-configuring. In some deployments, the network management device registry and applications data store may be pre-populated with application definitions and invocation specifications. In other deployments, the Registry and applications data store may be unpopulated. Largely, the level of pre-population will be determined by end-customer preference and not technical or implementation constraints.

The ability to define and use multiple trusted sources of applications, templates, and policies provides network management device with the capability to self- and auto-configure based upon the devices, applications, and services discovered on the network. Coupling the process of collecting unrecognizable information into Forensics Templates and publishing these templates for review provides network management device with many additional capabilities, including those related to detecting and managing ad-hoc networks of disparate devices. These networks may take many ad-hoc forms, including various grid and mesh topologies that require significant management effort using traditional network management tools. Combining multiple trusted sources for self- and auto-configuration with individual identification and publishing of unrecognized network device, application, and service information, network management device implements a distributed sensor network for detecting distributed denial of service (DDoS) attacks and other distributed network-centric events that are traditionally only detected by distributed intrusion detection systems.

The network management device architecture permits self-discovered information to be merged with application templates to produce new dynamically applications that may be triggered by the newly discovered information. A forensics template is created when previously unrecognized and unmanaged information is discovered. Forensic templates may be stored locally on a specific network management device instance, or, in a configuration in which there are multiple network management device instances, the forensic templates may be uploaded to one or more centralized locations. Once collected, the forensics templates may be recognized automatically as a previously recognized dynamic application (requiring an application update to the discovering network management device instance), or may represent a new pattern that has not been seen before. An analyst may map a forensic template to a dynamic application or may decide to watch the issue further. The discovered forensics template may thus become the classification signature template for a new dynamic application. This mechanism permits network management device configurations to collect previously unmanaged information and dynamically extend the range of devices, applications, and services that a network management device configuration may monitor and manage.

A second aspect of self-configuration is that registered applications, templates, and policies may be updated automatically by network management device. The Configuration Policy controls how and when updates to registered items will occur. Some of these mechanisms for update include: manual, automatic update—external repository, learning, and learning with propagation.

Network management device administrators perform manual updates. network management device Administrators use the UI to the Template Manager and the Application Manager to manually manage applications.

Once policies, templates, and applications have been registered with a network management device instance, they may automatically be downloaded and updated from an external repository or template manager. This process is managed by the Template Manager.

Network management device can thus "learn" about its environment and from that learning, discover additional patterns and thresholds in its managed information, share these discoveries with other network management device instances, and dynamically refine its management techniques based upon its findings.

Network management device provides significant advantages over previous network management systems in that it may be operating in both agent-enabled and agent-less modes. The capability of operating without agents installed on the systems being managed provides a significant improvement in performance and a reduction in deployment and ongoing IT management costs.

To support agent-less modes of operation and to further ease the costs of deployment, the network management device has many network auto-discovery modes. The types of auto-discovery modes are limited only by the configuration of the network management device components.

The exemplary network management device incorporates the following auto-discovery modes:
User initiated
Timed
Autonomic
Upon receipt of unexpected or anomalous information that indicates that further discovery is advisable
Upon receipt of an "conduct auto-discovery event"

User initiated auto-discovery mode is a superset of the traditional network discovery applications that are included with traditional network management applications. In addition to the capabilities of traditional network management applications' discovery applications, network management device uses not only "ping" and SNMP control mechanisms, but may be further configured to search network address and port ranges to determine devices, applications and services present on a network, and then to further interrogate the devices, applications, and services to determine the configurations and manageable components.

In timed mode, network management device periodically interrogates networks, devices, applications, and services to changes in configuration on a periodic basis.

Network management device initially operates in autonomic auto-discovery mode when it connected to a network. In autonomic mode, network management device periodically searches networks to which it is attached for other nodes, further interrogates the nodes as they are discovered, and then acts upon the information discovered by conducting further specialized auto-discovery as indicated by the collected results.

Network management device supports several mechanisms by which it instigates auto-discovery based upon ongoing device, application, and service management results. These include:
Starting auto-discovery whenever it receives a result that indicates that a new device, application, or service is present on a managed network or device
Initiating auto-discovery when it receives one or more results as a part of an ongoing monitoring activity that is not consistent with at least one previously obtained result.
Starting auto-discovery upon receipt of information that is either unexpected or anomalous when compared to information for which it was already configured. In these cases, network management device recognizes that a condition exists where there is additional information that must be gathered, and it automatically begins a auto-discovery/data collection process using all available methods A network management device may also conduct auto-discovery activities upon receipt a "conduct auto-discovery" event from another network management device configured to manage the first network management device instance.

The manner in which auto-discovery operates is controlled from several well-known templates. They include:
The Configuration Policy, which controls permitted modes and areas of auto-discovery
The Point of Management Description Template (see above) defines the association between Point of Management and the Discovery Application to be used.

Using the Point of Management template, network management device can determine that a "discovered" device has an SNMP port with read permissions open, invoke the SNMP discovery application to read the SNMP MIB values, and then using the returned MIB values, network management device can then determine that the device is a Cisco router with multiple interfaces. Alternatively, it can read the MIB values on a Windows-based server to determine not only the version of the operating system, but all of the network interfaces, the patches present on the server, the applications installed on the server, and which applications are currently running.

With these attributes, network management device can automatically classify many of the devices that it may discover without the need to deploy a network management device specific agent to any of the devices, applications, or services that are discovered. The network management device's automatic classification mechanism can be further enhanced by the capability of network management device to have its Point of Management Template dynamically configured and updated by the Template Manager.

Auto-discovery is not limited to traditional attributes of discovered elements. For example, a self-discovery application may discover an open HTTPS port upon a previously unknown network host and query the web server on the HTTPS port for its certificate. Upon receiving the certification, it may then invoke a "certificate management" dynamic application to further interrogate the certificate and manage the certificate.

An advantage to this approach is that many devices, applications, and services can be auto-discovered using the techniques described herein. Auto-discovery mechanisms use expert system techniques to examine existing network protocols and interfaces and mine the information presented therein to build topologic maps and management information. These techniques permit network management device to be deployed without additional software agents and their associated deployment and management costs.

5.4.3 Auto-Discovery Process

In one aspect, the technology described herein provides a basic self-discovery mechanism within each network management device instance through the combined operation of the Collector, the Recognizer, and the instantiation conditions portion of the application specifications. Known Point of Management are defined in the Point of Management Template that provides a "vocabulary" of the universe of known Point of Management. The relationship between the Collector, Recognizer, and various network management device components that participate in the auto-discovery and self-discovery process in the architectural description described above. In one exemplary, illustrative, non-limiting implementation, this auto-discovery mechanism is extensible to additional devices and device types using the common set of Point of Management defined in the Point of Management Template by adding additional dynamic application specifications and their instantiation conditions. Thus, adding a new device type to be watched for and managed is as straightforward as adding the dynamic application specification.

One example of an auto-discovery process (9000) provided by the technology described herein is shown below in FIG. 9. The self-discovery process occurs after the Recognizer has checked the Registry for existing known dynamic applications registered that match the Point of Management (9010). If the check fails (9020), then the dynamic application is instantiated (9030) and the predefined application is invoked (9040).

If the check succeeds (9020), then the Recognizer checks the Configuration Policy to determine whether self-discovery should be performed (9050). If auto-discovery should not be performed, the process terminates. Else, the Recognizer then checks the Point of Management Description Template to determine the discovery application to use (9060). The Recognizer checks in the Registry to determine if this application has already been instantiated (9070). If the application has not been previously instantiated, the Recognizer calls the Application Manager to instantiate the application (9080) and the process terminates. Otherwise, The Recognizer calls the Application Manager to invoke the discovery application, passing in the information about the discovery (9090). The process then terminates.

As mentioned above, the auto-discovery mechanism may also be initiated on a periodic basis. The Maintenance Scheduler manages this.

5.5 Exemplary System Configurations and Unique Advantages of the Exemplified Technology 5.5.1 Exemplary, Illustrative, Non-Limiting Implementations and Related Advantages Related to Scaled, Clustered, and Distributed Implementations of the Technology From the foregoing, those of ordinary skill in the art will appreciate that the technology described herein provides a network management device and related systems that are scalable across multiple deployment platforms as illustrated in FIG. 1 and its accompanying discussion. Furthermore, the network management device and related technology described herein can be clustered and (or) distributed across different network appliances in order to provide for reuse and redundancy of the management infrastructure. Thus, those of ordinary skill in the art will realize that components described above are not required to be deployed solely on any one single system platform. Indeed, some of the features described herein may be hosted using traditional network servers or services.

Accordingly, the technology described herein includes a "remote Collector" configuration, in which a low end appliance platform is placed on a remote network and the information it collects using the methods and systems described herein is forwarded back to a "master" network management device. For example, referring to FIG. 1 and its accompanying discussion above, network management device 1080 is configured to act as a "master" and network management device 1080' is configured as the "remote" Collector. Moreover, in some exemplary, illustrative, non-limiting implementations the remote Collector and master network management device are configured to communicate when a predetermined degree of network bandwidth is available. In another exemplary, illustrative, non-limiting implementation, the "remote Collector" (e.g., 1080') can provide a partial replication of some of the configuration information for later relay to the master network management device. Thus, one advantage provided by the exemplary, illustrative, technology herein is a capability to provide redundancy and distribution of critical network operating information.

Those of ordinary skill in the art will also understand from the disclosure herein that the various components of the technology can be configured in clustered arrangements that support higher throughput and system redundancy at a relatively low cost compared to the prior art. Such configurations provide a more robust network, since single point hardware or network failures will not affect overall functionality of a clustered network management device deployment. Also the built-in process distribution, clustering, and application distribution mechanisms described herein makes the technology described herein far more flexible than any current prior art technology.

5.5.2 Exemplary, Illustrative, Non-Limiting Implementations and Related Advantages Related to High Availability and Dynamic Configuration In some exemplary, illustrative, non-limiting implementations, the network management device and its related components, systems, services, and applications are distributed and replicated across network-attached devices. In case of failure, a network management device instance selects one of a set of named secondary backend servers or services from a configuration template using the methods described herein; the information in which may be manually configured, downloaded from a configuration site, or be the result of network discovery as described herein. For example, if the backend database is found to be unavailable, the network management device instance can locally cache the information while it uses the information stored within its configuration template to locate a backup database server. When the network management device locates an available secondary service or server, the cached management information is written to that secondary server. If an available secondary service or server is not found, or the configuration template is not populated, the network management device instance can start one or more dynamic applications to discover any existing backup services or servers. In some exemplary, illustrative, non-limiting implementations, the network management device instance can start an application to discover additional database services that are capable of providing network management device services. In this way, network management device installations are further self-configuring and self-discovering, in that they may also discover redundant components and automatically configure themselves to maintain a high level of service availability.

Relatedness and requirements templates may also define the business need, such as a business requirement for redundant database servers to serve a web server farm. A network management device can detect when a database server is no longer providing database services, for example, by using a QoS (Quality of Service) dynamic application, and notify the operator to take corrective action. Alternatively, the network management device may take corrective action by starting an application server on a specifically defined backup host server that has been provided to the configuration for such a purpose. In this case, a "hot spare" server may be provided, with software for multiple services installed and configured, but not started. When the network management device notices a loss of service redundancy, it may start one of the previously configured services to restore the redundancy of the network services. Alternatively, if the failed service is a service of a network management device, a network management device instance may download the service configuration from one or more service sites, and then start the application (dynamic, pre-integrated, or embedded) that provides the desired service.

Thus, network management services can remain robust even under severe network stress. Unlike traditional failover techniques that require a failure of the primary service before rolling to a secondary service or server, a network management device instance can use QoS or other network management information collected from its dynamic applications as described herein to make a failover decision. Thus, failover detection and subsequent reconfiguration of network management may occur when problems are first detected—before a failing service or server (or network link leading to a service or server) completely fails—and may even be initiated automatically by the network management device instead of requiring manual intervention.

5.5.3 Exemplary, Illustrative, Non-Limiting Implementations and Related Advantages Related to Policy-Based Configuration The network management device aspect of the technology described herein provides a unique, policy-based mechanism for defining the configuration, operations, and information sharing paradigms used by the network management device and its related components and services. In one exemplary, illustrative, non-limiting implementation, the network management device architecture described herein defines the following information about each application:
   each application's required executable code,
   each application's information collection requirements,
   each application's information sharing capabilities, and
   each application's deployment capabilities and requirements.

In some exemplary, illustrative, non-limiting implementations, such application definitions are described using the above-described templates and the permitted and required deployments are described using "policies". Thus, those of ordinary skill in the art will understand that the application definition templates of the technology described herein define specific implementations for applications, in contrast to prior art application definition systems (e.g., .NET, Java EAR). Furthermore, the network management device mechanism of the technology described herein also defines the information to be collected by the application and how this information is to be stored and/or communicated. Thus, those of ordinary skill in the art will understand that, since policies define how the network management device operates, is deployed, and which application templates are instantiated during auto-discovery, a large extent of network operation can be configured to operate within the limits of network manager-defined policies and procedures without extensive manual configuration of network applications and services.

What is claimed:

1. A network management system comprising:
   a network management device processor executing a network management application operably connected to a network infrastructure;
   the network management device processor executing a first discovery application configured to perform a port mapping operation; and
   the network management device processor using results of the port mapping operation to select and execute a task specific discovery application for gathering information about each network connected device that responds to the port mapping operation,
   the network management device processor executing plural task specific discovery applications, each of the plural task specific discovery applications being configured to discover a different operating characteristic of a network connected device that responds to the port mapping operation;
   the network management device processor being further configured to use results provided by a first task specific discovery application to select and execute at least one subsequent task specific discovery application in order to discover additional operating characteristics of the network connected device and to use the additional task discovery application results to further iterate said selection and execution until each network connected device that responds to the port mapping operation has been characterized;
   the network management device processor searching for and dynamically selecting a dynamically selected policy template and using the dynamically selected policy template to manage at least one aspect of the network.

2. The network management system of claim 1 wherein the at least one subsequent task specific discovery application operating on the network management device is operable to discover previously unknown network connected devices and previously unknown applications running on network connected devices.

3. The network management system of claim 2 wherein the task specific discovery application is operable without installing a software agent onto the network connected device.

4. The network management system of claim 3 further comprising a network connected data storage device reachable by the network management device processor, the network connected data storage device being configured to store a plurality of task specific discovery applications, the network management device processor being operable to select a sequence of task specific discovery applications stored by the network connected data storage device to execute on the network management device processor as needed to gather information about a network connected device that responds to the port mapping operation.

5. The network management system of claim 1 wherein the network management device comprises a distributed arrangement with portions of the network management device operating on a plurality of different network connected devices.

6. The network management system of claim 5 wherein at least a portion of the plurality of different network connected devices are connected to different networks.

7. The network management system of claim 1 further comprising the processor executing a collector application operable to collect, aggregate and manage the results of the port mapping operation and the results of at least one task specific discovery application and to conform data associated with each network connected device to one or more relevant data definition templates.

8. The network management system of claim 7 further comprising the processor executing a classifier application operable to review a data definition template provided by the collector application and to identify for each network connected device further data that place the network connected device that responds to the port mapping operation under management.

9. The network management system of claim 8 further comprising the processor executing a recognizer application operable to review the further data to place the network connected device that responds to the port mapping operation under management and to select a further task specific discovery application to execute that collects the further data to place the network connected device that responds to the port mapping operation under management.

10. The network management system of claim 1 further comprising the processor executing a template manager application operable to dynamically configure and update a point of management template associated with each network connected device that responds to the port mapping operation, wherein the point of management template describes characteristics of a network connected device that responds to the port mapping operation and provides a mapping between the sequence of task specific discovery applications and network connected devices that respond to the port mapping operation.

11. The network management system of claim 1 further comprising a plurality of network device instances each comprising:
 a network management device processor instance;
 a template manager application operating on the network management device processor instance to manage data definition templates for the network device instance;
 a plurality of data definition templates stored on a data store in communication with the network management device processor instance;
 a data store manager application operating on the network management device processor instance;
 wherein each network management device processor instance is operable to automatically share its template data store with one or more other network device instances by one of a real time data sharing model and a publish-and-subscribe data sharing model.

12. The network management system of claim 1 further comprising the network management device processor executing a dynamic application for monitoring network protocol with quality of service metrics.

13. The network management system of claim 1 wherein at least one of the applications includes a dynamic DNS quality of service component for monitoring DNS/DHCP addressing infrastructure.

14. The network management system of claim 1 wherein at least one of the applications includes a DHCP discovery application for monitoring DHCP services.

15. The network management system of claim 1 wherein at least one of the applications includes a HTTP/HTTPS discovery application and a dynamic HTTP/HTTPS quality of service component for monitoring one or more HTTP/HTTPS quality of service metrics.

16. A method performed by at least one processor comprising:
 (a) discovering, with the processor over a network, at least one aspect of a network-connected electronic device;
 (b) based at least in part on the discovered information, selecting and executing a first dynamic application that gives the processor capability for discovering over the network at least one further aspect of the network-connected electronic device, said selecting and executing being performed on an as-needed basis;
 (c) searching for and downloading a policy template on demand in response to discovering at least one aspect of the network-connected electronic device, said policy template comprising a data structure that defines information the first dynamic application is to collect;
 (d) using the policy template to identify at least one management policy for use to manage the network-connected electronic device;
 (e) using said identified management policy to select a second dynamic application different from the first dynamic application; and
 (f) executing said selected second dynamic application to manage at least one aspect or characteristic of the network in accordance with the identified management policy, thereby replacing the first dynamic application with the second dynamic application at least in part in response to discovered or collected information.

17. The method of claim 16, wherein selecting the second dynamic application includes selecting, at least in part, based upon the discovered or collected information.

* * * * *